US012134037B2

(12) United States Patent
Benedetto et al.

(10) Patent No.: US 12,134,037 B2
(45) Date of Patent: Nov. 5, 2024

(54) METHOD AND SYSTEM FOR DIRECTING USER ATTENTION TO A LOCATION BASED GAME PLAY COMPANION APPLICATION

(71) Applicant: Sony Interactive Entertainment LLC, San Mateo, CA (US)

(72) Inventors: Warren Benedetto, San Mateo, CA (US); Sangho Kim, San Mateo, CA (US)

(73) Assignee: Sony Interactive Entertainment LLC, San Mateo, CA (US)

( * ) Notice: Subject to any disclaimer, the term of this patent is extended or adjusted under 35 U.S.C. 154(b) by 222 days.

(21) Appl. No.: 17/235,824

(22) Filed: Apr. 20, 2021

(65) Prior Publication Data

US 2021/0252398 A1 Aug. 19, 2021

Related U.S. Application Data

(63) Continuation of application No. 15/474,395, filed on Mar. 30, 2017, now Pat. No. 10,981,061, which is a (Continued)

(51) Int. Cl.
*A63F 13/533* (2014.01)
*A63F 13/211* (2014.01)
(Continued)

(52) U.S. Cl.
CPC .......... *A63F 13/533* (2014.09); *A63F 13/211* (2014.09); *A63F 13/5258* (2014.09);
(Continued)

(58) Field of Classification Search
CPC .... A63F 13/533; A63F 13/5258; A63F 13/67; G06T 11/60; G06T 19/20
See application file for complete search history.

(56) References Cited

U.S. PATENT DOCUMENTS 9,884,248 B2  2/2018  Koseki et al.
2011/0077078 A1* 3/2011  Taoka ............... A63F 13/58
                                                463/31
(Continued)

OTHER PUBLICATIONS

JP Patent Application No. 2022-200925, Office Action Jan. 30, 2024, Total 4 pages.

*Primary Examiner* — Yingchuan Zhang
(74) *Attorney, Agent, or Firm* — PENILLA IP, APC

(57) ABSTRACT

A method for providing information in an HMD. The method includes defining an active zone in a virtual reality (VR) viewing environment of a user as presented through a 3D display of the HMD. The method includes placing main content in the active zone of the VR viewing environment. The method includes defining one or more peripheral zones outside of the active zone. The method includes placing secondary content in the first peripheral zone of the VR viewing environment. The method includes displaying an attractor within the active zone in conjunction with the entry of new data in the secondary content, wherein the attractor brings attention of the user to the first peripheral zone. The method includes detecting rotation of the HMD from the first orientation directed to the active zone towards a second orientation directed to the first peripheral zone. The method includes pausing the main content.

20 Claims, 22 Drawing Sheets

Related U.S. Application Data continuation-in-part of application No. 15/411,421, filed on Jan. 20, 2017.

(60) Provisional application No. 62/375,834, filed on Aug. 16, 2016, provisional application No. 62/365,202, filed on Jul. 21, 2016, provisional application No. 62/349,546, filed on Jun. 13, 2016.

(51) Int. Cl.
*A63F 13/212* (2014.01)
*A63F 13/5255* (2014.01)
*A63F 13/5258* (2014.01)
*A63F 13/67* (2014.01)
*G06T 11/60* (2006.01)
*G06T 19/20* (2011.01)

(52) U.S. Cl.
CPC .............. *A63F 13/67* (2014.09); *G06T 11/60* (2013.01); *G06T 19/20* (2013.01); *A63F 13/212* (2014.09); *A63F 13/5255* (2014.09); *A63F 2300/105* (2013.01); *A63F 2300/305* (2013.01); *G06T 2219/2004* (2013.01)

(56) References Cited

U.S. PATENT DOCUMENTS

| | | | |
|---|---|---|---|
| 2014/0313393 A1* | 10/2014 | Kinoshita | H04N 23/635 348/341 |
| 2015/0094142 A1* | 4/2015 | Stafford | A63F 13/212 463/31 |
| 2016/0025981 A1* | 1/2016 | Burns | G02B 27/0093 345/156 |
| 2018/0134217 A1* | 5/2018 | Peterson | G06V 20/58 |

* cited by examiner

METHOD AND SYSTEM FOR DIRECTING USER ATTENTION TO A LOCATION BASED GAME PLAY COMPANION APPLICATION

CLAIMS OF PRIORITY

The present application is a continuation of and claims priority to and the benefit of the commonly owned patent application U.S. Ser. No. 15/474,395, filed on Mar. 30, 2017, entitled "METHOD AND SYSTEM FOR DIRECTING USER ATTENTION TO A LOCATION BASED GAME PLAY COMPANION APPLICATION"; which claims priority to and the benefit of the commonly owned, provisional patent application, U.S. Ser. No. 62/349,546, filed on Jun. 13, 2016, entitled "METHOD AND SYSTEM FOR SAVING A SNAPSHOT OF GAME PLAY AND USED TO BEGIN LATER EXECUTION OF THE GAME PLAY BY ANY USER AS EXECUTED ON A GAME CLOUD SYSTEM"; all of which are herein incorporated by reference in their entireties.

The present application is a continuation of and claims priority to and the benefit of the commonly owned patent application U.S. Ser. No. 15/474,395, filed on Mar. 30, 2017, entitled "METHOD AND SYSTEM FOR DIRECTING USER ATTENTION TO A LOCATION BASED GAME PLAY COMPANION APPLICATION"; which is a continuation-in-part of and claims priority to and the benefit of the commonly owned, patent application U.S. Ser. No. 15/411,421, filed on Jan. 20, 2017 entitled "METHOD AND SYSTEM FOR SAVING A SNAPSHOT OF GAME PLAY AND USED TO BEGIN LATER EXECUTION OF THE GAME PLAY BY ANY USER AS EXECUTED ON A GAME CLOUD SYSTEM"; which claims priority to and the benefit of the commonly owned, provisional patent application, U.S. Ser. No. 62/349,546, filed on Jun. 13, 2016, entitled "METHOD AND SYSTEM FOR SAVING A SNAPSHOT OF GAME PLAY AND USED TO BEGIN LATER EXECUTION OF THE GAME PLAY BY ANY USER AS EXECUTED ON A GAME CLOUD SYSTEM"; all of which are herein incorporated by reference in their entireties.

The present application is a continuation of and claims priority to and the benefit of the commonly owned patent application U.S. Ser. No. 15/474,395, filed on Mar. 30, 2017, entitled "METHOD AND SYSTEM FOR DIRECTING USER ATTENTION TO A LOCATION BASED GAME PLAY COMPANION APPLICATION"; which claims priority to and the benefit of the commonly owned, provisional patent application, U.S. Ser. No. 62/375,834, filed on Aug. 16, 2016, entitled "METHOD AND SYSTEM FOR ACCESSING PREVIOUSLY STORED GAME PLAY VIA A VIDEO RECORDING AS EXECUTED ON A GAME CLOUD SYSTEM"; all of which are herein incorporated by reference in their entireties.

The present application is a continuation of and claims priority to and the benefit of the commonly owned patent application U.S. Ser. No. 15/474,395, filed on Mar. 30, 2017, entitled "METHOD AND SYSTEM FOR DIRECTING USER ATTENTION TO A LOCATION BASED GAME PLAY COMPANION APPLICATION"; which claims priority to and the benefit of the commonly owned, provisional patent application, U.S. Ser. No. 62/365,202, filed on Jul. 21, 2016, entitled "GAME PLAY COMPANION APPLICATION"; all of which are herein incorporated by reference in their entireties.

CROSS REFERENCE TO RELATED APPLICATIONS

This application is related to commonly assigned, co-pending U.S. patent application Ser. No. 13/779,730, entitled "SYSTEMS AND METHODS FOR TAGGING CONTENT OF SHARED CLOUD EXECUTED MINI-GAMES AND TAG SHARING CONTROLS," filed on Feb. 27, 2013, the disclosure of which is hereby incorporated by reference in its entirety. This application is related to commonly assigned, co-pending U.S. patent application Ser. No. 13/792,664, entitled "USER-BASED MINI-GAME GENERATION AND DISTRIBUTION," filed on Mar. 11, 2013, the disclosure of which is hereby incorporated by reference in its entirety. This application is related to commonly assigned U.S. Pat. No. 8,870,661, entitled "CLOUD-BASED GAME SLICE GENERATION AND FRICTIONLESS SOCIAL SHARING WITH INSTANT PLAY," filed on Mar. 12, 2013, the disclosure of which is hereby incorporated by reference in its entirety. This application is related to commonly assigned, co-pending U.S. patent application Ser. No. 13/844,558, entitled "Systems and Methods for Managing Video Game Titles and User Play Metrics for Video Game Titles Executing on a Game Cloud System," filed on Mar. 15, 2013, the disclosure of which is hereby incorporated by reference in its entirety. This application is related to commonly assigned, co-pending U.S. patent application Ser. No. 14/526,472, entitled "CLOUD-BASED GAME SLICE GENERATION AND FRICTIONLESS SOCIAL SHARING WITH INSTANT PLAY," filed on Oct. 28, 2014, the disclosure of which is hereby incorporated by reference in its entirety.

TECHNICAL FIELD

The present disclosure is related to video games or gaming applications. Among other things, this disclosure describes methods and systems for providing information in a companion application supporting game play of a user playing a gaming application in a VR environment as viewed through an HMD, wherein the companion application is located in a peripheral zone, and wherein attention of the user is directed to the companion application when new information is available for viewing.

BACKGROUND OF THE DISCLOSURE

Computer generated virtual reality (VR) allows a user to be immersed in a simulated real environment or an imaginary environment, for example. With complete immersion, the user is able to interact with the simulated or imaginary environment, as if the user were present within that VR environment. That is, the user is able to move and look around the VR environment, and possibly interact with objects within that VR environment.

VR systems can use some display system to let the user view the VR environment. These display systems may include a computer monitor or display screen that is presented in front of the user. When the display screen is smaller, the VR experience of the user is hampered by visual stimulation from the surrounding real environment (e.g., sunlight, objects in real space, etc.). The VR experience may be improved by increasing the display size to reduce the influence of the surrounding real environment. Further, the display system may be designed to block out stimulation from the surrounding real environment. For example, a head mounted display (HMD) worn by a user is able to block out light from the physical, real environment, and present a stereoscopic screening system to the user for viewing the VR environment in three dimensions (3Ds). These HMDs may include viewing goggles integrated with a mounting system that is worn on or over the head. Still other more complex VR systems may be integrated with movement sensors that allow a user to make moves in a real world that may then be translated in some form to the world of VR. For instance, hand gestures/movements may be used to interact with VR objects, and moving through the real world (e.g., walking in the physical environment) may be translated to similar movement in the VR environment (e.g., walking or running in the VR environment).

VR systems have been embraced by various industries, such as the military, real estate, medicine, video gaming, etc. Because the user can be totally immersed within a VR environment, that VR environment may simulate a real environment for purposes of training, enjoyment, and escape. For example, a VR system may be used for pilot training in the military, surgical technique training within the medical industry, showing a listing by a real estate agent, or experiencing a vacation destination. In addition, the VR environment may be used to simulate a completely imaginary environment, such as a fantasy world where characters have super human powers. For example, the user may be immersed within a video gaming VR environment that allows the user to take on the skills and movements of a gaming character within that VR environment. In that manner, the user is able to extend the margins of reality by giving the user the sense of imaginary movements and skills. This is analogous to having a disabled person feel as if he or she were able to move (e.g., walk) within the VR environment.

In the VR environment, data is made available to the user in a 360 degree arc, and the user may interact with the data as long as the user is turned towards that data. For example, when the user is looking straight ahead, data is presented in the VR environment in the proper direction from the user. However, data to the sides of the user or behind the user is not presented because the gaze of the user is pointed forward. The user may not be aware of this unpresented data, even though it is available for viewing. For instance, during game play of the user, the user is focused entirely with the task at hand (e.g., fighting a boss, collecting food, traversing a desert, etc.) and may not be aware of the surrounding environment. This information may be important and/or useful to the user, but remains unknown.

It is in this context that embodiments of the disclosure arise.

SUMMARY

Embodiments of the present disclosure relate to providing information supporting game play of a user playing a gaming application in a virtual reality (VR) environment (e.g., as viewed through a head mounted display (HMD), wherein the information may be located in a peripheral zone of the user (e.g., as provided within a companion application supporting game play of the user), and wherein attention of the user is directed to the peripheral zone when new information is available for viewing. Several inventive embodiments of the present disclosure are described below.

In one embodiment, a method for providing information in an HMD is disclosed. The method includes defining an active zone in a VR viewing environment of a user as presented through a three dimensional (3D) display of the HMD. The method includes placing main content in the active zone of the VR viewing environment. In that manner, the main content is presented in the HMD when the gaze of the user is directed towards the active zone (e.g., directed forwards into the VR viewing environment). The method includes defining one or more peripheral zones outside of the active zone, such as to the sides of the user in the VR viewing environment. The method includes placing secondary content in a first peripheral zone of the VR viewing environment. The method includes displaying an attractor within the active zone in conjunction with the entry of new data in the secondary content, wherein the attractor brings attention of the user to the first peripheral zone. The method includes detecting rotation of the HMD from a first orientation directed to the active zone towards a second orientation directed to the first peripheral zone. The method includes pausing the main content, such as while the user is viewing the secondary content.

In another embodiment, a non-transitory computer-readable medium storing a computer program for providing information in an HMD is disclosed. The computer-readable medium includes program instructions for defining an active zone in a VR viewing environment of a user as presented through a 3D display of the HMD. The computer-readable medium includes program instructions for placing main content in the active zone of the VR viewing environment. The computer-readable medium includes program instructions for defining one or more peripheral zones outside of the active zone. The computer-readable medium includes program instructions for placing secondary content in the first peripheral zone of the VR viewing environment. The computer-readable medium includes program instructions for displaying an attractor within the active zone in conjunction with the entry of new data in the secondary content, wherein the attractor brings attention of the user to the first peripheral zone. The computer-readable medium includes program instructions for detecting rotation of the HMD from the first orientation directed to the active zone towards a second orientation directed to the first peripheral zone. The computer-readable medium includes program instructions for pausing the main content. In that manner, while the user is viewing the secondary content, the main content (e.g., a gaming application, video, etc.) is paused so that user need not miss any of the main content.

In still another embodiment, a computer system is disclosed. The computer system including a processor and memory, wherein the memory is coupled to the processor and having stored therein instructions that, if executed by the computer system, cause the computer system to execute a method for providing information in an HMD. The method includes defining an active zone in a VR viewing environment of a user as presented through a three dimensional (3D) display of the HMD. The method includes placing main content in the active zone of the VR viewing environment. In that manner, the main content is presented in the HMD when the gaze of the user is directed towards the active zone (e.g., directed forwards into the VR viewing environment). The method includes defining one or more peripheral zones outside of the active zone, such as to the sides of the user in the VR viewing environment. The method includes placing secondary content in a first peripheral zone of the VR viewing environment. The method includes displaying an attractor within the active zone in conjunction with the entry of new data in the secondary content, wherein the attractor brings attention of the user to the first peripheral zone. The method includes detecting rotation of the HMD from a first orientation directed to the active zone towards a second orientation directed to the first peripheral zone. The method includes pausing the main content, such as while the user is viewing the secondary content so that user need not miss any of the main content (e.g., gaming application, video, etc.).

Other aspects of the disclosure will become apparent from the following detailed description, taken in conjunction with the accompanying drawings, illustrating by way of example the principles of the disclosure.

BRIEF DESCRIPTION OF THE DRAWINGS

The disclosure may best be understood by reference to the following description taken in conjunction with the accompanying drawings in which.

DETAILED DESCRIPTION

Figure 1A:
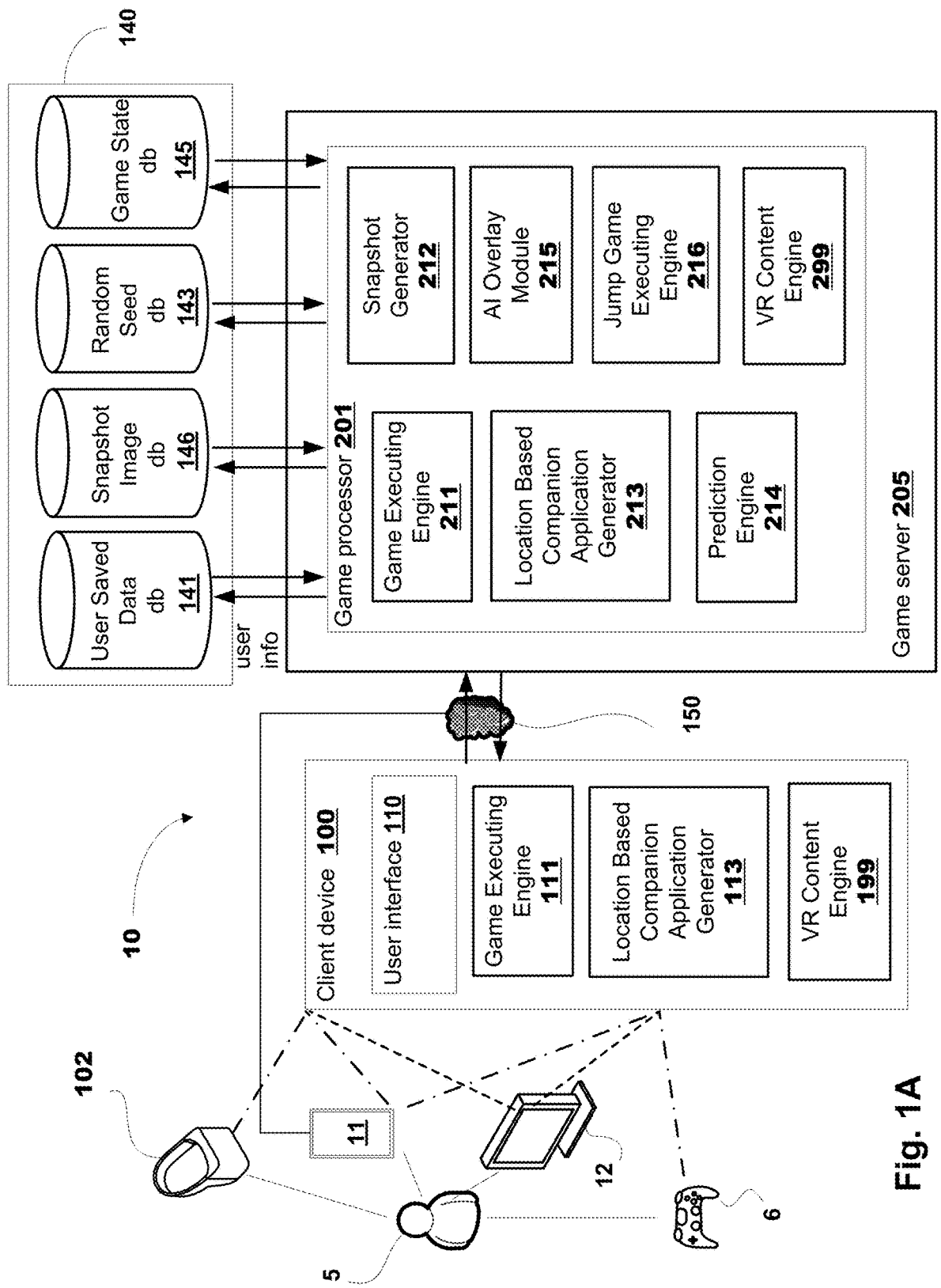
FIG. 1A illustrates a system used for implementing a location based companion interface supporting game play of a corresponding user playing a gaming application in VR viewing environment (e.g., through an HMD), wherein data and/or information may be located in a peripheral zone of the user (e.g., through a companion application supporting the game play) and wherein attention of the user is directed to the peripheral zone when new information or data is available for viewing, wherein the gaming application can be executing on a local computing device or over a cloud game network, in accordance with one embodiment of the present disclosure.

Although the following detailed description contains many specific details for the purposes of illustration, anyone of ordinary skill in the art will appreciate that many variations and alterations to the following details are within the scope of the present disclosure. Accordingly, the aspects of the present disclosure described below are set forth without any loss of generality to, and without imposing limitations upon, the claims that follow this description.

Generally speaking, the various embodiments of the present disclosure describe systems and methods providing data and/or information to a user viewing a VR viewing environment as implemented in an HMD, wherein the data and/or information is located in a peripheral zone of the corresponding user, and wherein attention of the user is directed to the peripheral zone when new information or data is available for viewing. The data and/or information may be provided within a location based companion interface that is configured to support game play of a user. As a result, embodiments of the present disclosure provide for additional uses of a gaming application through a location based companion interface. For example, the gaming application may be a legacy type, two-dimensional gaming application that is presented within an active zone of the VR viewing environment, and a companion interface is presented within the peripheral zone located outside of the active zone. In one embodiment, the companion interface includes contextually relevant information (e.g., messaging, assistance information, etc.) that is generated based on a location of a character in the game play of the user. The information is based on snapshots collected periodically during the game play of one or more users, wherein a snapshot contains metadata and/or information about the game play of the corresponding user, and is configurable to enable another instance of a corresponding gaming application at a jump point in the gaming application corresponding to the snapshot.

The location based information includes defining parameters generated for snapshots collected periodically during the game play of the user. In particular, a snapshot contains metadata and/or information about the game play of the user, and is configurable to enable another instance of a corresponding gaming application at a jump point in the gaming application corresponding to the snapshot. The contextually relevant information also includes information collected during that game plays of other users playing the same gaming application. In that manner, the user is able to receive contextually relevant information based on the current progress of the user (e.g., location in gaming world, etc.). For example, the contextually relevant information can provide assistance in the game play of the user, wherein the information may be based on game play location, past game play, and anticipated game play. Further, the companion interface can be used to create messages from the user.

With the above general understanding of the various embodiments, example details of the embodiments will now be described with reference to the various drawings.

Throughout the specification, the reference to "video game" or "gaming application" is meant to represent any type of interactive application that is directed through execution of input commands. For illustration purposes only, an interactive application includes applications for gaming, word processing, video processing, video game processing, etc. Further, the terms video game and gaming application are interchangeable.

FIG. 1A illustrates a system 10 used for implementing a location based companion interface configured to support game play of a user playing a gaming application in a VR viewing environment as implemented through an HMD, wherein the companion interface may be presented within a peripheral zone of a corresponding user, wherein the peripheral zone is outside of an active zone presenting main content (e.g., gaming application, video content, etc.), in accordance with one embodiment of the present disclosure. The gaming application can be executing on a local computing device or over a cloud game network, in accordance with one embodiment of the present disclosure. The companion interface may be used for providing information and/or creating content (e.g., quests and/or challenges, etc.) for interaction by other users playing the gaming application.

As shown in FIG. 1A, the gaming application may be executing locally at a client device 100 of the user 5 (e.g., at the game executing engine 111), or may be executing at a back-end game executing engine 211 operating at a back-end game server 205 of a cloud game network or game cloud system. The game executing engine 211 may be operating within one of many game processors 201 of game server 205. In either case, the cloud game network is configured to provide a location based companion interface supporting the game plays of one or more users playing a gaming application. Further, the gaming application may be executing in a single-player mode, or multi-player mode, wherein embodiments of the present invention provide for multi-player enhancements (e.g., assistance, communication, etc.) to both modes of operation. Also, game play of the gaming application may be presented within a VR viewing environment as implemented through an HMD 102.

In some embodiments, the cloud game network may include a plurality of virtual machines (VMs) running on a hypervisor of a host machine, with one or more virtual machines configured to execute a game processor module 201 utilizing the hardware resources available to the hypervisor of the host in support of single player or multi-player video games. In other embodiments, the cloud game network is configured to support a plurality of local computing devices supporting a plurality of users, wherein each local computing device may be executing an instance of a video game, such as in a single-player or multi-player video game. For example, in a multi-player mode, while the video game is executing locally, the cloud game network concurrently receives information (e.g., game state data) from each local computing device and distributes that information accordingly throughout one or more of the local computing devices so that each user is able to interact with other users (e.g., through corresponding characters in the video game) in the gaming environment of the multi-player video game. In that manner, the cloud game network coordinates and combines the game plays for each of the users within the multi-player gaming environment.

As shown, system 10 includes a game server 205 executing the game processor module 201 that provides access to a plurality of interactive gaming applications. Game server 205 may be any type of server computing device available in the cloud, and may be configured as one or more virtual machines executing on one or more hosts, as previously described. For example, game server 205 may manage a virtual machine supporting the game processor 201. Game server 205 is also configured to provide additional services and/or content to user 5. For example, game server is configurable to provide a companion interface displayable to user 5 for purposes of generating and/or receiving contextually relevant information, as will be further described below.

Client device 100 is configured for requesting access to a gaming application over a network 150, such as the internet, and for rendering instances of video games or gaming applications executed by the game server 205 and delivered to the display device 12 associated with a user 5. For example, user 5 may be interacting through client device 100 with an instance of a gaming application executing on game processor 201. Client device 100 may also include a game executing engine 111 configured for local execution of the gaming application, as previously described. The client device 100 may receive input from various types of input devices, such as game controllers 6, tablet computers 11, keyboards, and gestures captured by video cameras, mice, touch pads, etc. Client device 100 can be any type of computing device having at least a memory and a processor module that is capable of connecting to the game server 205 over network 150. Some examples of client device 100 include a personal computer (PC), a game console, a home theater device, a general purpose computer, mobile computing device, a tablet, a phone, or any other types of computing devices that can interact with the game server 205 to execute an instance of a video game.

Client device 100 is configured for receiving rendered images, and for displaying the rendered images on display 12 and/or HMD 102 (e.g., displaying VR content 198) For example, through cloud based services the rendered images may be delivered by an instance of a gaming application executing on game executing engine 211 of game server 205 in association with user 5. In another example, through local game processing, the rendered images may be delivered by the local game executing engine 111. In either case, client device 100 is configured to interact with the executing engine 211 or 111 in association with the game play of user 5, such as through input commands that are used to drive game play.

Further, client device 100 is configured to interact with the game server 205 to capture and store snapshots of the game play of user 5 when playing a gaming application, wherein each snapshot includes information (e.g., game state, etc.) related to the game play. For example, the snapshot may include location based information corresponding to a location of a character within a gaming world of the game play of the user 5. Further, a snapshot enables a corresponding user to jump into a saved game play at a jump point in the gaming application corresponding to the capture of the snapshot. As such, user 5 can jump into his or her own saved game play at a jump point corresponding to a selected snapshot, another user may jump into the game play of the user 5, or user 5 may jump into the saved game play of another user at a jump point corresponding to a selected snapshot. Further, client device 100 is configured to interact with game server 205 to display a location based companion interface from the companion interface generator 213, wherein the companion interface is configured to receive and/or generate contextually relevant content, such as assistance information, messaging, interactive quests and challenges, etc. In another embodiment, the companion interface generator 113 is local to the user 5. In particular, information contained in the snapshots captured during the game play of user 5, such as location based information relating to the game play, as well as information captured during game plays of other users, is used to generate the contextually relevant content.

More particularly, game processor 201 of game server 205 is configured to generate and/or receive snapshots of the game play of user 5 when playing the gaming application. For instance, snapshots may be generated by the local game execution engine 111 on client device 100, outputted and delivered over network 150 to game processor 201. In addition, snapshots may be generated by game executing engine 211 within the game processor 201, such as by an instance of the gaming application executing on engine 211. In addition, other game processors of game server 205 associated with other virtual machines are configured to execute instances of the gaming application associated with game plays of other users and to capture snapshots during those game play, wherein this additional information may be used to create the contextually relevant information.

Snapshot generator 212 is configured to capture a plurality of snapshots generated from the game play of user 5. Each snapshot provides information that enables execution of an instance of the video game beginning from a point in the video game associated with a corresponding snapshot. The snapshots are automatically generated during game play of the gaming application by user 5. Portions of each of the snapshots are stored in relevant databases independently configured or configured under data store 140, in embodiments. In another embodiment, snapshots may be generated manually through instruction by user 5. In that manner, any user through selection of a corresponding snapshot may jump into the game play of user 5 at a point in the gaming application associated with the corresponding snapshot. In addition, snapshots of game plays of other users playing a plurality of gaming applications may also be captured. As such, game processor 201 is configured to access information in database 140 in order to enable the jumping into a saved game play of any user based on a corresponding snapshot. That is, the requesting user is able to begin playing the video game at a jump point corresponding to a selected snapshot using the game characters of the original user's game play that generated and saved the snapshot.

A full discussion on the creation and use of snapshots is provided within U.S. application Ser. No. 15/411,421, entitled "Method And System For Saving A Snapshot of Game Play And Used To Begin Later Execution Of The Game Play By Any User As Executed On A Game Cloud System," which was previously incorporated by reference in its entirety. A brief description of the creation and implementation of snapshots follows below.

In particular, each snapshot includes metadata and/or information to enable execution of an instance of the gaming application beginning at a point in the gaming application corresponding to the snapshot. For example, in the game play of user 5, a snapshot may be generated at a particular point in the progression of the gaming application, such as in the middle of a level. The relevant snapshot information is stored in one or more databases of database 140. Pointers can be used to relate information in each database corresponding to a particular snapshot. In that manner, another user wishing to experience the game play of user 5, or the same user 5 wishing to re-experience his or her previous game play, may select a snapshot corresponding to a point in the gaming application of interest.

The metadata and information in each snapshot may provide and/or be analyzed to provide additional information related to the game play of the user. For example, snapshots may help determine where the user (e.g., character of the user) has been within the gaming application, where the user is in the gaming application, what the user has done, what assets and skills the user has accumulated, and where the user will be going within the gaming application. This additional information may be used to generate quests and/or challenges that are based on the game play of the user, wherein the quests and/or challenges are not contained within the gaming application. For example, the user may define asset and achievement parameters (e.g., negative and positive) that create a quest and/or challenge that mimic the user's game play (e.g., beating the boss using minimal weaponry). The user may challenge other users to try and beat the quest (e.g., beating the boss) with the same constraints (e.g., minimal weaponry).

The snapshot includes a snapshot image of the scene that is rendered at that point. The snapshot image is stored in snapshot image database 146. The snapshot image presented in the form of a thumbnail in a timeline provides a view into the game play of a user at a corresponding point in the progression by the user through a video game, in one embodiment.

More particularly, the snapshot also includes game state data that defines the state of the game at that point. For example, game state data may include game characters, game objects, game object attributes, game attributes, game object state, graphic overlays, etc. In that manner, game state data allows for the generation of the gaming environment that existed at the corresponding point in the video game. Game state data may also include the state of every device used for rendering the game play, such as states of CPU, GPU, memory, register values, program counter value, programmable DMA state, buffered data for the DMA, audio chip state, CD-ROM state, etc. Game state data may also identify which parts of the executable code need to be loaded to execute the video game from that point. Not all the game state data need be captured and stored, just the data that is sufficient for the executable code to start the game at the point corresponding to the snapshot. The game state data is stored in game state database 145.

The snapshot also includes user saved data. Generally, user saved data includes information that personalizes the video game for the corresponding user. This includes information associated with the user's character, so that the video game is rendered with a character that may be unique to that user (e.g., shape, look, clothing, weaponry, etc.). In that manner, the user saved data enables generation of a character for the game play of a corresponding user, wherein the character has a state that corresponds to the point in the video game associated with the snapshot. For example, user saved data may include the game difficulty selected by the user 5 when playing the game, game level, character attributes, character location, number of lives left, the total possible number of lives available, armor, trophy, time counter values, and other asset information, etc. User saved data may also include user profile data that identifies user 5, for example. User saved data is stored in database 141.

In addition, the snapshot also includes random seed data that is generated by artificial intelligence (AI) module 215. The random seed data may not be part of the original game code, but may be added in an overlay to make the gaming environment seem more realistic and/or engaging to the user. That is, random seed data provides additional features for the gaming environment that exists at the corresponding point in the game play of the user. For example, AI characters may be randomly generated and provided in the overlay. The AI characters are not associated with any users playing the game, but are placed into the gaming environment to enhance the user's experience. As an illustration, these AI characters may randomly walk the streets in a city scene. In addition, other objects maybe generated and presented in an overlay. For instance, clouds in the background and birds flying through space may be generated and presented in an overlay. The random seed data is stored in random seed database 143.

In that manner, another user wishing to experience the game play of user 5 may select a snapshot corresponding to a point in the video game of interest. For example, selection of a snapshot image presented in a timeline or node in a node graph by a user enables the jump executing engine 216 of game processor 201 to access the corresponding snapshot, instantiate another instance of the video game based on the snapshot, and execute the video game beginning at a point in the video game corresponding to the snapshot. In that manner, the snapshot enables the requesting user to jump into the game play of user 5 at the point corresponding to the snapshot. In addition, user 5 may access game plays of other users or even access his or her own prior game play in the same or other gaming application using corresponding snapshots. In particular, selection of the snapshot by user 5 (e.g., in a timeline, or through a message, etc.) enables executing engine 216 to collect the snapshot (e.g., metadata and/or information) from the various databases (e.g., from database 140) in order to begin executing the corresponding gaming application at a point where the corresponding snapshot was captured in a corresponding gaming application.

Game processor 201 includes a location based companion application generator 213 configured to generate a companion interface supporting the game play of user 5 when playing a gaming application, in one embodiment. In another embodiment, a companion application generator 113 similarly configured is local to user 5. In either case, the generator 213 or 113 can be used to create contextually relevant information (e.g., assistance information, messages, etc.) to be delivered to or received from user 5 that is based on the game play of the user 5, wherein the contextually relevant information is created using location based information (e.g., snapshots). The contextually relevant information may also be based on information collected from game plays of other users playing the gaming application. For example, in embodiments the location based information may be based on current and/or past game plays of multiple users playing the same gaming application in a crowd sourcing environment, such that the information may be determined through observation and/or analysis of the multiple game plays. In that manner, crowdsourced content may be discovered during the game plays, wherein the content may be helpful for other players playing the same gaming application, or provide an enhanced user experience to these other players. The contextually relevant information may be generated from friends of the user. The user may be playing the gaming application in isolation (e.g., playing alone), and receiving information through the companion interface that is helpful in advancing the game play of the first user, or for providing an enhanced user experience. The user may be playing with a group of friends all playing the gaming application simultaneously (e.g., in isolation or multi-player mode), wherein the information provides real-time interaction between the friends.

In particular, generator 213 or 113 is configurable to determine progress of the game play of user 5 for a particular gaming application (e.g., based on snapshots) for a particular context of the game play (e.g., current location of character, game state information, etc.), and determine contextually relevant information that may be delivered to a companion interface displayable on device 11 that is separate from a device displaying the game play of user 5. For example, the contextually relevant information may provide information providing assistance in progressing through the gaming application. The contextually relevant information may consider information provided by a prediction engine 214 that is configured to predict where the game play of user 5 will go, to include what areas a character will visit, what tasks are required to advance the game play, what assets are needed in order to advance the game play (e.g., assets needed to accomplish a required task), etc.

In general, secondary information may be provided within a peripheral zone of a corresponding user that is interacting with main content presented in an active zone of a VR viewing environment, such as an environment implemented in an HMD. The VR viewing environment may be generated by the VR content engine 299 at a back end server in one implementation, or locally at VR content engine 199. The secondary information presented in the companion interface may also be used to create contextually relevant content by user 5, such as assistance information related to game play of the user playing a gaming application presented in the active zone, or other information related to the main content (e.g., information related to actors in a movie presented as main content), etc.

In one embodiment, the companion interface is delivered to a device 11 (e.g., tablet) for display and interaction, wherein device 11 may be separate from client device 100 that is configured to execute and/or support execution of the gaming application for user 5 interaction. For instance, a first communication channel may be established between the game server 205 and client device 100, and a separate, second communication channel may be established between game server 205 and device 11. In another embodiment, the secondary information (e.g., companion interface) is delivered to an HMD 102 for display and interaction.

Figure 1B:
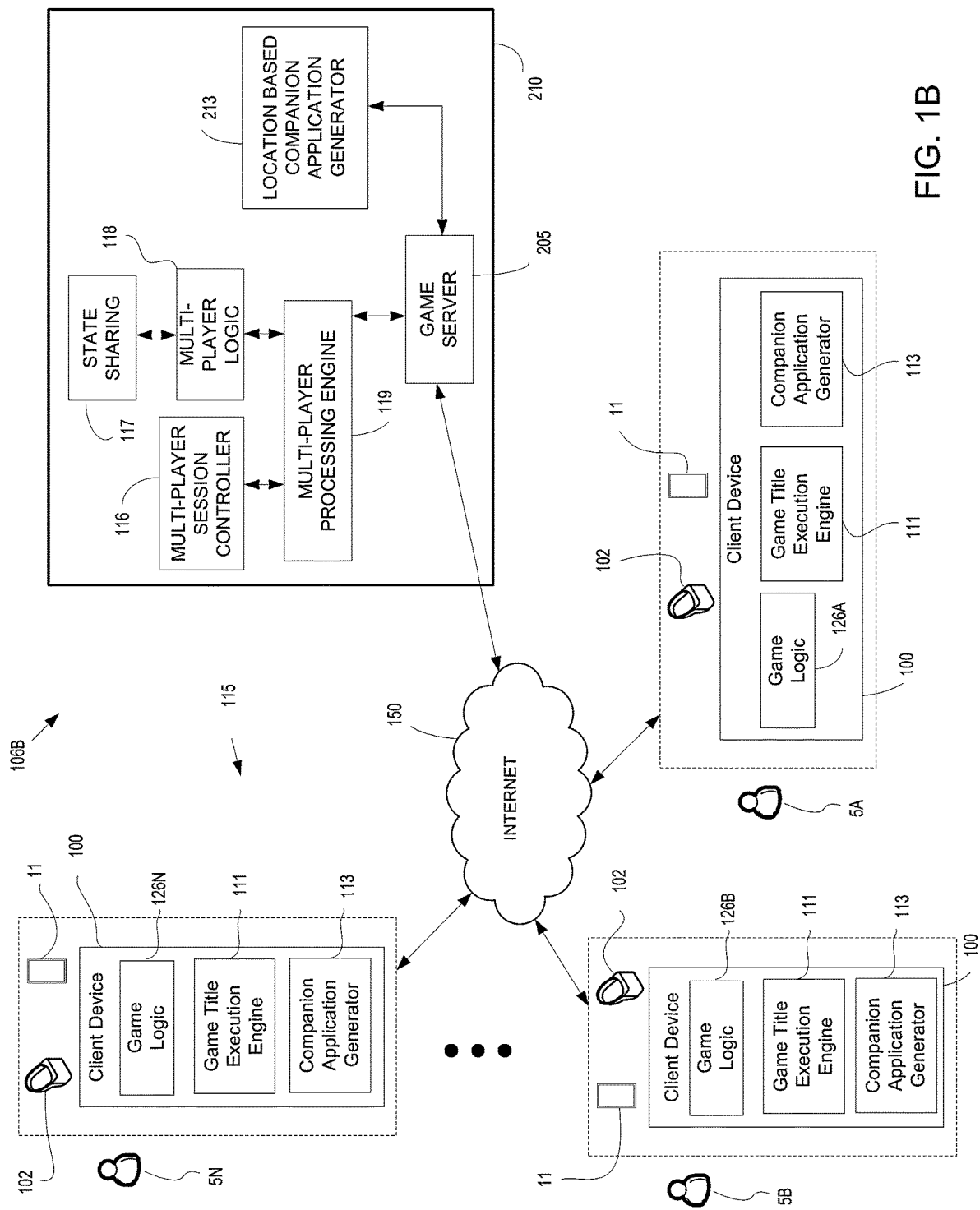
FIG. 1B illustrates a system providing gaming control to one or more users playing one or more gaming applications that are executing locally to the corresponding user in respective VR viewing environments, and wherein back-end server support may implement a location based companion interface supporting game play of a corresponding user that is located in a peripheral zone of the corresponding user, and wherein attention of the user is directed to the peripheral zone when new information or data is available for viewing, in accordance with one embodiment of the present disclosure.

FIG. 1B illustrates a system 106B providing gaming control to one or more users playing one or more gaming applications that are executing locally to the corresponding user, and wherein back-end server support (e.g., accessible through game server 205) may implement a location based companion interface supporting game play of a corresponding user presented in a VR viewing environment as implemented in an HMD 102, wherein the companion interface or information presented therein is presented in a peripheral zone in the VR viewing environment, in accordance with one embodiment of the present disclosure. In one embodiment, system 106B works in conjunction with system 10 of FIG. 1A and system 200 of FIG. 2 to implement the location based companion interface supporting game play of a corresponding user, and wherein not all components are shown for clarity. Referring now to the drawings, like referenced numerals designate identical or corresponding parts.

As shown in FIG. 1B, a plurality of users 115 (e.g., user 5A, user 5B . . . user 5N) is playing a plurality of gaming applications, wherein each of the gaming applications is executed locally on a corresponding client device 100 (e.g., game console) of a corresponding user. In addition, each of the plurality of users 115 has access to a device 11 and/or HMD 102, previously introduced, configured to receive and/or generate a companion interface for display, wherein the companion interface provides secondary information (e.g., contextually relevant information) for a corresponding user playing a corresponding gaming application, as previously described, wherein the secondary information is presented in a peripheral zone of a user viewing main content presented in an active zone of a VR viewing environment as displayed. Each of the client devices 100 may be configured similarly in that local execution of a corresponding gaming application is performed. For example, user 5A may be playing a first gaming application on a corresponding client device 100, wherein an instance of the first gaming application is executed by a corresponding game title execution engine 111. Game logic 126A (e.g., executable code) implementing the first gaming application is stored on the corresponding client device 100, and is used to execute the first gaming application. For purposes of illustration, game logic may be delivered to the corresponding client device 100 through a portable medium (e.g., flash drive, compact disk, etc.) or through a network (e.g., downloaded through the internet 150 from a gaming provider). In addition, user 5B is playing a second gaming application on a corresponding client device 100, wherein an instance of the second gaming application is executed by a corresponding game title execution engine 111. The second gaming application may be identical to the first gaming application executing for user 5A or a different gaming application. Game logic 126B (e.g., executable code) implementing the second gaming application is stored on the corresponding client device 100 as previously described, and is used to execute the second gaming application. Further, user 115N is playing an Nth gaming application on a corresponding client device 100, wherein an instance of the Nth gaming application is executed by a corresponding game title execution engine 111. The Nth gaming application may be identical to the first or second gaming application, or may be a completely different gaming application. Game logic 126N (e.g., executable code) implementing the third gaming application is stored on the corresponding client device 100 as previously described, and is used to execute the Nth gaming application.

As previously described, client device 100 may receive input from various types of input devices, such as game controllers, tablet computers, keyboards, gestures captured by video cameras, mice touch pads, etc. Client device 100 can be any type of computing device having at least a memory and a processor module that is capable of connecting to the game server 205 over network 150. Also, client device 100 of a corresponding user is configured for generating rendered images executed by the game title execution engine 111 executing locally or remotely, and for displaying the rendered images on a display (e.g., display 11, HMD 102, etc.). For example, the rendered images may be associated with an instance of the first gaming application executing on client device 100 of user 5A. For example, a corresponding client device 100 is configured to interact with an instance of a corresponding gaming application as executed locally or remotely to implement a game play of a corresponding user, such as through input commands that are used to drive game play.

In one embodiment, client device 100 is operating in a single-player mode for a corresponding user that is playing a gaming application. Back-end server support via the game server 205 may provide location based companion interface services supporting game play of a corresponding user, as will be described below, in accordance with one embodiment of the present disclosure.

In another embodiment, multiple client devices 100 are operating in a multi-player mode for corresponding users that are each playing a specific gaming application. In that case, back-end server support via the game server may provide multi-player functionality, such as through the multi-player processing engine 119. In particular, multi-player processing engine 119 is configured for controlling a multi-player gaming session for a particular gaming application. For example, multi-player processing engine 119 communicates with the multi-player session controller 116, which is configured to establish and maintain communication sessions with each of the users and/or players participating in the multi-player gaming session. In that manner, users in the session can communicate with each other as controlled by the multi-player session controller 116.

Further, multi-player processing engine 119 communicates with multi-player logic 118 in order to enable interaction between users within corresponding gaming environments of each user. In particular, state sharing module 117 is configured to manage states for each of the users in the multi-player gaming session. For example, state data may include game state data that defines the state of the game play (of a gaming application) for a corresponding user at a particular point. For example, game state data may include game characters, game objects, game object attributes, game attributes, game object state, graphic overlays, etc. In that manner, game state data allows for the generation of the gaming environment that exists at the corresponding point in the gaming application. Game state data may also include the state of every device used for rendering the game play, such as states of CPU, GPU, memory, register values, program counter value, programmable DMA state, buffered data for the DMA, audio chip state, CD-ROM state, etc. Game state data may also identify which parts of the executable code need to be loaded to execute the video game from that point. Game state data may be stored in database 140 of FIG. 1A and FIG. 2, and is accessible by state sharing module 117.

Further, state data may include user saved data that includes information that personalizes the video game for the corresponding player. This includes information associated with the character played by the user, so that the video game is rendered with a character that may be unique to that user (e.g., location, shape, look, clothing, weaponry, etc.). In that manner, the user saved data enables generation of a character for the game play of a corresponding user, wherein the character has a state that corresponds to the point in the gaming application experienced currently by a corresponding user. For example, user saved data may include the game difficulty selected by a corresponding user 115A when playing the game, game level, character attributes, character location, number of lives left, the total possible number of lives available, armor, trophy, time counter values, etc. User saved data may also include user profile data that identifies a corresponding user 115A, for example. User saved data may be stored in database 140.

In that manner, the multi-player processing engine 119 using the state sharing data 117 and multi-player logic 118 is able to overlay/insert objects and characters into each of the gaming environments of the users participating in the multi-player gaming session. For example, a character of a first user is overlaid/inserted into the gaming environment of a second user. This allows for interaction between users in the multi-player gaming session via each of their respective gaming environments (e.g., as displayed on a screen).

In addition, back-end server support via the game server 205 may provide location based companion application services provided through a companion interface generated by companion application generator 213. In another embodiment, the companion application generator 113 is local to user 5, and is similarly configured. As previously introduced, generator 213 and/or 113 is configured to create secondary information, including contextually relevant information (e.g., assistance information, messages, etc.), to be delivered to or received from user 5. The information may be generated based on the game play of user 5 for a particular application (e.g., based on information provided in snapshots). In that manner, generator 213 or 113 is able to determine the context of the game play of user 5 and provide contextually relevant information that is deliverable to a companion interface displayable on device 11 (e.g., separate from the device displaying game play of user 5), or HMD 102 (concurrent with display of the game play of user 5).

Figure 1C:
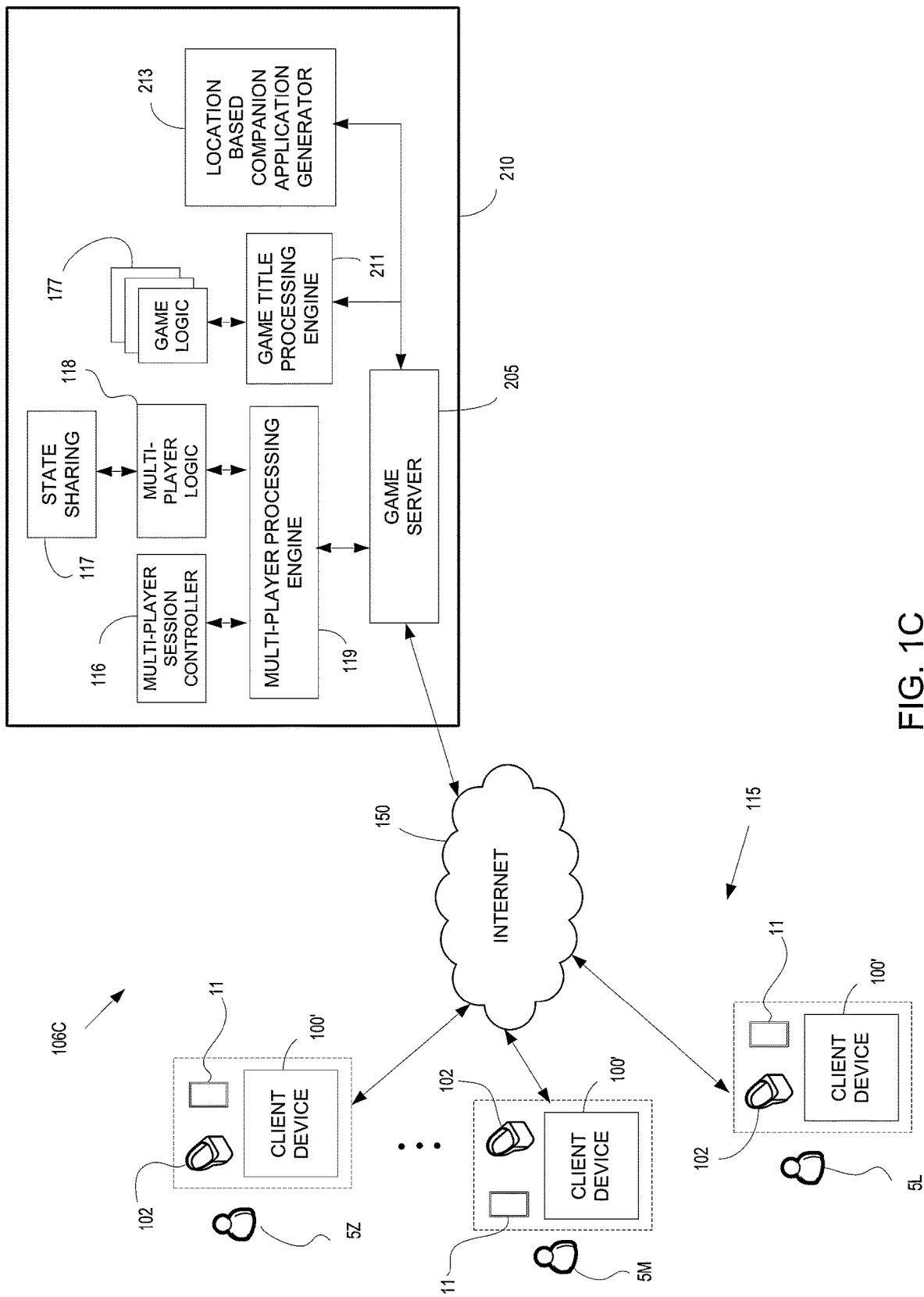
FIG. 1C illustrates a system providing gaming control to one or more users playing a gaming application in respective VR viewing environments as executed over a cloud game network, and wherein back-end server support may implement a location based companion interface supporting game play of a corresponding user that is located in a peripheral zone of the corresponding user, and wherein attention of the user is directed to the peripheral zone when new information or data is available for viewing, in accordance with one embodiment of the present disclosure.

FIG. 1C illustrates a system 106C providing gaming control to one or more users 115 (e.g., users 5L, 5M . . . 5Z) playing a gaming application in respective VR viewing environments as executed over a cloud game network, and wherein back-end server support may implement a location based companion interface supporting game play of a corresponding user that is located in a peripheral zone of the corresponding user, and wherein attention of the user is directed to the peripheral zone when new information or data is available for viewing, in accordance with one embodiment of the present disclosure. In some embodiments, the cloud game network may be a game cloud system 210 that includes a plurality of virtual machines (VMs) running on a hypervisor of a host machine, with one or more virtual machines configured to execute a game processor module utilizing the hardware resources available to the hypervisor of the host. In one embodiment, system 106C works in conjunction with system 10 of FIG. 1A and/or system 200 of FIG. 2 to implement the location based companion interface supporting game play of a corresponding user. Referring now to the drawings, like referenced numerals designate identical or corresponding parts.

As shown, the game cloud system 210 includes a game server 205 that provides access to a plurality of interactive video games or gaming applications. Game server 205 may be any type of server computing device available in the cloud, and may be configured as one or more virtual machines executing on one or more hosts. For example, game server 205 may manage a virtual machine supporting a game processor that instantiates an instance of a gaming application for a user. As such, a plurality of game processors of game server 205 associated with a plurality of virtual machines is configured to execute multiple instances of the gaming application associated with game plays of the plurality of users 115. In that manner, back-end server support provides streaming of media (e.g., video, audio, etc.) of game plays of a plurality of gaming applications to a plurality of corresponding users.

A plurality of users 115 accesses the game cloud system 210 via network 150, wherein users (e.g., users 5L, 5M . . . 5Z) access network 150 via corresponding client devices 100', wherein client device 100' may be configured similarly as client device 100 of FIGS. 1A-1B (e.g., including game executing engine 111, etc.), or may be configured as a thin client providing that interfaces with a back end server providing computational functionality (e.g., including game executing engine 211). In addition, each of the plurality of users 115 has access to a device 11 or HMD 102, previously introduced, configured to receive and/or generate a companion interface for display that provides secondary information (e.g., contextually relevant information) in a peripheral zone of a corresponding user playing a corresponding gaming application presented in a VR viewing environment, as previously described. In particular, a client device 100' of a corresponding user 5L is configured for requesting access to gaming applications over a network 150, such as the internet, and for rendering instances of gaming application (e.g., video game) executed by the game server 205 and delivered to a display device associated with the corresponding user 5L. For example, user 5L may be interacting through client device 100' with an instance of a gaming application executing on game processor of game server 205. More particularly, an instance of the gaming application is executed by the game title execution engine 211. Game logic (e.g., executable code) implementing the gaming application is stored and accessible through data store 140, previously described, and is used to execute the gaming application. Game title processing engine 211 is able to support a plurality of gaming applications using a plurality of game logics 177, as shown.

As previously described, client device 100' may receive input from various types of input devices, such as game controllers, tablet computers, keyboards, gestures captured by video cameras, mice touch pads, etc. Client device 100' can be any type of computing device having at least a memory and a processor module that is capable of connecting to the game server 205 over network 150. Also, client device 100' of a corresponding user is configured for generating rendered images executed by the game title execution engine 211 executing locally or remotely, and for displaying the rendered images on a display. For example, the rendered images may be associated with an instance of the first gaming application executing on client device 100' of user 5L. For example, a corresponding client device 100' is configured to interact with an instance of a corresponding gaming application as executed locally or remotely to implement a game play of a corresponding user, such as through input commands that are used to drive game play.

In another embodiment, multi-player processing engine 119, previously described, provides for controlling a multi-player gaming session for a gaming application. In particular, when the multi-player processing engine 119 is managing the multi-player gaming session, the multi-player session controller 116 is configured to establish and maintain communication sessions with each of the users and/or players in the multi-player session. In that manner, users in the session can communicate with each other as controlled by the multi-player session controller 116.

Further, multi-player processing engine 119 communicates with multi-player logic 118 in order to enable interaction between users within corresponding gaming environments of each user. In particular, state sharing module 117 is configured to manage states for each of the users in the multi-player gaming session. For example, state data may include game state data that defines the state of the game play (of a gaming application) for a corresponding user 115A at a particular point, as previously described. Further, state data may include user saved data that includes information that personalizes the video game for the corresponding player, as previously described. For example, state data includes information associated with the user's character, so that the video game is rendered with a character that may be unique to that user (e.g., shape, look, clothing, weaponry, etc.). In that manner, the multi-player processing engine 119 using the state sharing data 117 and multi-player logic 118 is able to overlay/insert objects and characters into each of the gaming environments of the users participating in the multi-player gaming session. This allows for interaction between users in the multi-player gaming session via each of their respective gaming environments (e.g., as displayed on a screen).

In addition, back-end server support via the game server 205 may provide location based companion application services provided through a companion interface generated by companion application generator 213. In another embodiment, the companion application generator 113 is local to user 5, and is similarly configured. As previously introduced, generator 213 and/or 113 are configured to create contextually relevant information (e.g., assistance information, messages, etc.) to be delivered to or received from a corresponding user (e.g., user 5L). The information is generated based on the game play of the user for a particular application (e.g., based on information provided in snapshots). In that manner, generator 213 and/or 113 is able to determine the context of the game play of the corresponding user and provide contextually relevant information that is deliverable to a companion interface displayable on device 11 (e.g., separate from the device displaying game play of user 5L) and/or HMD 102 (e.g., concurrent with display of the game play of user 5).

Figure 1D:
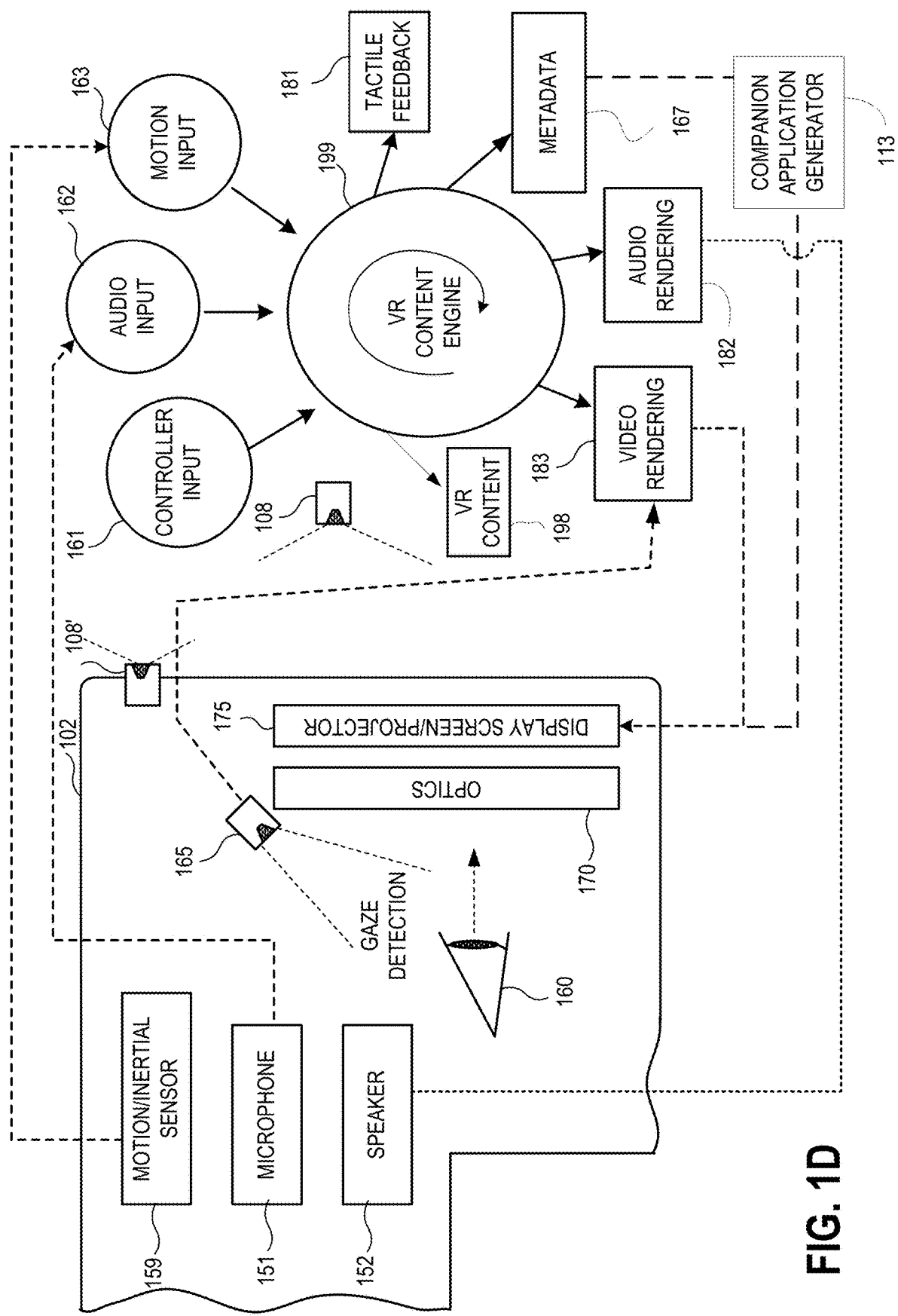
FIG. 1D conceptually illustrates the function of a HMD in conjunction with the execution of an application generating VR content, in accordance with an embodiment of the invention.

FIG. 1D conceptually illustrates the function of a HMD 102 in conjunction with the generation of VR content (e.g., execution of a gaming application and/or video game, video content, etc.), and the presentation of main content as the VR content within an active zone of a VR viewing environment associated with a user 5, and the generation and/or presentation of secondary information in a peripheral zone that is outside of the active zone, in accordance with an embodiment of the invention. In some implementations, the VR content engine 199 is being executed on a localized client device 100 (not shown) that is communicatively coupled to the HMD 102, as previously described. For example, the VR content engine 199 executing an application may be a gaming engine executing a video game, and is configured to receive inputs to update a game state of the video game. The gaming engine may be a gaming console, or back end gaming server, as previously described. The game state of the video game can be defined, at least in part, by values of various parameters of the video game which define various aspects of the current gameplay, such as the presence and location of objects, the conditions of a virtual environment, the triggering of events, user profiles, view perspectives, actions taken by the user 5, controller actions, gaze tracking information, etc.

In the illustrated embodiment, the VR content engine 199 receives, by way of example, controller input 161, audio input 162 and motion input 163. The controller input 161 may be defined from the operation of a gaming controller separate from the HMD 102, such as a hand-held gaming controller 6 (e.g., Sony DUALSHOCK® 4 wireless controller, Sony PlayStation® Move motion controller) or wearable controllers, such as wearable glove interface controller, etc. By way of example, controller input 161 may include directional inputs, button presses, trigger activation, movements, gestures or other kinds of inputs processed from the operation of a gaming controller. The audio input 162 can be processed from a microphone 151 of the HMD 102, or from a microphone included in the image capture device 108 or elsewhere within the local system environment. The motion input 163 can be processed from a motion sensor 159 included in the HMD 102, or from image capture device 108 as it captures images of the HMD 102. For example, the motion sensor 159 may include an inertial sensor configured to capture acceleration data of the HMD 102 that is associated with head movement of the user 5. In addition, image capture device 108 may be configured for head tracking to monitor head movement of the user 5. In that manner, by tracking head movement and/or eye movement, secondary data may be presented within a field of view (FOV) of a user viewing the VR viewing environment when the head and/or eye is directed towards a peripheral zone in the VR viewing environment in association with the user. The VR content engine 199 (e.g., executing a gaming application) receives inputs which are processed according to the configuration of the game engine to update the game state of the video game. The engine 199 outputs game state data to various rendering modules which process the game state data to define content which will be presented to the user 5.

In the illustrated embodiment, a video rendering module 183 is defined to render a video stream including VR content 198, which when presented on the HMD 102 gives a user 5 a three dimensional VR experience. A lens of optics 170 in the HMD 102 is configured for viewing the VR content 198. A display screen 175 is disposed behind the lens of optics 170, such that the lens of optics 170 is between the display screen 175 and an eye 160 of the user 5, when the HMD 102 is worn by the user 5. In that manner, the video stream may be presented by the display screen/projector mechanism 175, and viewed through optics 170 by the eye 160 of the user 5. An HMD user 5 may elect to interact with the interactive VR content (e.g., VR video source, video game content, etc.) by wearing the HMD and selecting a video game for game play, for example. Interactive virtual reality (VR) scenes from the video game are rendered on the display screen 175 of the HMD. In that manner, the HMD allows the user 5 to completely immerse in the game play by provisioning display mechanism of the HMD in close proximity to the user's eyes. The display regions defined in the display screen of the HMD for rendering content may occupy large portions or even the entirety of the field of view of the user 5. For instance, main content is presented within an active zone of the VR viewing environment. Typically, each eye is supported by an associated lens of optics 170 which is viewing one or more display screens.

An audio rendering module 182 is configured to render an audio stream for listening by the user 5. In one embodiment, the audio stream is output through a speaker 152 associated with the HMD 102. It should be appreciated that speaker 152 may take the form of an open air speaker, headphones, or any other kind of speaker capable of presenting audio.

In one embodiment, a gaze tracking camera 165 is included in the HMD 102 to enable tracking of the gaze of the user 5. Although only one gaze tracking camera 165 is included, it should be noted that more than one gaze tracking camera may be employed to track the gaze of the user 5. The gaze tracking camera captures images of the user's eyes, which are analyzed to determine the gaze direction of the user 5. In one embodiment, information about the gaze direction of the user 5 can be utilized to affect the video rendering. For example, if a user's eyes are determined to be looking in a specific direction, then the video rendering for that direction can be prioritized or emphasized, such as by providing greater detail or faster updates in the region where the user 5 is looking. In one embodiment, secondary information is presented in the FOV of the user when it is detected that the gaze of user 5 is directed to a peripheral zone outside of an active zone presenting main content. It should be appreciated that the gaze direction of the user 5 can be defined relative to the head mounted display, relative to a real environment in which the user 5 is situated, and/or relative to a virtual environment that is being rendered on the head mounted display.

Broadly speaking, analysis of images captured by the gaze tracking camera 192, when considered alone, provides for a gaze direction of the user 5 relative to the HMD 102. However, when considered in combination with the tracked location and orientation of the HMD 102, a real-world gaze direction of the user 5 can be determined, as the location and orientation of the HMD 102 is synonymous with the location and orientation of the user's head. That is, the real-world gaze direction of the user 5 can be determined from tracking the positional movements of the user's eyes and tracking the location and orientation of the HMD 102. When a view of a virtual environment is rendered on the HMD 102, the real-world gaze direction of the user 5 can be applied to determine a virtual world gaze direction of the user 5 in the virtual environment.

Additionally, a tactile feedback module 181 is configured to provide signals to tactile feedback hardware included in either the HMD 102 or another device operated by the HMD user 5, such as a controller 6. The tactile feedback may take the form of various kinds of tactile sensations, such as vibration feedback, temperature feedback, pressure feedback, etc.

In another embodiment, metadata 167 is generated from the VR content engine and used for determining secondary content that is delivered to the user who is viewing main content in a VR viewing environment as implemented through HMD 102. For example, metadata 167 may determine the current location of a character in a gaming environment of a gaming application being played by the user, wherein secondary content (e.g., contextually relevant information) is generated for display to the user in a peripheral zone based on the location information of the character.

Figure 2:
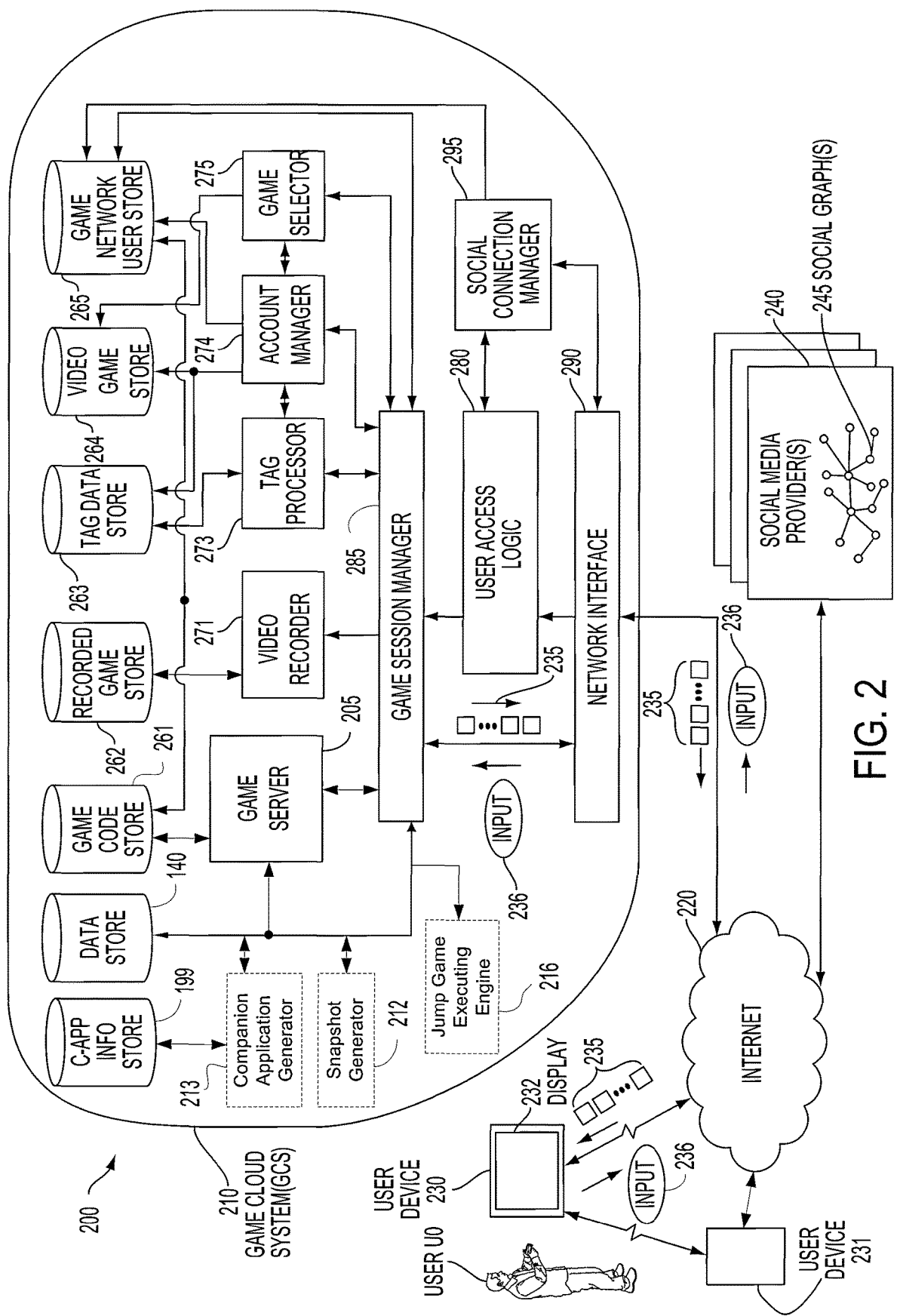
FIG. 2 illustrates a system diagram for enabling access and playing of gaming applications in a game cloud system (GCS), and implementation of a location based companion interface supporting game play of a corresponding user, in accordance with one embodiment of the present disclosure.

FIG. 2 illustrates a system diagram 200 for enabling access and playing of gaming applications stored in a game cloud system (GCS) 210, in accordance with an embodiment of the disclosure. Generally speaking, game cloud system GCS 210 may be a cloud computing system operating over a network 220 to support a plurality of users. Additionally, GCS 210 is configured to save snapshots generated during game plays of a gaming application of multiple users, wherein a snapshot can be used to initiate an instance of the gaming application for a requesting user beginning at a point in the gaming application corresponding to the snapshot. For example, snapshot generator 212 is configured for generating and/or capturing snapshots of game plays of one or more users playing the gaming application. The snapshot generator 212 may be executing external or internal to game server 205. In addition, GCS 210 through the use of snapshots enables a user to navigate through a gaming application, and preview past and future scenes of a gaming application. Further, the snapshots enable a requesting user to jump to a selected point in the video game through a corresponding snapshot to experience the game play of another user. Also, GCS may be configured to present secondary content within a peripheral zone that is outside of an active zone of a VR viewing environment associated with a user 5 as implemented through an HMD (not shown), wherein the active zone presents main content. For example, the secondary content may be presented in a companion interface providing information supporting the game play of the user 5 playing a gaming application as displayed in the VR viewing environment. More particularly, system 200 includes GCS 210, one or more social media providers 240, and a user device 230, all of which are connected via a network 220 (e.g., internet). One or more user devices may be connected to network 220 to access services provided by GCS 210 and social media providers 240.

In one embodiment, game cloud system 210 includes a game server 205, a video recorder 271, a tag processor 273, and account manager 274 that includes a user profile manager, a game selection engine 275, a game session manager 285, user access logic 280, a network interface 290, and a social media manager 295. GCS 210 may further include a plurality of gaming storage systems, such as a game state store, random seed store, user saved data store, snapshot store, which may be stored generally in datastore 140. Other gaming storage systems may include a game code store 261, a recorded game store 262, a tag data store 263, video game data store 264, and a game network user store 265. In one embodiment, GCS 210 is a system that can provide gaming applications, services, gaming related digital content, and interconnectivity among systems, applications, users, and social networks. GCS 210 may communicate with user device 230 and social media providers 240 through social media manager 295 via network interface 290. Social media manager 295 may be configured to relate one or more friends. In one embodiment, each social media provider 240 includes at least one social graph 245 that shows user social network connections.

User $U_0$ is able to access services provided by GCS 210 via the game session manager 285, wherein user $U_0$ may be representative of user 5 of FIG. 1. For example, account manager 274 enables authentication and access by user $U_0$ to GCS 210. Account manager 274 stores information about member users. For instance, a user profile for each member user may be managed by account manager 274. In that manner, member information can be used by the account manager 274 for authentication purposes. For example, account manager 2274 may be used to update and manage user information related to a member user. Additionally, game titles owned by a member user may be managed by account manager 274. In that manner, gaming applications stored in data store 264 are made available to any member user who owns those gaming applications.

In one embodiment, a user, e.g., user $U_0$, can access the services provided by GCS 210 and social media providers 240 by way of user device 230 through connections over network 220. User device 230 can include any type of device having a processor and memory, wired or wireless, portable or not portable. In one embodiment, user device 230 can be in the form of a smartphone, a tablet computer, or hybrids that provide touch screen capability in a portable form factor. One exemplary device can include a portable phone device that runs an operating system and is provided with access to various applications (apps) that may be obtained over network 220, and executed on the local portable device (e.g., smartphone, tablet, laptop, desktop, etc.).

User device 230 includes a display 232 that acts as an interface for user $U_0$ to send input commands 236 and display data and/or information 235 received from GCS 210 and social media providers 240. Display 232 can be configured as a touch-screen, or a display typically provided by a flat-panel display, a cathode ray tube (CRT), or other device capable of rendering a display. Alternatively, the user device 230 can have its display 232 separate from the device, similar to a desktop computer or a laptop computer. In still another alternative embodiment, user device 230 can have an HMD providing display capabilities to present main content in an active zone of a VR viewing environment and secondary content in a peripheral zone outside of the active zone. Additional devices 231 (e.g., device 11 of FIG. 1A) may be available to user $U_0$ for purposes of implementing a location based companion interface.

In one embodiment, user device 130 is configured to communicate with GCS 210 to enable user $U_0$ to play a gaming application. In some embodiments, the GCS 210 may include a plurality of virtual machines (VMs) running on a hypervisor of a host machine, with one or more virtual machines configured to execute a game processor module utilizing the hardware resources available to the hypervisor of the host. For example, user $U_0$ may select (e.g., by game title, etc.) a gaming application that is available in the video game data store 264 via the game selection engine 275. The gaming application may be played within a single player gaming environment or in a multi-player gaming environment. In that manner, the selected gaming application is enabled and loaded for execution by game server 205 on the GCS 210. In one embodiment, game play is primarily executed in the GCS 210, such that user device 230 will receive a stream of game video frames 235 from GCS 210, and user input commands 236 for driving the game play is transmitted back to the GCS 210. The received video frames 235 from the streaming game play are shown in display 232 of user device 230. In other embodiments, the GCS 210 is configured to support a plurality of local computing devices supporting a plurality of users, wherein each local computing device may be executing an instance of a gaming application, such as in a single-player gaming application or multi-player gaming application. For example, in a multi-player gaming environment, while the gaming application is executing locally, the cloud game network concurrently receives information (e.g., game state data) from each local computing device and distributes that information accordingly throughout one or more of the local computing devices so that each user is able to interact with other users (e.g., through corresponding characters in the video game) in the gaming environment of the multi-player gaming application. In that manner, the cloud game network coordinates and combines the game plays for each of the users within the multi-player gaming environment.

In one embodiment, after user $U_0$ chooses an available game title to play, a game session for the chosen game title may be initiated by the user $U_0$ through game session manager 285. Game session manager 285 first accesses game state store in data store 140 to retrieve the saved game state of the last session played by the user $U_0$ (for the selected game), if any, so that the user $U_0$ can restart game play from a previous game play stop point. Once the resume or start point is identified, the game session manager 285 may inform game execution engine in game processor 201 to execute the game code of the chosen game title from game code store 261. After a game session is initiated, game session manager 285 may pass the game video frames 235 (i.e., streaming video data), via network interface 290 to a user device, e.g., user device 230.

During game play, game session manager 285 may communicate with game processor 201, recording engine 271, and tag processor 273 to generate or save a recording (e.g., video) of the game play or game play session. In one embodiment, the video recording of the game play can include tag content entered or provided during game play, and other game related metadata. Tag content may also be saved via snapshots. The video recording of game play, along with any game metrics corresponding to that game play, may be saved in recorded game store 262. Any tag content may be saved in tag data stored 263.

During game play, game session manager 285 may communicate with game processor 201 of game server 205 to deliver and obtain user input commands 236 that are used to influence the outcome of a corresponding game play of a gaming application. Input commands 236 entered by user $U_0$ may be transmitted from user device 230 to game session manager 285 of GCS 210. Input commands 236, including input commands used to drive game play, may include user interactive input, such as including tag content (e.g., texts, images, video recording clips, etc.). Game input commands as well as any user play metrics (how long the user plays the game, etc.) may be stored in game network user store. Select information related to game play for a gaming application may be used to enable multiple features that may be available to the user.

Because game plays are executed on GCS 210 by multiple users, information generated and stored from those game plays enable any requesting user to experience the game play of other users, particularly when game plays are executed over GCS 210. In particular, snapshot generator 212 of GCS 210 is configured to save snapshots generated by the game play of users playing gaming applications through GCS 210. In the case of user $U_0$, user device provides an interface allowing user $U_0$ to engage with the gaming application during the game play. Snapshots of the game play by user $U_0$ is generated and saved on GCS 210. Snapshot generator 212 may be executing external to game server 205 as shown in FIG. 2, or may be executing internal to game server 205 as shown in FIG. 1A.

In addition, the information collected from those game plays may be used to generate contextually relevant information provided to user $U_0$ in a corresponding companion application. For example, as previously introduced, companion application generator 213 is configured for implementing a location based companion interface that is configured to support game play of the user $U_0$, wherein the companion interface includes contextually relevant information (e.g., messaging, assistance information, offers of assistance, etc.) that is generated based a location of a character in the game play of user $U_0$. Companion application generator 213 may be executing external to game server 205 as shown in FIG. 2, or may be executing internal to game server 205 as shown in FIG. 1A. In these implementations, the contextually relevant information may be delivered over a network 220 to the user device 231 for display of the companion application interface, including the contextually relevant information. In another embodiment, the companion application generator 213 may be local to the user (e.g., implemented within user device 231) and configured for both generating and displaying the contextually relevant information. In this implementation, the user device 231 may be directly communicating with user device 230 over a local network (or through an external network 220) to implement the companion application interface, wherein the user device 231 may deliver location based information to the user device 231, and wherein device 230 is configured for generating and displaying the companion application interface including the contextually relevant information.

Further, user device 230 is configured to provide an interface that enables the jumping to a selected point in the gaming application using a snapshot generated in the game play of user $U_0$ or another user. For example, jump game executing engine 216 is configured for accessing a corresponding snapshot, instantiate an instance of the gaming application based on the snapshot, and execute the gaming application beginning at a point in the gaming application corresponding to the snapshot. In that manner, the snapshot enables the requesting user to jump into the game play of the corresponding user at the point corresponding to the snapshot. For instance, user $U_0$ is able to experience the game play of any other user, or go back and review and/or replay his or her own game play. That is, a requesting user, via a snapshot of a corresponding game play, plays the gaming application using the characters used in and corresponding to that game play. Jump game executing engine 216 may be executing external to game server 205 as shown in FIG. 2, or may be executing internal to game server 205 as shown in FIG. 1A.

FIGS. 3-9 are described within the context of a user playing a gaming application as displayed in a VR viewing environment (e.g., as implemented in an HMD), wherein secondary information is presented in a peripheral zone that is outside of an active zone presenting main content, and wherein attention of the user is directed to the peripheral zone when new information is available. In general, the gaming application may be any interactive game that responds to user input. In some embodiments, the information is provided within a location based companion interface that is configured to support game play of a user.

Figure 3A:
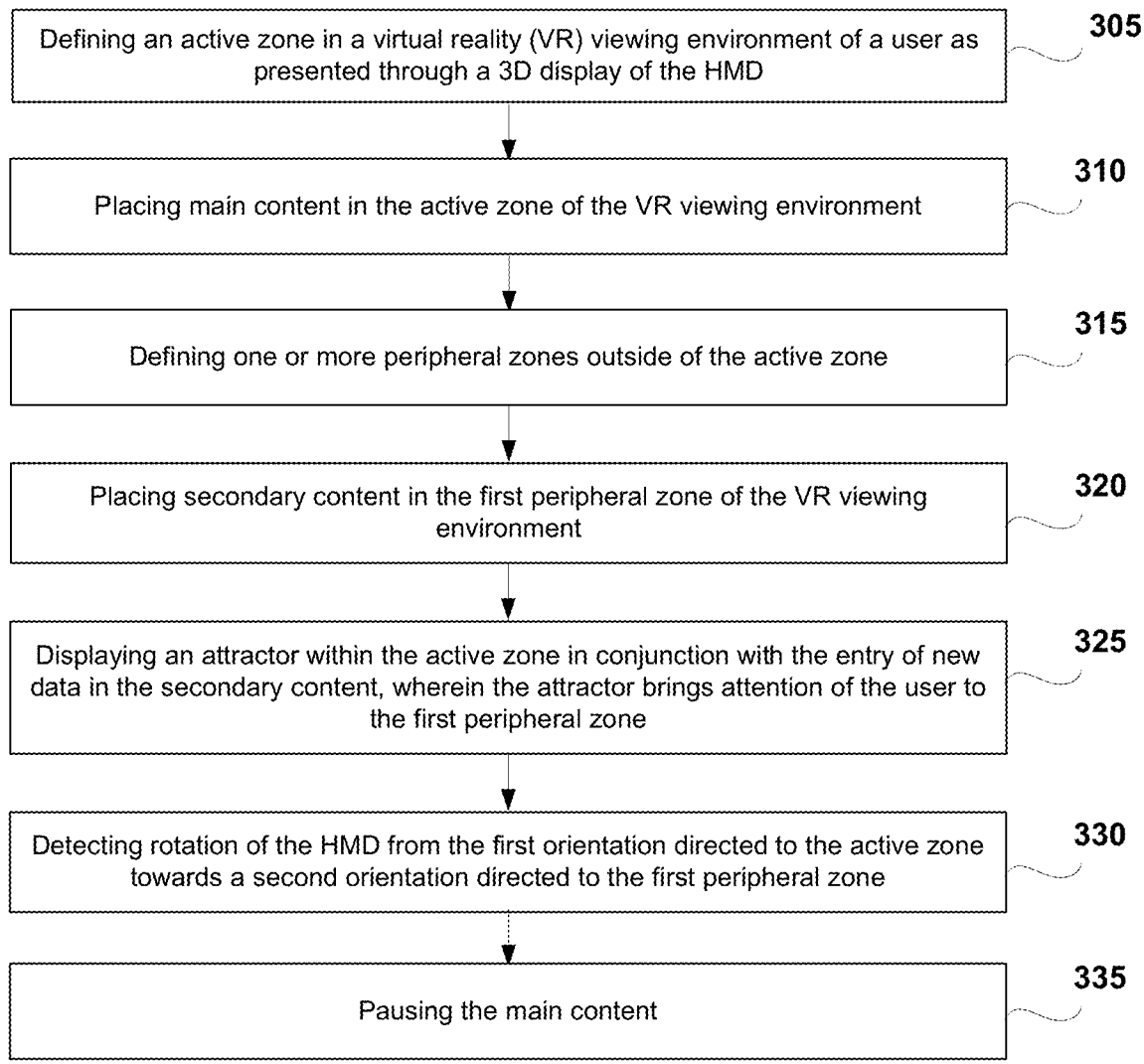
FIG. 3A is a flow diagram illustrating steps in a method for providing data and/or information in a VR viewing environment as implemented in an HMD, wherein the data and/or information is located in a peripheral zone of the corresponding user, and wherein attention of the user is directed to the peripheral zone when new information or data is available for viewing, in accordance with one embodiment of the present disclosure.

With the detailed description of the various modules of the gaming server and client device communicating over a network, a method for providing secondary content (e.g., data and/or information) in a VR viewing environment is now described in relation to flow diagram 300A of FIG. 3A, in accordance with one embodiment of the present disclosure. In some embodiments, the secondary content is provided within a companion interface that is configured to support game play of a user playing a gaming application in a VR viewing environment (e.g., as implemented by an HMD). For example, the method of flow diagram 300 may be performed at least in part by the companion application generator 213 or 113 of FIGS. 1A-1D and 2.

Embodiments of the present invention as disclosed in FIG. 3A may be implemented at a back-end game server, while other embodiments of the present invention are well suited for implementation within a local user system including a game processor configured for executing a gaming application and providing secondary content in support of a game play of a user. For example, a companion interface may be implemented within a local and isolated system, or may be generated by a back-end game server over another network and used for generation and presentation of secondary content.

At 305, the method includes defining an active zone in a VR viewing environment of a user as presented through a 3D display of an HMD. In one embodiment, the VR viewing environment is associated with a physical orientation of the user within a physical environment, wherein the HMD takes cues from the orientation (e.g., viewing orientation) of the user to determine which portion of the VR viewing environment should be displayed. For example, by establishing a 3D physical coordinate system based on an initial state of orientation for the user, a virtual 3D physical coordinate system can also be established. As an illustration, 0 degrees may correspond between the physical and virtual coordinate systems, such that when the orientation of the user is at 0 degrees, the HMD displays a view of the VR viewing environment that is also at 0 degrees. As the user rotates his head (i.e., viewing orientation), the VR viewing environment as displayed in the HMD also rotates.

At 310, the method includes placing main content in the active zone of the VR viewing environment. In one implementation, the VR viewing environment is configured to include a main viewing area in the active zone. For example, a 2D screen may be configured within the active zone to display 2D content as the main content, such as video content (e.g., movie, etc.), 2D gaming applications (e.g., legacy video games, current video games designed for 2D display), etc.

Within the VR viewing environment, the active zone remains unchanged and continually presents the main content. As such, as the orientation of the user changes away from the active zone, the content displayed in the HMD of the VR viewing environment may be different from the main content, and may include various other data. For example, the 2D screen presenting the main content may be placed within an overall VR environment, such as a park setting, downtown city setting, outdoor setting, indoor setting, etc. The overall VR environment may be displayed in the HMD as the orientation of the user rotates through the physical environment, such that the user at first views the main content and then will be viewing the surrounding VR viewing environment as the orientation changes.

At 315, the method includes defining one or more peripheral zones outside of the active zone. The peripheral zones may be located just outside of the active zone, and may not be viewable, or slightly viewable (e.g., overlap), within a typical field of view (FOV) of the user when the user is viewing the main content in the active zone. That is, the active zone may closely correspond with the FOV of the user. In that manner, the user may comfortably change his or her orientation to bring the peripheral zone into view within the VR viewing environment, as displayed in the HMD.

In one embodiment, the peripheral zones do not include the main content, and instead may present other various content. In particular, at 320, the method includes placing secondary content in at one peripheral zone of the VR viewing environment. The secondary content is different than the main content and may support the main content. For example, the secondary content may provide additional information related to the main content (e.g., information about an actor in a movie presented as main content, information about a game character within the game play of a user, etc.). In one embodiment, the secondary content includes data and/or information presented in a companion interface supporting game play of the user playing a gaming application in a VR environment as viewed through the HMD. The companion interface is described more fully below with respect to FIG. 3B.

As the user is focusing on the main content, many times the user is unaware of the presence of the secondary content in one or more peripheral zones. The secondary content may be interesting and/or useful to the user. For example, within the context of playing a gaming application, the secondary content may provide assistance towards progressing the game play (e.g., providing tips on beating the boss as the user is currently battling the boss). Embodiments of the present invention help bring the attention of the user to the secondary content presented in one or more peripheral zones. In particular, at 325, the method includes displaying an attractor within the active zone in conjunction with the entry of new data in the secondary content. The attractor is presented simultaneous with the main content.

Further, the attractor is presented in a manner to bring attention of the user to the peripheral zone containing the secondary content. For example, the attractor may be displayed in a different plane than the main content, in one embodiment. In another embodiment, the attractor may be actively moving within the FOV of the user to catch the attention of the user. In still another embodiment, the attractor is displayed having a color that is distinct from the main content, or is immediately identifiable as indicating secondary content is available. In still another example, the attractor may be presented in an eye catching manner (e.g., bold colors, bold outline, flashing, etc.).

In still another embodiment, the attractor can be one or more icons, wherein each icon indicates what kind of content is being presented in the peripheral zone. Ideally, the icon is easy to parse at a glance, so that the user is able to discern the icon and know what type of secondary content is available for viewing. For example, a lightbulb icon can indicate that the secondary content includes a tip. In another example, a skull and crossbones icon may indicate that information particular to a boss (e.g., useful for beating the boss) is provided in a peripheral zone as secondary content. In still another example, a paper with a folded corner icon may indicate that secondary content is available in the peripheral zone and includes a note left by a friend. Still other icons with associations to types of secondary content are supported and contemplated.

At 330, the method includes detecting rotation of the HMD from a first orientation directed to the active zone towards a second orientation directed to the first peripheral zone. That is, the user is focusing on the main content, and as such, is oriented in the first orientation within the physical environment. Upon awareness of the secondary content through the use of the attractor, the user may wish to view the secondary content, and as such changes his or her orientation in order to view the secondary content in the peripheral zone of the VR viewing environment. For example, the head of the user is rotated to a second orientation, and correspondingly the HMD is rotated from the first orientation to the second orientation, as the HMD is firmly attached to the head. In particular, the secondary content is displayed as the rotation of the HMD reaches a second orientation that is directed to the first peripheral zone in the VR viewing environment. The secondary content may include new data, or newly presented data, or data that is of interest to the user. The secondary content is displayed within a FOV of the user as presented through the HMD.

At 335, the main content is paused. In particular, in the second orientation, the HMD is displaying the secondary content within the VR viewing environment, and the main content may not be visible or is at least less visible to the user within the viewing environment as displayed by the HMD. Furthermore, the attention of the user is now focused on the secondary content. In that case, if the main content is continuing its play or display (e.g., executing the gaming application, playing the video content—such as a movie—, etc.) the user may not be aware of what is being displayed in the main content while focusing on the secondary content. For example, while the user is battling a boss at the end of a level in a gaming application, the user may choose to view secondary content. By automatically pausing the execution of the gaming application, instead of continuing the battle of the boss as presented in the active zone (with the likely death of the character battling the boss) that is now at least partially outside of the FOV of the user, the main content is paused.

In one embodiment, the main content is continued or unpaused when the orientation of the user is again returned back towards a position capable of viewing the main content (e.g., towards the first orientation). In particular, the method includes detecting rotation of the HMD from the second orientation to the first orientation. For example, the user has finished viewing the secondary content and wishes to again view and/or interact with the main content. As such, the viewer may rotate his head (and the HMD) back to a position capable of viewing the main content (e.g., back to the first orientation). At that point, the main content is unpaused, or resumed (e.g., execution of the gaming application is resumed, the video content is resumed, the playing of a movie is resumed, etc.). In particular, the resumed main content is displayed in the active zone that is now within the FOV of the user, as presented through the 3D display of the HMD.

Figure 3B:
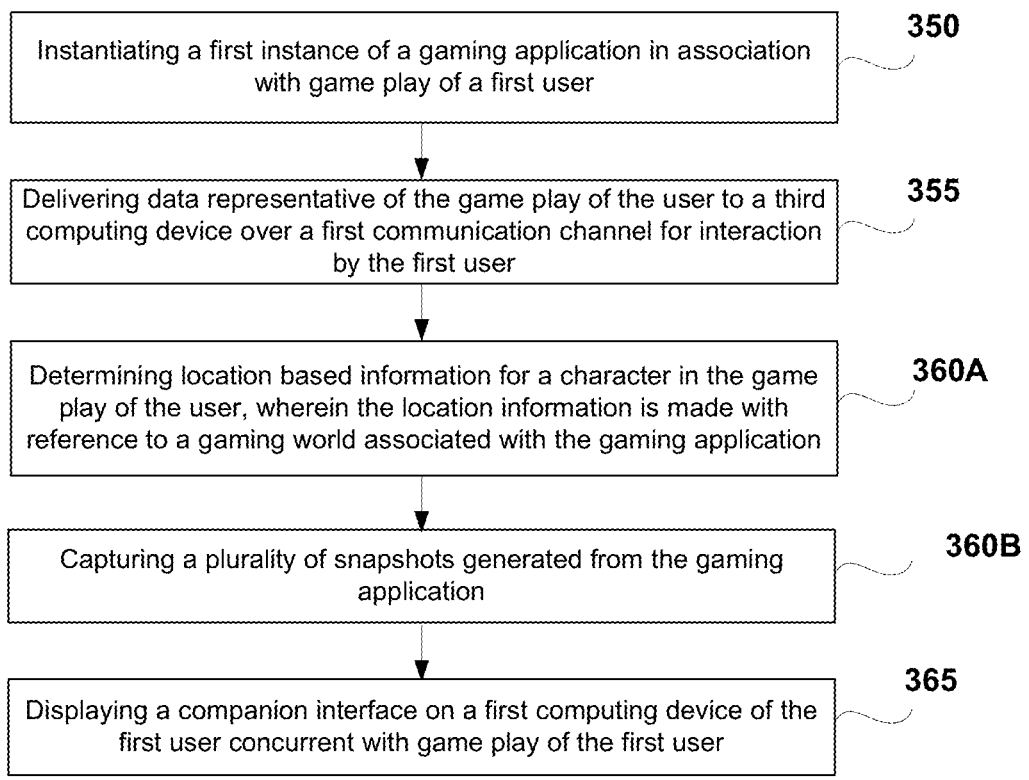
FIG. 3B is a flow diagram illustrating steps in a method for generating a location based companion interface of a comp application supporting game play of a corresponding user, wherein the companion interface is located in a peripheral zone of a corresponding user, in accordance with one embodiment of the present disclosure.

FIG. 3B is a flow diagram 300B illustrating steps in a method for generating a location based companion interface of a companion application (e.g., generating a companion interface) supporting game play of a corresponding user, wherein the companion interface is located in a peripheral zone of a corresponding user, in accordance with one embodiment of the present disclosure. That is, secondary content presented in the peripheral zone of a VR viewing environment associated with a user includes the companion interface. Flow diagram 300B includes operations for executing a gaming application and generating location based information of game play of a user playing the gaming application. Further, though flow diagram 300B is described from the standpoint of a back-end server providing the companion interface as secondary content, other embodiments are well suited to providing the companion interface local to the user with slight modifications to flow diagram 300B, as previously described.

In particular, at operation 350 the method includes instantiating a first instance of a gaming application in association with game play of a user. As previously described, in one embodiment, the instance of the gaming application can be executed locally at a client device of the user. In other embodiments, the instance of the gaming application may be executing at a back-end game executing engine of a back-end game server, wherein the server may be part of a cloud game network or game cloud system. At operation 355, the method includes delivering data representative of the game play of the user to a computing device (e.g., third computing device) over a first communication channel for interaction by the user (e.g., first user). The communication channel may be implemented for example through a network, such as the internet. As such, rendered images may be delivered for display at the third computing device, wherein the rendered images are generated by the instance of the gaming application in response to input commands made in association with game play of the user.

At operation 360A, the method includes determining location based information for a character in the game play of the user. In particular, the location based information is made with reference to a location of a character in the game play of the user in a gaming world associated with the gaming application. The location based information may be included within snapshots that are generated, captured and/or stored during the game play of the user, as previously described. For example, each snapshot includes metadata and/or information generated with reference to the location of the character. In one embodiment, the metadata and/or information is configured to enable execution of an instance of the gaming application beginning at a point in the gaming application corresponding to the snapshot (e.g., beginning at a jump point corresponding to the state of the game play when the snapshot was captured, which reflects the location of the character in the game play). In one embodiment, a snapshot may be used to instantiate a jump game that is a quest/challenge. For instance, the snapshot includes location based information of the game play, and game state data that defines the state of the game play at the corresponding point (e.g., game state data includes game characters, game objects, object attributes, graphic overlays, assets of a character, skill set of the character, history of task accomplishments within the gaming application for the character, current geographic location of the character in the gaming world, progress through the gaming application in the game play of the user, current status of the game play of the character, etc.), such that the game state data allows for generation of the gaming environment that existed at the corresponding point in the game play. The snapshot may include user saved data used to personalize the gaming application for the user, wherein the data may include information to personalize the character (e.g., shape, look, clothing, weaponry, game difficulty, game level, character attributes, etc.) in the game play. The snapshot may also include random seed data that is relevant to the game state, as previously described.

In particular, at operation 360B the method includes capturing a plurality of snapshots generated from the gaming application during the game play of the user. The information contained within the snapshots may be used for the generation of secondary content. As such, additional content related to the gaming application, and in some cases relying on execution of the gaming application, may be newly generated. This increases the amount of content and the scope of content related to a gaming application for interaction by one or more users.

At 365, the method includes generating a companion interface providing features in support of the game play of the first user (e.g., including contextually relevant information), and enables the user, or any other viewer, to access information in real time that is generally helpful to user while playing the gaming application. In particular, the companion interface is presented or provides secondary content within the VR viewing environment as implemented through an HMD concurrent with the game play of the user. For example, the companion interface is generated in real time, and delivered concurrent with the game play of the user, such that the information provided through the interface supports the game play of the user. In that manner, the game play of the user may be augmented with the secondary content (e.g., information provided by the companion interface).

Figure 4B:
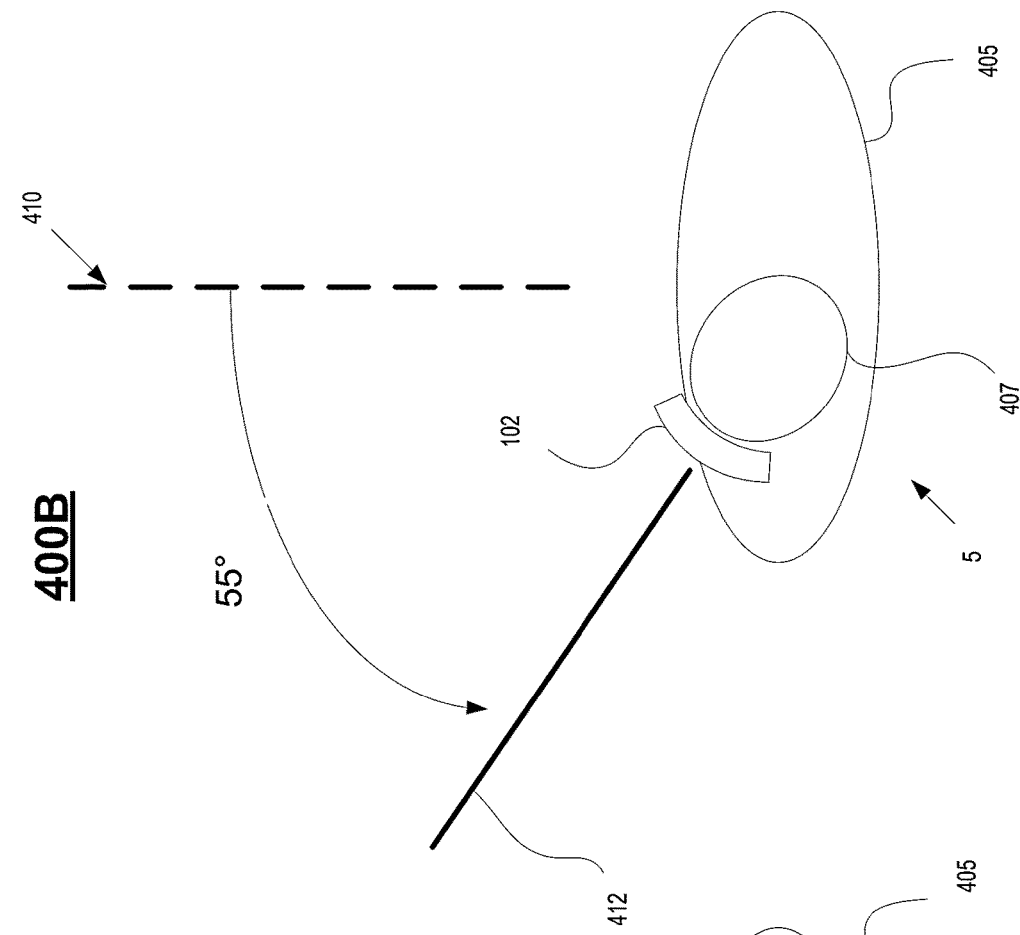
FIG. 4B is a body state diagram illustrating the rotation of a head of a user through a maximum range of rotation, wherein the user is viewing a VR viewing environment through an HMD, in accordance with one embodiment of the present disclosure.
Figure 4A:
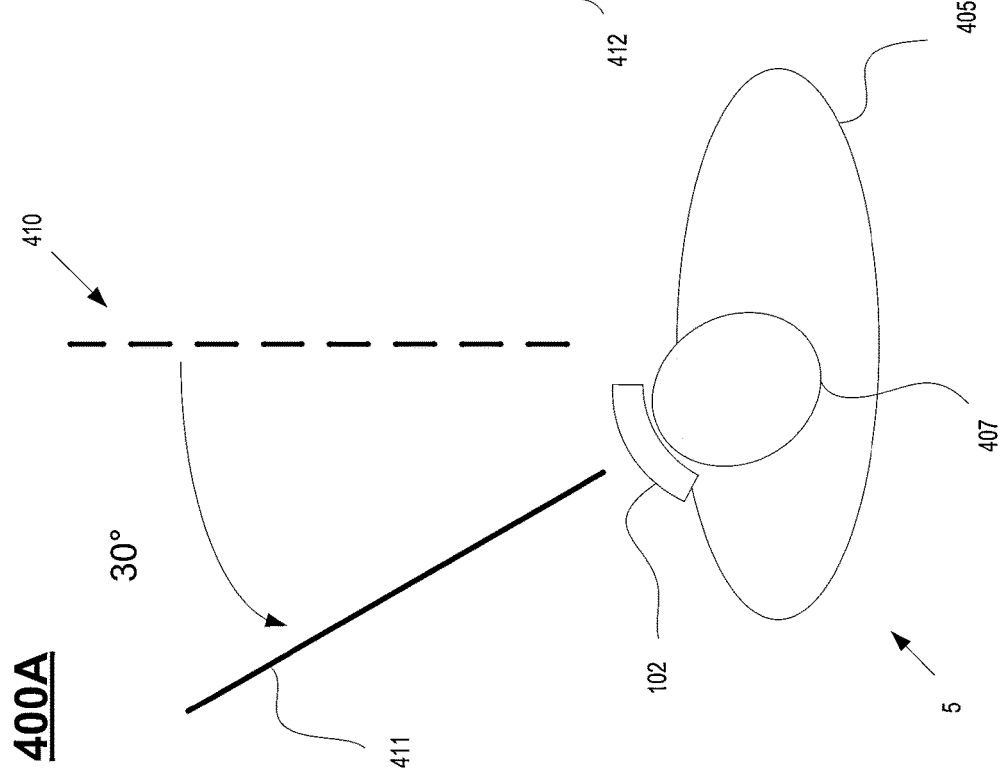
FIG. 4A is a body state diagram illustrating the rotation of a head of a user through a comfortable range of rotation, wherein the user is viewing a VR viewing environment through an HMD, in accordance with one embodiment of the present disclosure.
Figure 4C:
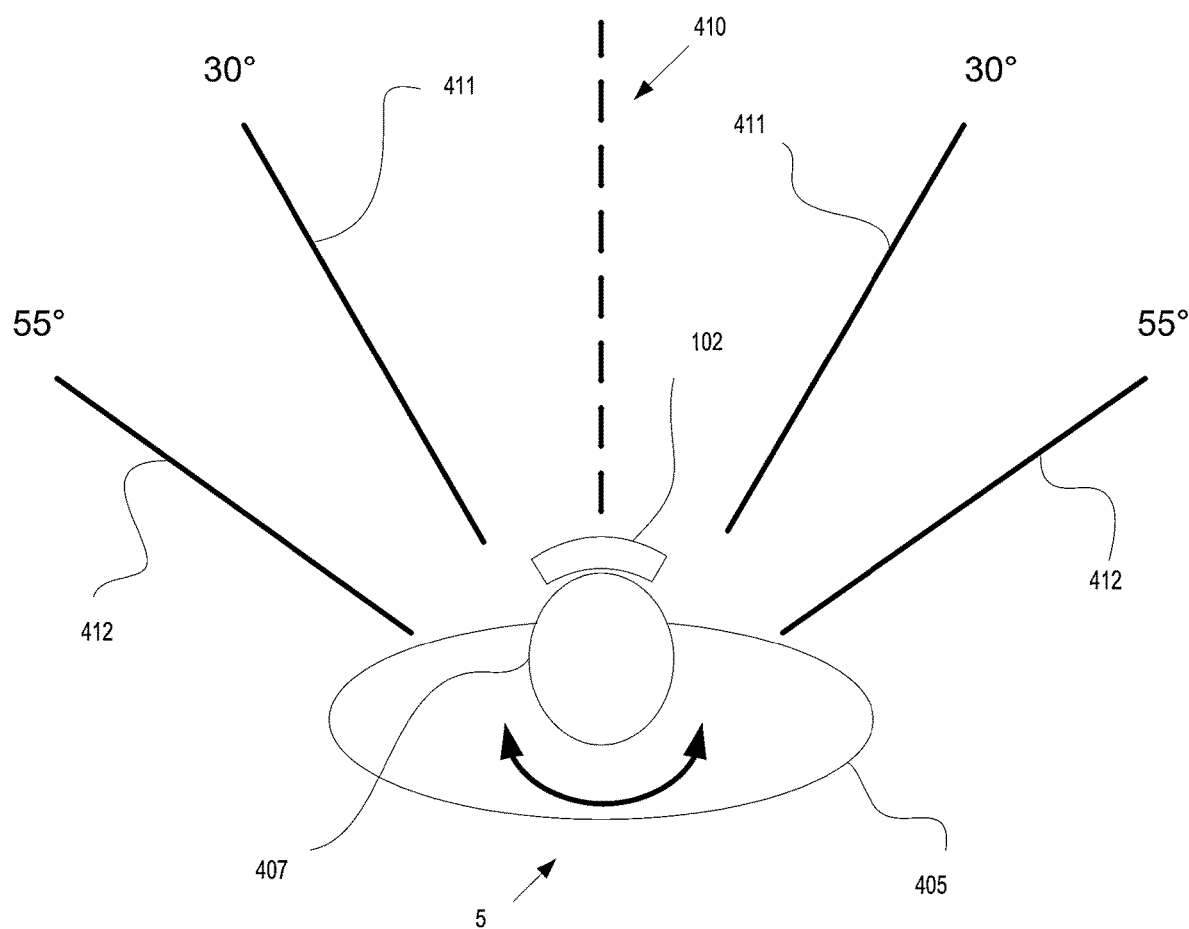
FIG. 4C illustrates the range of motion of a head of a user viewing a VR viewing environment through an HMD, wherein the range of motion shows the comfortable range of motion and the maximum range of motion of head rotation, in accordance with one embodiment of the present disclosure.

FIGS. 4A-4C are diagrams illustrating a user viewing a VR viewing environment through an HMD at various orientations of the user within a physical environment. In particular, head rotation is described in the diagrams, wherein head rotation is associated with rotation of the HMD to determine movement within the VR viewing environment (e.g., what is displayed). Although FIGS. 4A-4C show the rotation of the head of the user to the left (e.g., horizontally) when viewing the VR viewing environment, the same principles described herein are applicable to rotation of the head of the user to the right, or up, or down, or any combination thereof (e.g., horizontal and/or vertical). As previously described, camera sensors and/or motion sensors are used for tracking movement of the head and/or HMD in order to determine user interface (UI) movement inside a VR viewing environment as implemented through the HMD, as previously described. For example, the camera sensors are configured to provide tracking using light sensors on the headset of the HMD. In one implementation, the camera sensors are configured to track the headset of the HMD approximately 1,000 times per second in order to provide a seamless user experience. In that manner, the back of the head as well as the front of the head can be tracked. In other embodiments, eye tracking technology is used to detect rotation of the head.

FIG. 4A is a body state diagram 400A illustrating the rotation of a head 407 of a user 5 through a comfortable range of rotation, in accordance with one embodiment of the present disclosure. The user is viewing a VR viewing environment through an HMD 102, in accordance with one embodiment of the present disclosure. In one implementation, a 100 degree FOV is presented within the HMD 102. Vertical axis 410 shows the 0 degree or neutral orientation of the user, such that the head 407 of user is pointed in a direction along axis 410. In addition, the orientation of the head 407, and correspondingly the HMD 102, determines what is presented in the VR viewing environment. That is, the orientation of the viewer (e.g., user) within the VR viewing environment is based on the orientation of the user within the physical environment. As shown in FIG. 4A, the head 407 of user 5 is comfortably rotated to the left by an angle of 30 degrees. Line 411 is pointed in a direction that is offset from vertical axis 410 by 30 degrees. Note in FIGS. 4A-4C, the body 405 of the user 5 remains in the same position, such that while the head 407 is rotated, the body 405 does not rotate. HMD 102 will display the VR viewing environment with the corresponding orientation that is offset from the neutral orientation along axis 410.

FIG. 4B is a body state diagram 400B illustrating the rotation of the head 407 of user 5 through a maximum range of rotation, wherein the user is viewing a VR viewing environment through HMD 102, in accordance with one embodiment of the present disclosure. In particular, the head 407 of user 5 rotated to the left by an angle of 55 degrees, which represents an exemplary maximum rotation capable for user 5 without a rotation of body 405. Of course, the maximum rotation for a particular user may be more or less than that represented in FIG. 4B, wherein the rotation presented in FIG. 4B is used for illustration purposes. Line 412 is pointed in a direction in the physical environment that is offset from vertical axis 410 by 55 degrees. HMD 102 will display the VR viewing environment with the corresponding orientation that is offset from the neutral orientation along axis 410.

FIG. 4C illustrates the possible range of motion of a head 407 of user 5 viewing a VR viewing environment through an HMD 102, wherein the range of motion shows the comfortable range of motion and the maximum range of motion of head rotation as illustrated in FIGS. 4A-4B, in accordance with one embodiment of the present disclosure. As shown, lines 411 are offset from vertical axis 410 by 30 degrees, wherein the vertical axis is associated with a neutral (e.g., 0 degree) orientation of the head 407 and HMD 102, and represents comfortable head rotation to the left and to the right. Also shown, lines 412 are offset from vertical axis 410 by 55 degrees, and represents the exemplary maximum head rotation to the left and to the right. As shown in FIG. 4C, without rotation of the body 405, typical positions of the head 407 and HMD 102 are presumed available along with corresponding presentations of the VR viewing environment within the HMD 102.

Figure 5A:
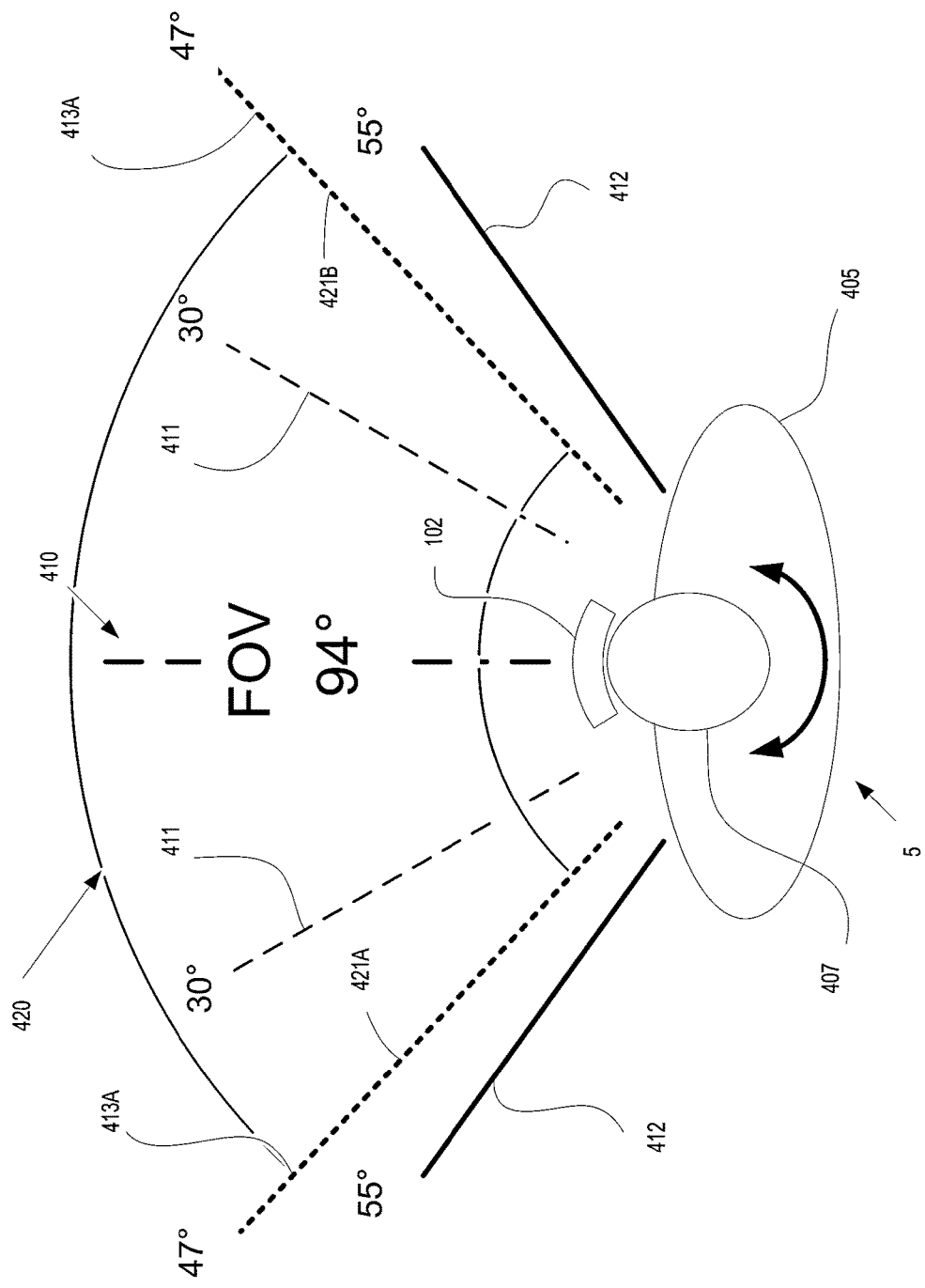
FIG. 5A illustrates a field of view (FOV) of a user interposed over a range of motion of a head of a user viewing a VR viewing environment through an HMD, wherein the orientation of the head is facing directly forwards (e.g., 0 degrees), and wherein the range of motion shows the comfortable range of motion and the maximum range of motion of head rotation, in accordance with one embodiment of the present disclosure.

FIG. 5A illustrates a field of view (FOV) 420 of a user interposed over a typical range of motion of a head 407 of a user 5 viewing a VR viewing environment through an HMD 102, in accordance with one embodiment of the present disclosure. The typical range of motion of the head 407 (and correspondingly the HMD 102) was previously introduced in FIG. 4C, wherein body 405 remains fixed in orientation. As shown in FIG. 5A, the orientation of the head is facing forwards in a neutral orientation (e.g., 0 degrees), and wherein the range of motion shows the comfortable range of motion (e.g., 0 to 30 degrees left and right) and the maximum range of motion of head rotation (e.g., 0 to 55 degrees left and right).

In particular, the FOV 420 of the user is approximately 94 degrees. This may translate to a similar virtual FOV range within the VR viewing environment (e.g., in a one-to-one relationship between the physical environment and the VR viewing environment). That is, a corresponding view of the VR viewing environment is displayed in HMD 102 corresponding to the orientation of user 5 and orientation of FOV 420. As such, the FOV 420 spans between lines 413A, both of which are located approximately 47 degrees (e.g., left and right) from the vertical axis 410, previously introduced. For example, the leftmost edge 421A of FOV 420 is located on line 413A, and is offset approximately 47 degrees to the left of vertical axis 410. Also, the rightmost edge 421B of FOV 420 is located on line 413A, and is offset approximately to the right of vertical axis 410 by approximately 47 degrees.

Figure 5B:
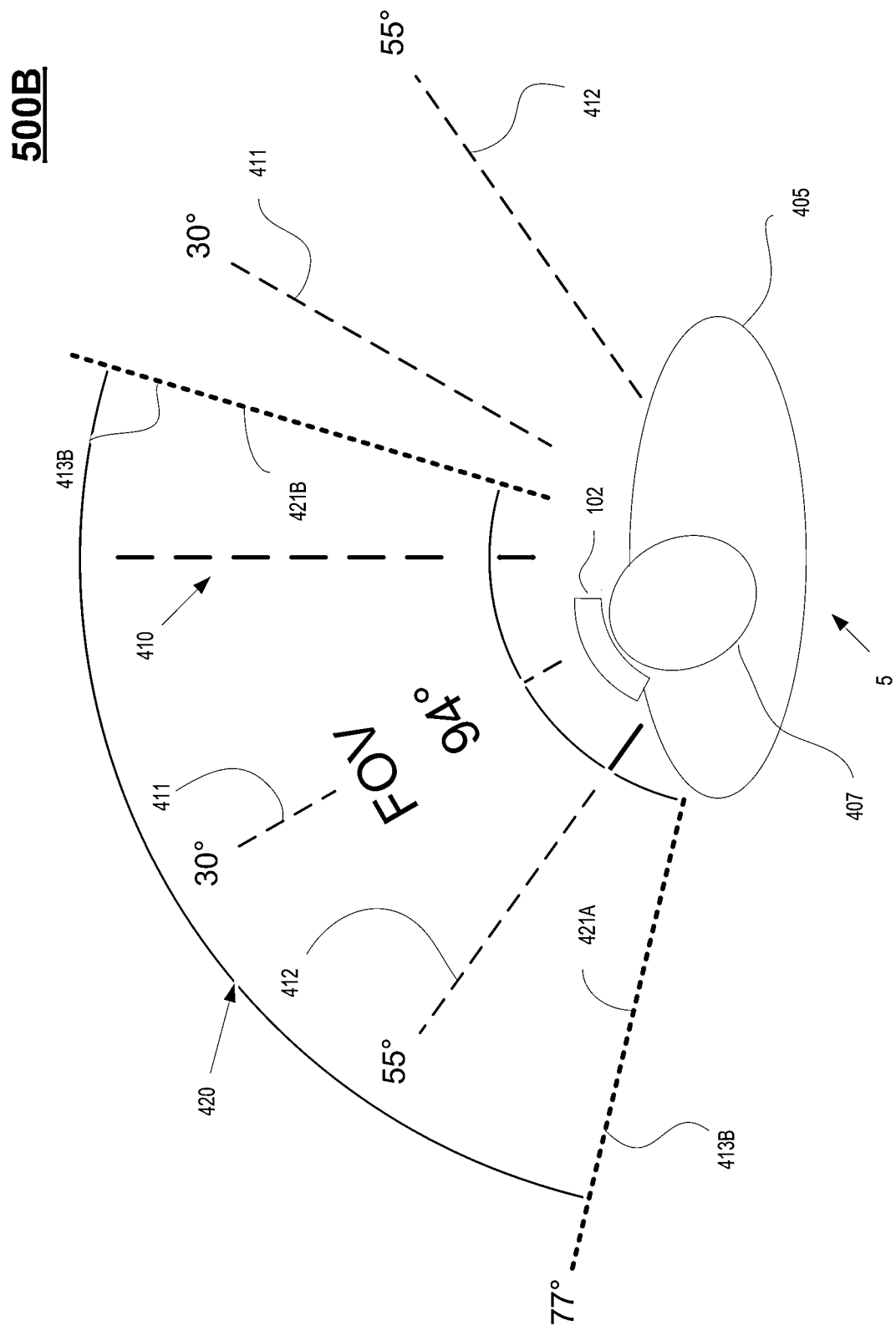
FIG. 5B illustrates a field of view (FOV) of a user interposed over a range of motion of a head of a user viewing a VR viewing environment through an HMD, wherein the orientation of the head is turned comfortably (e.g., turned 30 degrees), and wherein the range of motion shows the comfortable range of motion and the maximum range of motion of head rotation, in accordance with one embodiment of the present disclosure.

FIG. 5B illustrates the FOV 420 of user 5 interposed over a typical range of motion of a head 407 of the user viewing a VR viewing environment through an HMD 102, wherein the orientation of the head 407 is turned comfortably (e.g., turned 30 degrees), in accordance with one embodiment of the present disclosure. The typical range of motion of the head 407 (and correspondingly the HMD 102) was previously introduced in FIG. 4C, wherein body 405 remains fixed in orientation (e.g., pointed towards axis 410). As shown in FIG. 5B, the orientation of the head 407 is offset by 30 degrees from the neutral orientation (e.g., along axis 410 at 0 degrees). The typical range of motion shows the comfortable range of motion (e.g., 0 to 30 degrees left and right) and the maximum range of motion of head rotation (e.g., 0 to 55 degrees left and right), wherein the body remains in a fixed orientation (towards 0 degrees).

More particularly, the FOV 420 of user 5 is also rotated, such that the center of the FOV 420 is located along line 411, which is offset by 30 degrees from vertical axis 410. A corresponding view of the VR viewing environment is displayed in HMD 102 corresponding to the orientation of user 5 and orientation of FOV 420 shown in FIG. 5B. As such, the leftmost edge 421A of FOV 420 is located at an offset of 77 degrees to the left of vertical axis 410. The rightmost most edge 420B of FOV 420 is located at an offset of approximately 17 degrees to the right of vertical axis 410.

Figure 5C:
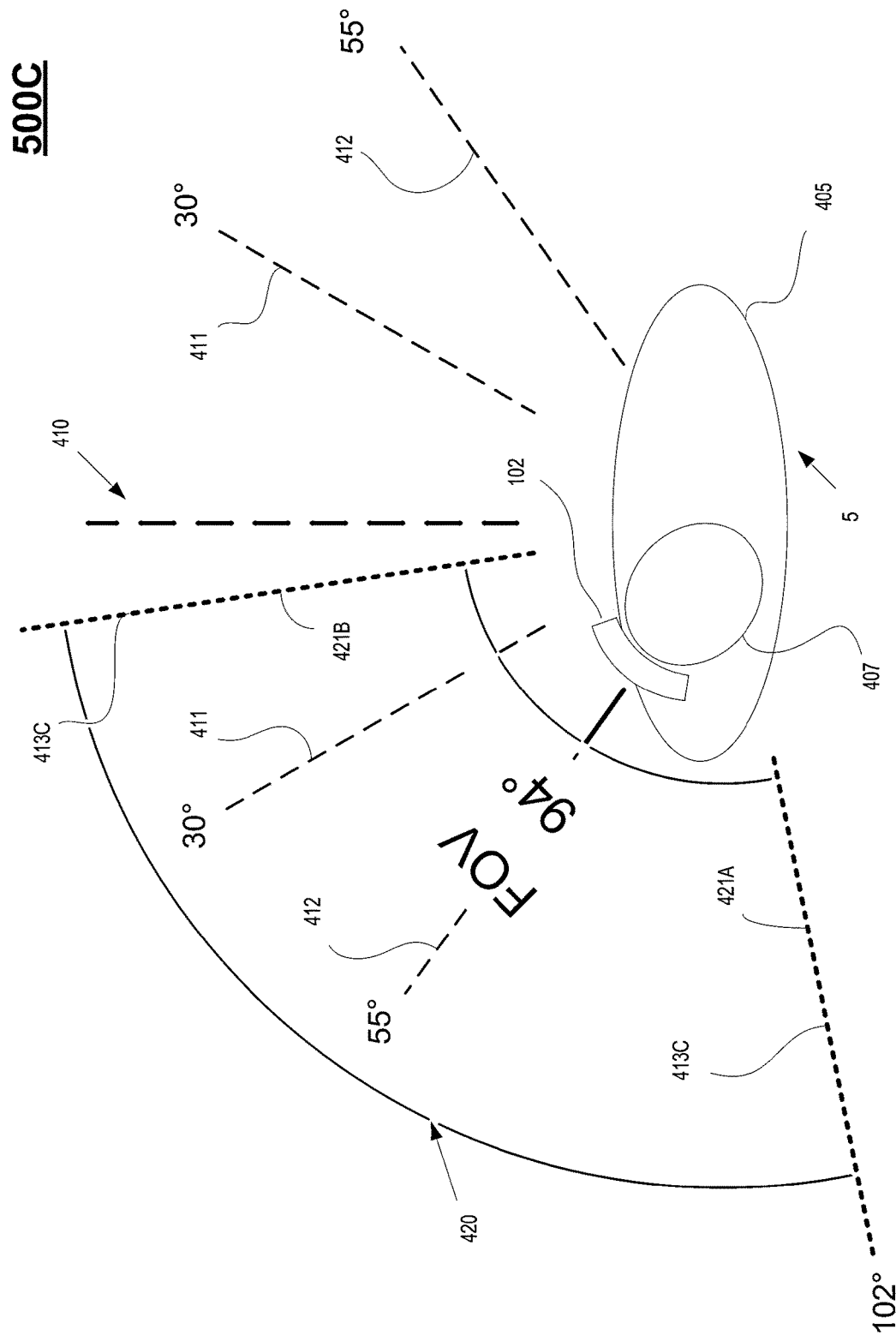
FIG. 5C illustrates a field of view (FOV) of a user interposed over a range of motion of a head of a user viewing a VR viewing environment through an HMD, wherein the orientation of the head is turned to its maximum rotation (e.g., uncomfortably turned 55 degrees), and wherein the range of motion shows the comfortable range of motion and the maximum range of motion of head rotation, in accordance with one embodiment of the present disclosure.

FIG. 5C illustrates a FOV 420 of user 5 interposed over a typical range of motion of a head 407 of the user viewing a VR viewing environment through an HMD 102, wherein the orientation of the head 407 is turned to its maximum rotation (e.g., uncomfortably turned 55 degrees, in accordance with one embodiment of the present disclosure. The typical range of motion of the head 407 (and correspondingly the HMD 102) was previously introduced in FIG. 4C, wherein body 405 remains fixed in orientation (e.g., pointed towards axis 410), and the head may be rotated through a comfortable range of motion (e.g., 0 to 30 degrees left and right) and/or through the maximum range of motion of head rotation (e.g., 0 to 55 degrees left and right).

More particularly, the FOV 420 of user 5 is also rotated, such that the center of the FOV 420 is located along line 412, which is offset by 55 degrees from vertical axis 410 to the left. A corresponding view of the VR viewing environment is displayed in HMD 102 corresponding to the orientation of user 5 and orientation of FOV 420 shown in FIG. 5C. As such, the leftmost edge 421A of FOV 420 is now located at an offset of 102 degrees to the left of vertical axis 410. The rightmost most edge 420B of FOV 420 is located at an offset of approximately 8 degrees to the left of vertical axis 410.

In one embodiment, an active zone associated with the VR viewing environment of the user is aligned with a first orientation of the HMD in a physical environment. For example, the active zone may be centered along vertical axis 410, such that while the head 407 of user is in a neutral orientation, a view of the active zone is presented by the display of the HMD 102. For example, a FOV of the user may encompass or be closely aligned with the active zone (e.g., active zone and the FOV are approximately 94 degrees). In addition, a peripheral zone (e.g., a first peripheral zone) may be aligned with a second orientation of the HMD in the physical environment. For illustration purposes only, a peripheral zone may be partially shown in FIG. 5C, and is visible when the head 407 of user 5 is turned to its maximum (e.g., to the left by 55 degrees). As previously introduced, secondary content is presented in the peripheral zone. As such, the peripheral zone is located just outside of the FOV 420 of the user 5, and may not be visible (or slightly so), when the orientation of the head 407 of the user 5 is in a neutral position (e.g., pointed towards 0 degrees). The peripheral zone becomes visible when the head is rotated away from the neutral orientation, as previously described.

Figure 5D:
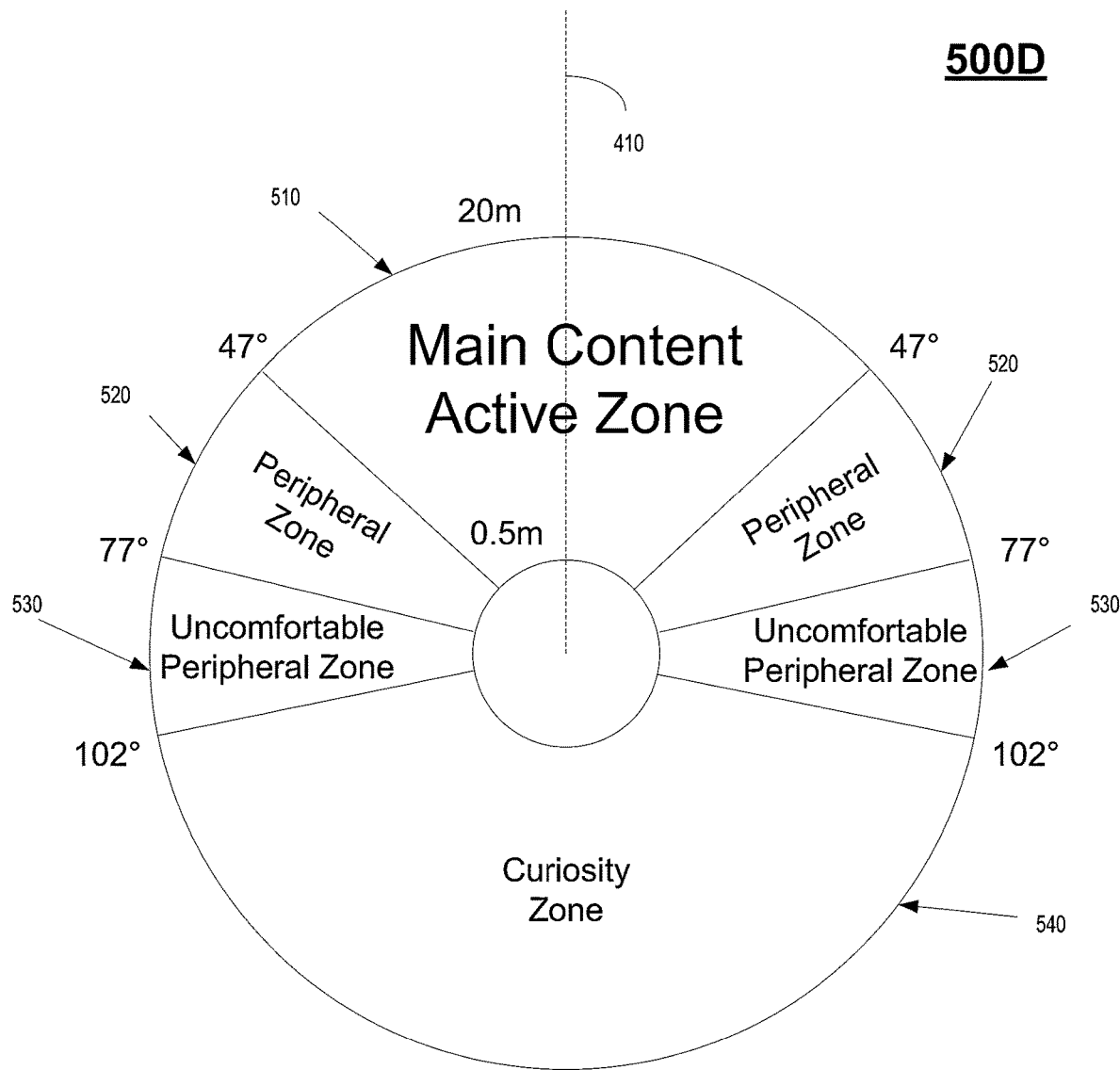
FIG. 5D is a diagram illustrating different zones in a VR viewing environment, wherein the zones are defined with respect to an orientation of a user viewing the VR viewing environment through an HMD, in accordance with one embodiment of the present disclosure.

FIG. 5D is a diagram 500D illustrating different zones in a VR viewing environment, wherein the zones are defined with respect to an orientation of a user viewing the VR viewing environment through an HMD, in accordance with one embodiment of the present disclosure. The zones are defined with respect to a typical FOV of 94 degrees, and may cover different angular ranges for other defined FOVs that are implemented. Further, the zones may have a minimum range of 0.5 meters from the center (e.g., location of user) and a maximum range of 20 meters, such as being defined within the VR viewing environment. The zones are shown with a horizontal rotation of the head 407 and correspondingly the HMD 102, but can be defined for any type of horizontal and/or vertical rotation of the head.

As shown in FIG. 5D, an active zone 510 is centered in the VR viewing environment, such as at a neutral orientation of 0 degrees, and spans approximately 94 degrees (e.g., offset by 47 degrees to the left and right of center). Main content may be presented within the active zone, such as a 2D gaming application, video content, etc. The main content may also include 3D content, including 3D gaming applications, video content, etc.

One or more peripheral zones 520 are also shown, wherein a peripheral zone is located outside of the active zone 510. In some implementations, the zones may overlap. For example, the peripheral zone 520 may be located just outside of a FOV of the user, when the user is focused on the active zone (e.g., in a neutral orientation). As shown, a peripheral zone 520 is offset from the active zone 510, and located between angles 47 and 77 degrees offset to the left of center (e.g., axis 410). Another peripheral zone 520 is offset from the active zone 510, and located between angles 47 and 77 degrees offset to the right of center (e.g., axis 410). For example, the peripheral zones may be centered at an angle offset from center by approximately 55 degrees (left and right), which represents the maximum rotation of the head 407, without also rotating the body 405.

One or more uncomfortable peripheral zones 530 are also shown, wherein zones 530 are located outside of the peripheral zones 520. As shown, a peripheral zone 530 is offset from the active zone 510, and located between angles 77 and 102 degrees offset to the left of center (e.g., axis 410). Another uncomfortable peripheral zone 530 is offset from the active zone 510, and located between angles 77 and 102 degrees offset to the right of center (e.g., axis 410). For example, the uncomfortable peripheral zones 530 may be centered at an angle offset from center by approximately 90 degrees (left and right), which represents a rotation of the head 407 that is very uncomfortable, without also rotating the body 405. In some cases, the body may be slightly rotated to bring the uncomfortable peripheral zone 530 into view in the HMD 102.

Further, a curiosity zone 540 is shown to the rear of the active zone 510. That is, the user 5 would have to turn his or her body 405 in order to rotate the HMD 102 to an orientation enabling the display of portions of the curiosity zone 540. The curiosity zone may include any type of content that may or may not be related to the main content presented in the active zone 510.

Figure 6A:
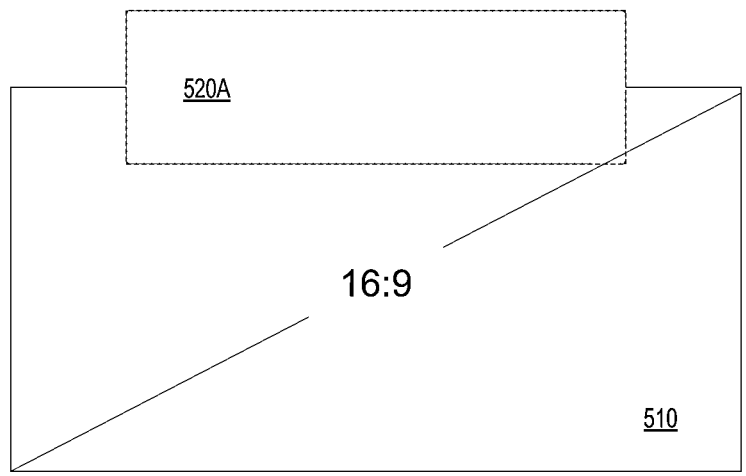
FIG. 6A illustrates an active zone of a user viewing a VR viewing environment through an HMD, wherein active zone presents main content, and wherein secondary content (e.g., as presented through a companion interface) is available in a peripheral zone outside of the active zone, wherein the peripheral zone is located above the active zone, in accordance with one embodiment of the present disclosure.
Figure 6B:
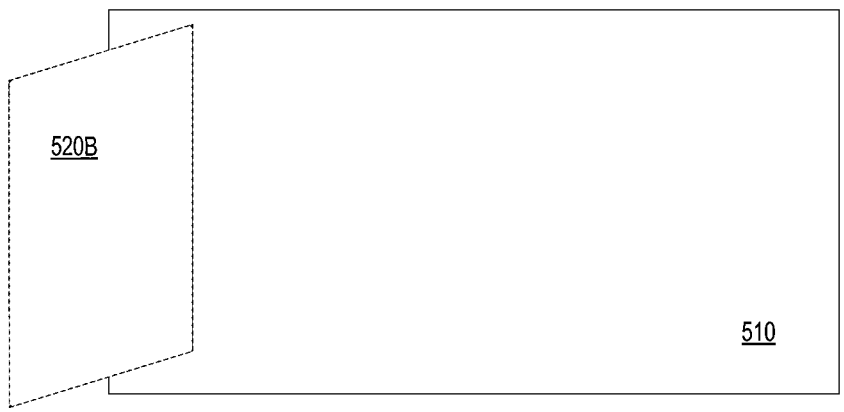
FIG. 6B illustrates an active zone of a user viewing a VR viewing environment through an HMD, wherein active zone presents main content, and wherein secondary content (e.g., as presented through a companion interface) is available in a peripheral zone outside of the active zone, wherein the peripheral zone is located to the side of the active zone, in accordance with one embodiment of the present disclosure.
Figure 6C:
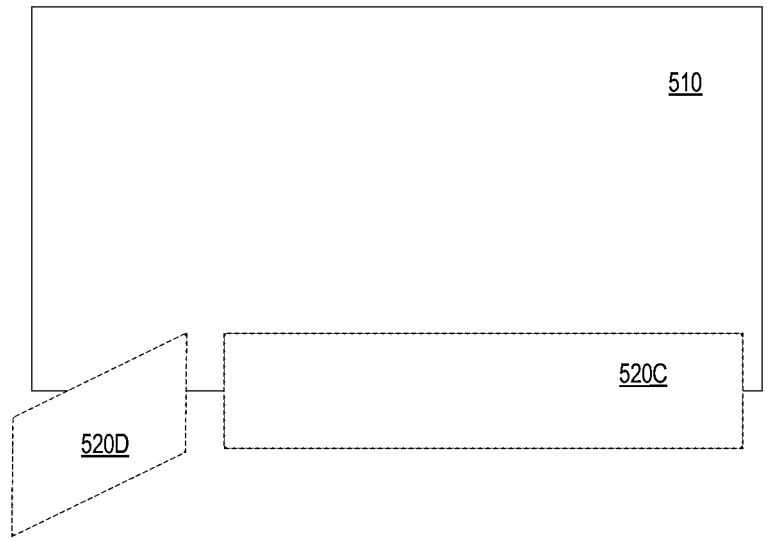
FIG. 6C illustrates an active zone of a user viewing a VR viewing environment through an HMD, wherein active zone presents main content, and wherein secondary content (e.g., as presented through a companion interface) is available in a peripheral zone outside of the active zone, wherein the peripheral zone is located below the active zone and may be configured to show one or more windows of information, in accordance with one embodiment of the present disclosure.

FIGS. 6A-6C illustrate exemplary locations of peripheral zones with respect to an active zone 510 of a user viewing a VR viewing environment through an HMD. The locations of the peripheral zones are not intended to be exhausted in FIGS. 6A-6C, and may include various locations outside of the active zone 510 in association with various horizontal and/or vertical rotations of an HMD offset from a neutral position.

In particular, FIG. 6A illustrates an active zone 510 of a user viewing a VR viewing environment through an HMD, wherein the active zone presents main content, and wherein secondary content is shown in a peripheral zone, in accordance with one embodiment of the present disclosure. As an illustration, the active zone 510 may be displayed with an aspect ratio of 16:9, but also supports other aspect ratios, wherein the aspect ratio defines the relationship between a width and height (e.g., of a viewing area, display area, display, etc.). As shown, a peripheral zone 520A is located outside of the active zone 510. In this case, the peripheral zone 520A is located above the active zone 510. For example, the user may rotate or tilt the head upwards to bring into view the peripheral zone 520A of the VR viewing environment as displayed in the HMD. As previously described, secondary content (e.g., as presented through a companion interface) is available for presentation in the peripheral zone 520A.

FIG. 6B illustrates an active zone 510 of a user viewing a VR viewing environment through an HMD, wherein the active zone presents main content, and wherein secondary content is available in a peripheral zone, in accordance with one embodiment of the present disclosure. As shown, a peripheral zone 520B is located outside of the active zone 510. In this case, the peripheral zone 520B is located to the side of the active zone 510, and more particularly to the left of active zone 510. In other cases, the peripheral zone may be located to the right of the active zone 510. For example, the user may rotate the head to the left to bring into view the peripheral zone 520B of the VR viewing environment as displayed in the HMD. As previously described, secondary content (e.g., as presented through a companion interface) is available for presentation in the peripheral zone 520B.

FIG. 6C illustrates an active zone 510 of a user viewing a VR viewing environment through an HMD, wherein active zone presents main content, and wherein secondary content is available in one or more peripheral zones, in accordance with one embodiment of the present disclosure. As shown peripheral zone 520C is located outside of active zone 510. In this case, the peripheral zone 520C is located below and to the right of the active zone 510. For example, the user may rotate or tilt the head downwards and slightly to the right to bring into view the peripheral zone 520C of the VR viewing environment as displayed in the HMD. As previously described, secondary content (e.g., as presented through a companion interface) is available for presentation in the peripheral zone 520C. In addition, another peripheral zone 520D is also located outside of active zone 510, wherein in this case, zone 520D is located below and to the left of active zone 510. For example, the user may rotate or tilt the head downwards and slightly to the left to bring into view the peripheral zone 520D of the VR viewing environment as displayed in the HMD. As previously described, other or additional secondary content (e.g., as presented through a companion interface) is available for presentation in the peripheral zone 520D. As such, different secondary content is made available to the user in zones 520C and 52D, as shown in FIG. 6C.

Figure 7A:
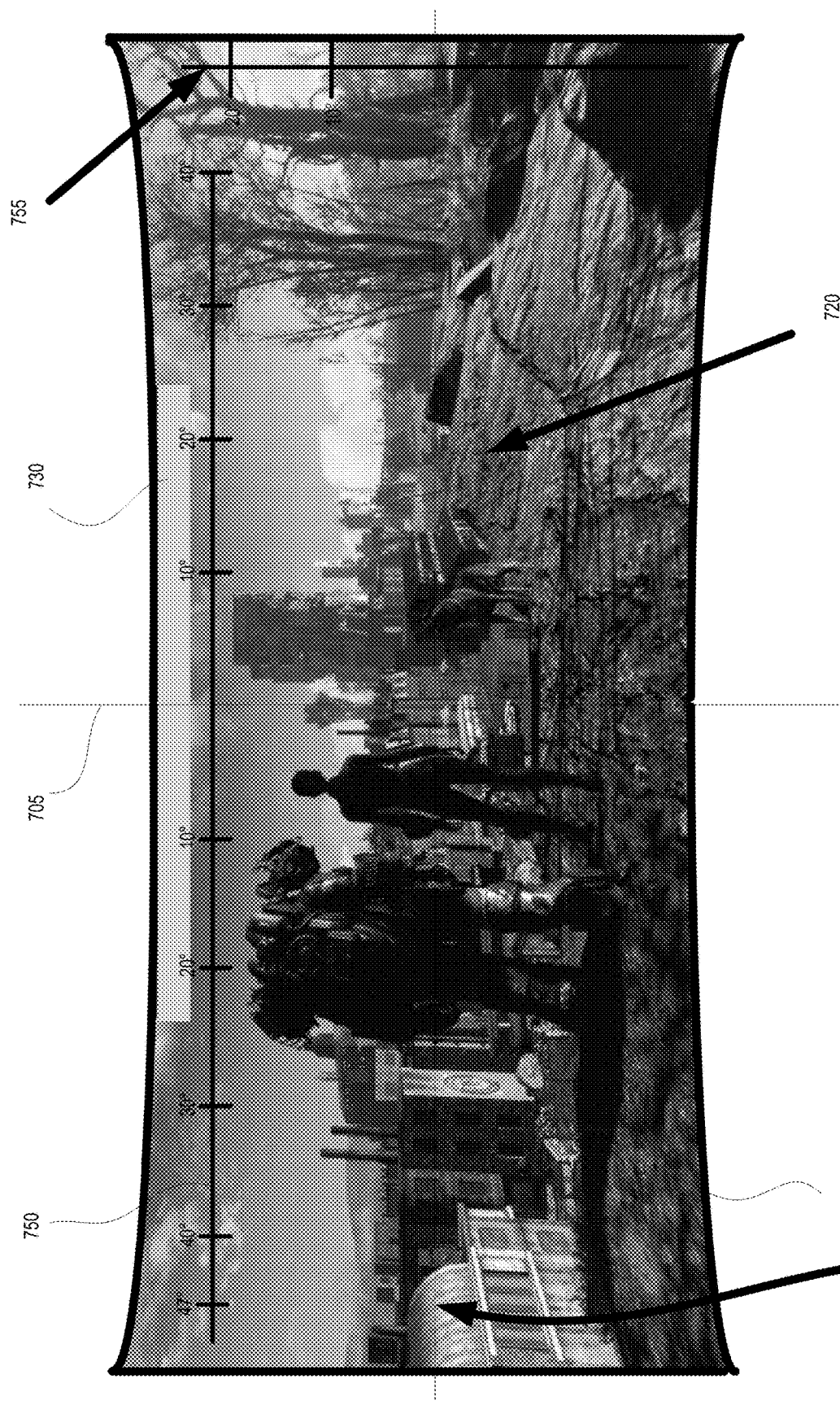
FIG. 7A illustrates a FOV of a user viewing a VR viewing environment through an HMD, wherein the FOV includes an active zone of a user presenting main content, and wherein the FOV includes an edge of a peripheral zone located outside and above the active zone, wherein the peripheral zone may be configured to present secondary content (e.g., as presented through a companion interface), in accordance with one embodiment of the present disclosure.
Figure 7B:
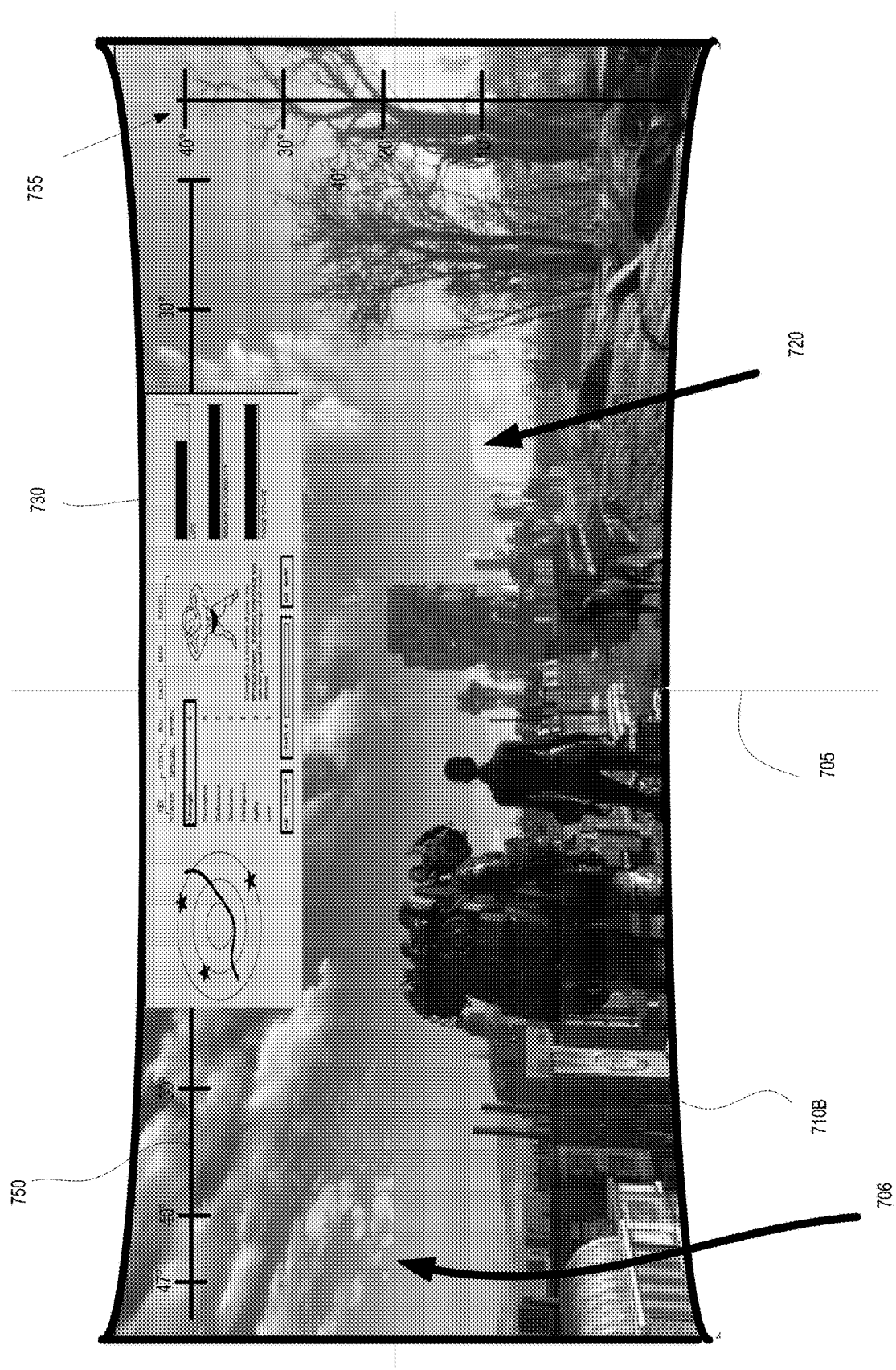
FIG. 7B illustrates a FOV of a user viewing a VR viewing environment through an HMD, wherein the head of the user is titled upwards such that the FOV of the user includes portions of an active zone of a user presenting main content, and also includes a peripheral zone located outside and above the active zone, wherein the peripheral zone may be configured to present secondary content (e.g., as presented through a companion interface), in accordance with one embodiment of the present disclosure.
Figure 7C:
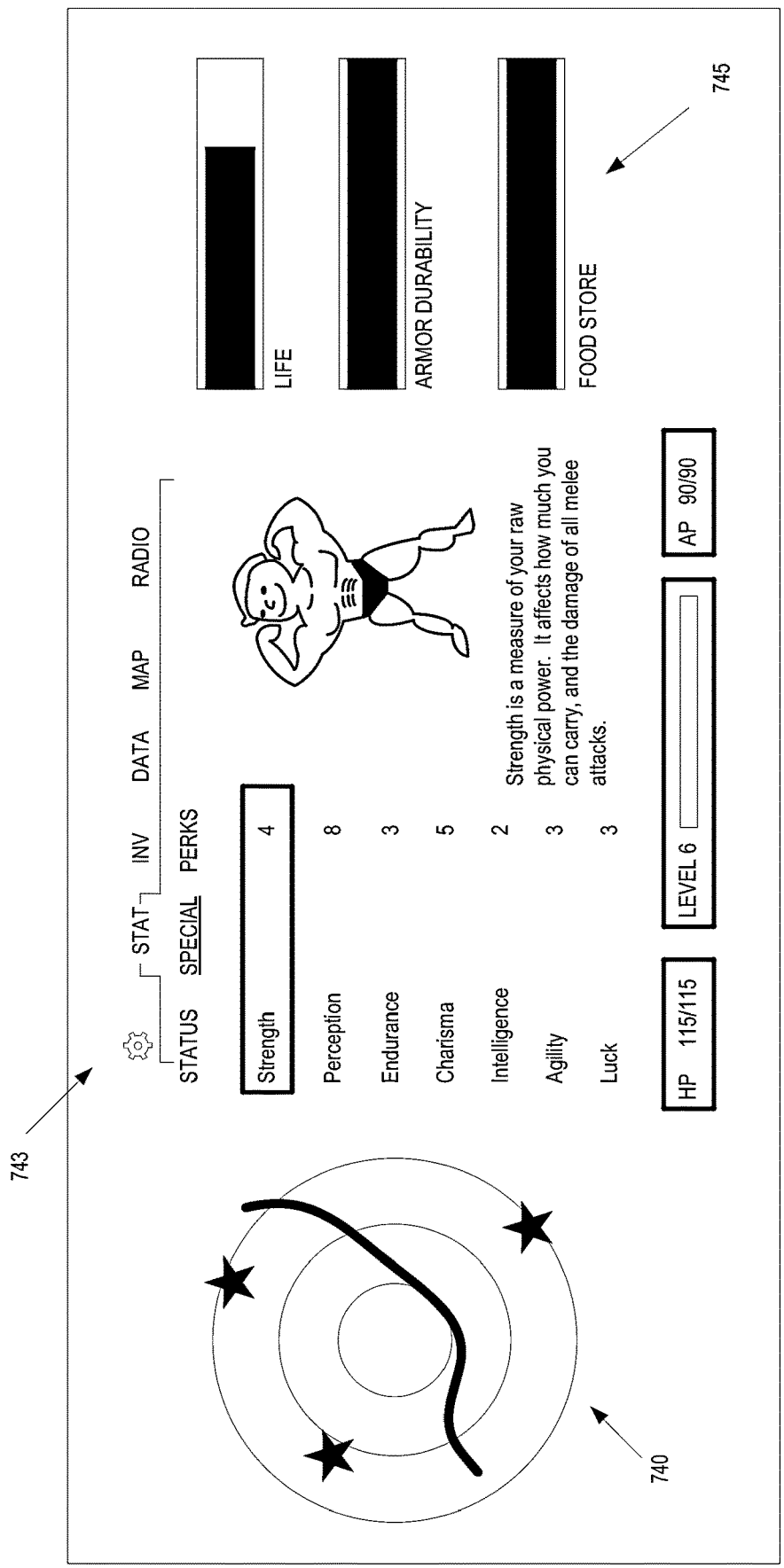
FIG. 7C illustrates the secondary content first introduced in FIG. 7B that is presented in a peripheral zone of a user that is viewing a VR viewing environment through an HMD, wherein the secondary content may be presented through a companion interface that is supporting game play of the user, in accordance with one embodiment of the present disclosure.

FIGS. 7A-7C combined illustrate a FOV of a user viewing a VR viewing environment through an HMD as the head of the user is rotated to view secondary content, in embodiments. In particular, the secondary content is located in a peripheral zone 730 that is located above the main content as presented within the VR viewing environment. The secondary content becomes viewable when the user directs his or her attention (e.g., rotates the HMD) to the peripheral zone 730.

In particular, FIG. 7A illustrates a FOV 710A of a user viewing a VR viewing environment through an HMD, wherein the FOV 710A includes an active zone of a user presenting main content 720 and may include a portion of a peripheral zone 730, in accordance with one embodiment of the present disclosure. The FOV 710A is shown with horizontal axis 706 and vertical axis 705, both of which are centered within the FOV (e.g., defining a center of the FOV).

As shown, the main content 720 includes a scene showing a female character located to the right of a weaponized character, both of which are standing on a rocky base and overlooking a city street. Off in the horizon is shown the tallest building in the scene located to the right of the female character. In addition, an angular coordinate system is defined within the main content 720 that does not change, even though the FOV showing the main content may vary. In particular, horizontal line 750 defines horizontal angles of the main content 720, as defined from a neutral orientation (e.g., 0 degrees of head rotation). In FIG. 7A, horizontal line 750 is centered about vertical axis 705, for purposes of illustration, wherein the head of the user is in a neutral position, and fully viewing the main content 720. As shown, FOV 710A horizontally spans from an angle to the left that is offset by 47 degrees from the vertical axis 705 to an angle to the right that is offset by 47 degrees from the vertical axis 705. In addition, FOV 710A spans vertically from a vertical angle that is offset upwards by approximately 30 degrees from the horizontal axis 706 and offset downwards by approximately 30 degrees from the horizontal axis 706, as shown by vertical line 755.

Furthermore, FOV 710A includes an edge of a peripheral zone 730 that is located outside and above the active zone defined by FIG. 7A to fully include the main content 720. As previously described, the peripheral zone may be configured to present secondary content (e.g., as presented through a companion interface). As shown in FIG. 7A, because the peripheral zone 730 is located outside of the active zone as displayed by the HMD, no secondary content it viewable.

FIG. 7B illustrates the FOV 710B of a user viewing a VR viewing environment through an HMD, wherein the head of the user is titled upwards from a neutral orientation such that the FOV includes portions of an active zone of a user presenting main content, and also includes all of the peripheral zone 730 located outside and above the active zone, wherein the peripheral zone may be configured to present secondary content (e.g., as presented through a companion interface), in accordance with one embodiment of the present disclosure.

As shown, the main content 720 that is displayed shows more of the sky area, and less of the female character and weaponized character. For instance, most of the rocky outcropping upon which the female character and weaponized character are standing is not shown in the FOV 710B. In addition, FOV 710B is shown with horizontal axis 706 and vertical axis 705, both of which are centered within the FOV (e.g., defining a center of the FOV). However, now the center of FOV 710B is higher (e.g., close to the top of the tallest building on horizon) than the center of FOV 710A shown in FIG. 7A (e.g., close to the right hip of the female character).

In addition, the angular coordinate system is defined within the main content 720 and remains unchanged in FIG. 7B. However, because the HMD is rotated upwards to show the peripheral zone 730, more of the vertical angles are shown in vertical line 755. For example, FOV 710B shows more of the sky at angles upwards of 40 degrees offset from the horizontal center of the main content, as shown by line 755.

In addition, peripheral zone 730 is now fully shown in FOV 710B because of the rotation of the HMD. As previously introduced, peripheral zone 730 includes secondary content. In this case, the secondary content is presented in a companion interface that supports game play of the user playing a gaming application. In particular, FIG. 7C is a more detailed illustration of the secondary content first introduced in FIG. 7B that is presented in peripheral zone 730. For example, peripheral zone 730 includes a companion interface including a radar mapping 740, showing the location of a character in a game play of the user. The character may be located at the center of the radar mapping 740 which provides a representation of a gaming world or environment of the corresponding gaming application. Mapping 740 may show directional relationships between objects in the radar mapping (e.g., direction and distance). Further, the radar mapping 740 may include objects/features located within the gaming world, and locations of characters of the user and other players.

Additional information 743 may be presented, such as statistics, inventory, data, localized mapping, radio presentation, etc. For example, the secondary content may highlight the strength of the character located at the center of mapping 740, and provide a definition of strength. Other bar data 745 (e.g., remaining life, armor durability, and food store) may also be presented within the peripheral zone 730.

Figure 8A:
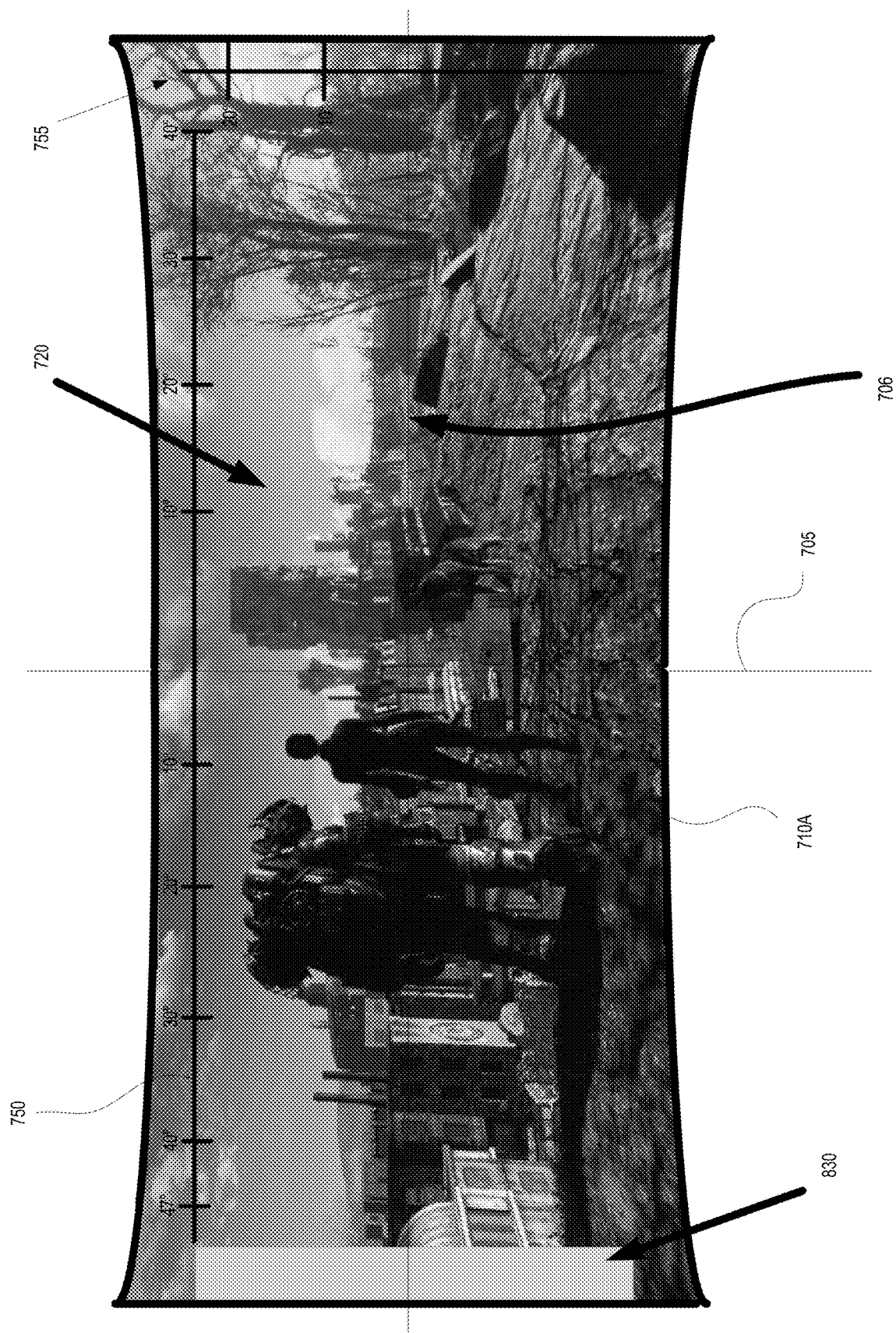
FIG. 8A illustrates a FOV of a user viewing a VR viewing environment through an HMD, wherein the FOV includes an active zone of a user presenting main content, and wherein the FOV includes an edge of a peripheral zone located outside and to the side of the active zone, wherein the peripheral zone may be configured to present secondary content (e.g., as presented through a companion interface), in accordance with one embodiment of the present disclosure.
Figure 8B:
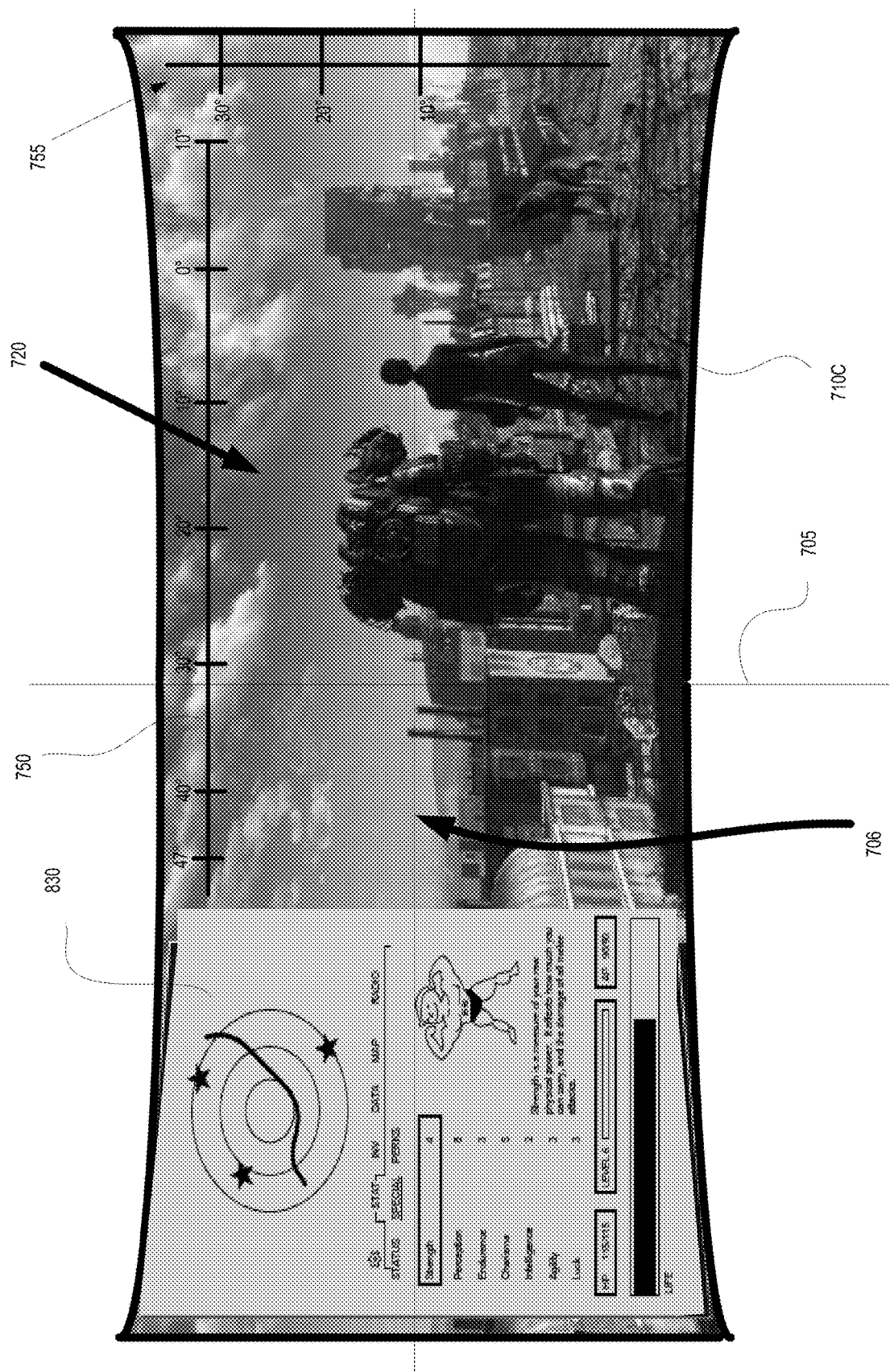
FIG. 8B illustrates a FOV of a user viewing a VR viewing environment through an HMD, wherein the head of the user is rotated to the side such that the FOV of the user includes portions of an active zone of a user presenting main content, and also includes a peripheral zone located outside and to the side of the active zone, wherein the peripheral zone may be configured to present secondary content (e.g., as presented through a companion interface), in accordance with one embodiment of the present disclosure.
Figure 8C:
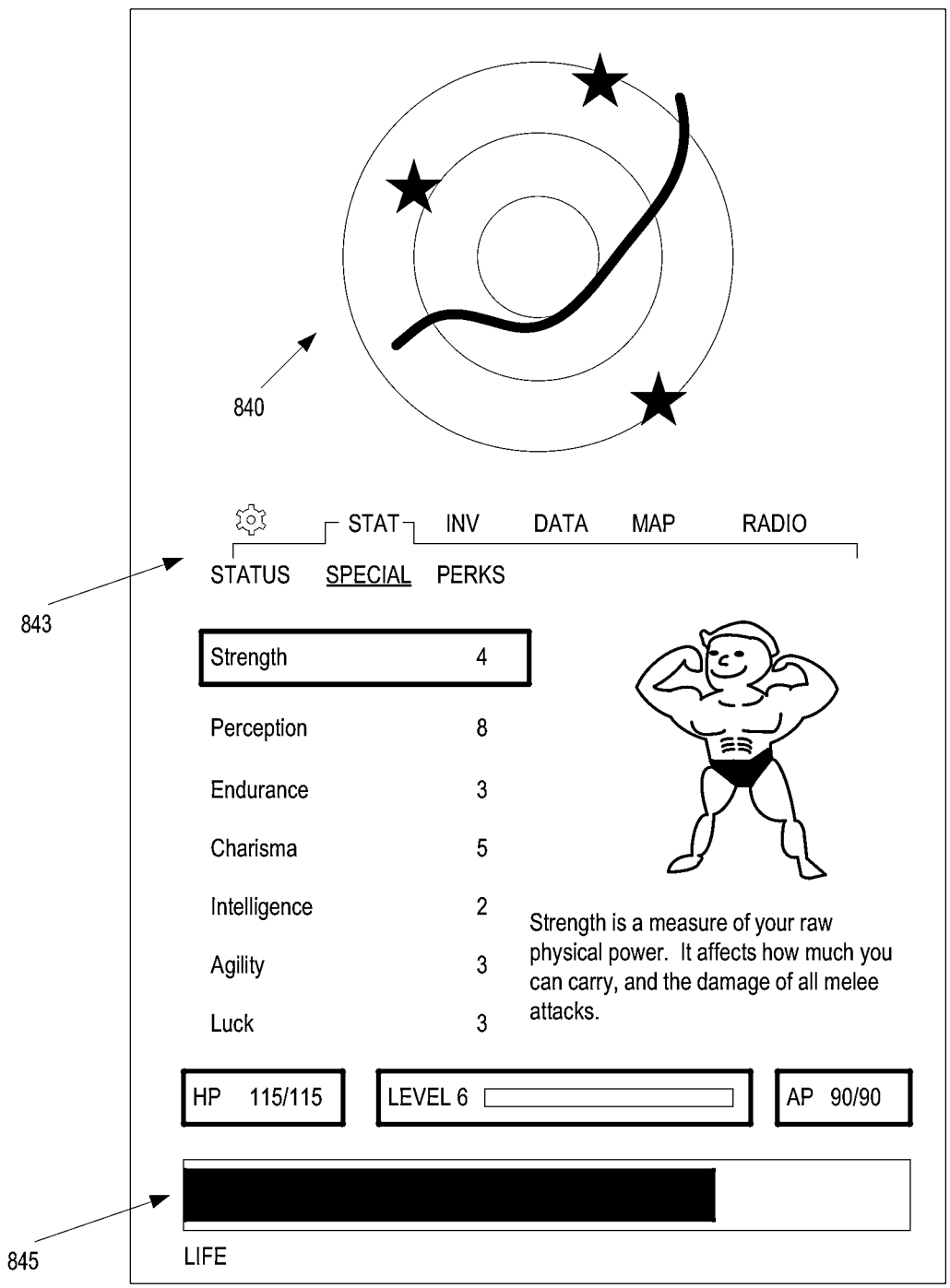
FIG. 8C illustrates the secondary content first introduced in FIG. 8B that is presented in the peripheral zone of a user that is viewing a VR viewing environment through an HMD, wherein the secondary content may be presented through a companion interface that is supporting game play of the user, in accordance with one embodiment of the present disclosure.

FIGS. 8A-8C combined illustrate a FOV of a user viewing a VR viewing environment through an HMD as the head of the user is rotated to view secondary content, in embodiments. In particular, the secondary content is located in a peripheral zone 830 that is to the left of the main content as presented within the VR viewing environment. The secondary content becomes viewable when the user directs his or her attention (e.g., rotates the HMD) to the peripheral zone 830.

In particular, FIG. 8A illustrates a FOV 710A of a user viewing a VR viewing environment through an HMD, wherein the FOV includes an active zone of a user presenting main content, and may include a portion of peripheral zone 830, in accordance with one embodiment of the present disclosure. The FOV 710A is first introduced in FIG. 7A, but now has a peripheral zone 830 to the side of the active zone presenting main content. The FOV 710A is shown with horizontal axis 706 and vertical axis 705, both of which are centered within the FOV (e.g., defining a center of the FOV located approximately to the right of the hip of the female character, and between the dog and the female character). Also, the angular coordinate system is defined within the main content 720 that does not change, as shown by horizontal line 750 and vertical line 755.

Furthermore, FOV 710A includes an edge of a peripheral zone 830 that is located outside and to the side of the active zone defined by FIG. 8A to fully include the main content 720. As previously described, the peripheral zone may be configured to present secondary content (e.g., as presented through a companion interface). For example, FOV 710A includes an edge of the peripheral zone 830 that is located to the left of the active zone presenting the main content 720. As shown in FIG. 8A, because the peripheral zone 730 is located outside of the active zone as displayed by the HMD, no secondary content it viewable.

FIG. 8B illustrates a FOV 710C of a user viewing a VR viewing environment through an HMD, wherein the head of the user is rotated to the side (e.g., to the left) from a neutral orientation, such that the FOV of the user includes portions of an active zone of a user presenting main content, and also includes all of a peripheral zone 830 located outside and to the side of the active zone, wherein the peripheral zone may be configured to present secondary content (e.g., as presented through a companion interface), in accordance with one embodiment of the present disclosure.

As shown, the main content 720 that is displayed in FIG. 8B does not show the scene located to the right of the center of the main content 720. For example, the trees previously shown in FOV 710A (and located to the right of the female character) are not shown in FOV 710C of FIG. 8B. In addition, now the center of FOV 710C is located to the left of the weaponized character, signifying a rotation of the HMD to the left and slightly upwards.

In addition, the angular coordinate system is defined within the main content 720 and remains unchanged in FIG. 8B. However, because the HMD is rotated to the left and slightly upwards to show the peripheral zone 830, the vertical center of FOV 710C is located approximately at horizontal angle 30 degrees on line 750, and the horizontal center of FOV 710C is located approximately at vertical angle 10 degrees on line 755.

In addition, peripheral zone 830 is now fully shown in FOV 710C because of the rotation of the HMD. As previously introduced, peripheral zone 730 includes secondary content. In this case, the secondary content is presented in a companion interface that supports game play of the user playing a gaming application. In particular, FIG. 8C is a more detailed illustration of the secondary content first introduced in FIG. 8B that is presented in peripheral zone 830. For example, peripheral zone 830 includes a companion interface including a radar mapping 840, showing the location of a character in a game play of the user. Mapping 840 may be similar to mapping 740 of FIG. 7C, as they contain the same information, but are presented in different peripheral zones. The character may be located at the center of the radar mapping 840 which provides a representation of a gaming world or environment of the corresponding gaming application. Mapping 840 may show directional relationships between objects in the radar mapping (e.g., direction and distance). Further, the radar mapping 840 may include objects/features located within the gaming world, and locations of characters of the user and other players.

Additional information 843 may be presented, such as statistics, inventory, data, localized mapping, radio presentation, etc. For example, the secondary content may highlight the strength of the character located at the center of mapping 840, and provide a definition of strength. Other bar data 845 (e.g., remaining life, etc.) may also be presented within the peripheral zone 830.

Figure 9:
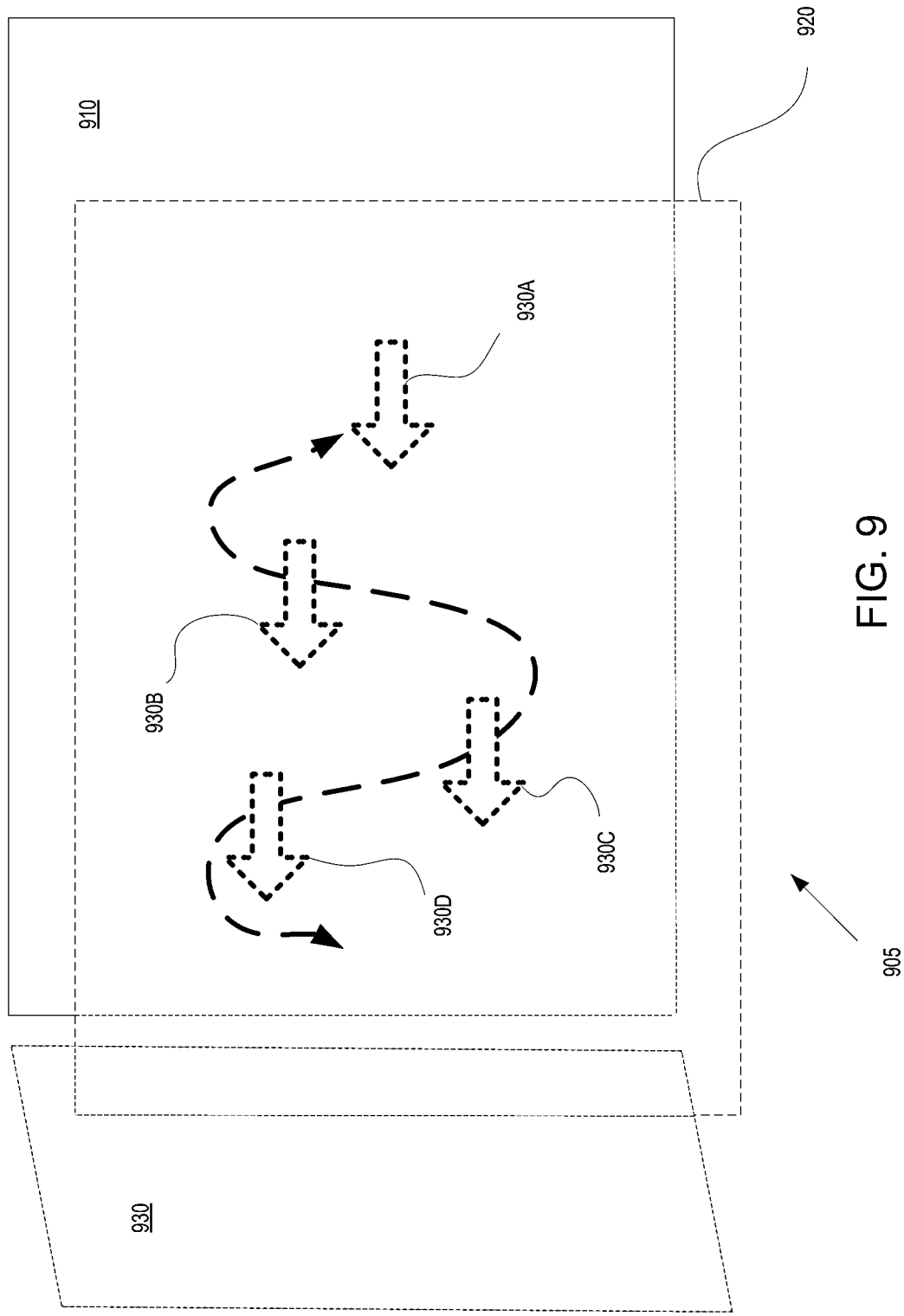
FIG. 9 is a diagram illustrating an active zone and a peripheral zone of a user viewing a VR viewing environment through an HMD, wherein an attractor is presented in the active zone to bring attention of the user to information presented in the peripheral zone, in accordance with one embodiment of the present disclosure.

FIG. 9 is a diagram illustrating an active zone 905 and a peripheral zone 930 of a user viewing a VR viewing environment through an HMD, wherein an attractor 930 is presented in the active zone 905 to bring attention of the user to information presented in the peripheral zone 930, in accordance with one embodiment of the present disclosure. As previously described, the active zone 905 may include main content, and the peripheral zone 930 may include secondary content. More particularly, the main content may be displayed at a first focal plane 910 of the VR viewing environment, wherein the main content may include 2D information (e.g., 2D gaming application, video content, etc.). In addition, a portion of the main content may be displayed in the first focal plane 910, in other embodiments.

Also, an attractor 930 (e.g., an arrow) may be displayed in a second focal plane 920 (e.g., a second 2D plane) in the VR viewing environment. In one implementation, the second 2D focal plane 920 is closer than the first 2D focal plane 910 to a center of the VR viewing environment corresponding to a viewing location of the user.

The attractor may be presented in any manner that is designed to attract the attention of the user. FIG. 9 shows one such implementation, wherein the attractor 930 is shown moving within the focal plane 920. For example, attractor 930 is shown in a first position (shown by representation attractor 930A), a second position (shown by representation attractor 930B), a third position (shown by representation attractor 930C), a fourth position (shown by representation attractor 930D), etc. These representations show the movement (e.g., back and forth, or only repeatedly right to left, or only repeatedly left to right) of attractor 930 across the focal plane 920. In addition, the movement and direction of the attractor 930 (e.g., pointing left towards peripheral zone 930) help bring the attention of the user to the left towards peripheral zone 930.

In embodiments, any type of attraction movement is contemplated. That is, any combination of movement in one or more of the axis of the 3D viewing environment is contemplated in embodiments. For example, FIG. 9 shows vertical and horizontal movement of the attractor 930 in one focal plane. In another example, attractor 930 may move vertically, horizontally, and in the z-direction (or into and out of the page, such as towards and away from focal plane 910). In one embodiment, attractor moves horizontally in the direction of the peripheral zone containing the secondary content. For example, in FIG. 9, attractor 930 would move from right to left, and without any vertical movement. In the example of FIG. 9, attractor 930 may disappear upon reaching the peripheral zone 830B, then reappear somewhere to the right of the peripheral zone in focal plane 920, and then again move towards the peripheral zone 830B.

While specific embodiments have been provided to demonstrate the presentation of secondary content in a peripheral zone of a VR viewing environment that is outside of an active zone presenting main content, wherein the secondary content may include a companion interface supporting the game play of the user playing a gaming application. Those skilled in the art having read the present disclosure will realize additional embodiments falling within the spirit and scope of the present disclosure.

It should be noted, that access services, such as providing access to games of the current embodiments, delivered over a wide geographical area often use cloud computing. Cloud computing is a style of computing in which dynamically scalable and often virtualized resources are provided as a service over the Internet. Users do not need to be an expert in the technology infrastructure in the "cloud" that supports them. Cloud computing can be divided into different services, such as Infrastructure as a Service (IaaS), Platform as a Service (PaaS), and Software as a Service (SaaS). Cloud computing services often provide common applications, such as video games, online that are accessed from a web browser, while the software and data are stored on the servers in the cloud. The term cloud is used as a metaphor for the Internet, based on how the Internet is depicted in computer network diagrams and is an abstraction for the complex infrastructure it conceals.

A Game Processing Server (GPS) (or simply a "game server") is used by game clients to play single and multi-player video games. Most video games played over the Internet operate via a connection to the game server. Typically, games use a dedicated server application that collects data from players and distributes it to other players. This is more efficient and effective than a peer-to-peer arrangement, but it requires a separate server to host the server application. In another embodiment, the GPS establishes communication between the players and their respective game-playing devices to exchange information without relying on the centralized GPS.

Dedicated GPSs are servers which run independently of the client. Such servers are usually run on dedicated hardware located in data centers, providing more bandwidth and dedicated processing power. Dedicated servers are the preferred method of hosting game servers for most PC-based multiplayer games. Massively multiplayer online games run on dedicated servers usually hosted by a software company that owns the game title, allowing them to control and update content.

Users access the remote services with client devices, which include at least a CPU, a display and I/O. The client device can be a PC, a mobile phone, a netbook, a PDA, etc. In one embodiment, the network executing on the game server recognizes the type of device used by the client and adjusts the communication method employed. In other cases, client devices use a standard communications method, such as html, to access the application on the game server over the internet.

Embodiments of the present disclosure may be practiced with various computer system configurations including hand-held devices, microprocessor systems, microprocessor-based or programmable consumer electronics, minicomputers, mainframe computers and the like. The disclosure can also be practiced in distributed computing environments where tasks are performed by remote processing devices that are linked through a wire-based or wireless network.

It should be appreciated that a given video game may be developed for a specific platform and a specific associated controller device. However, when such a game is made available via a game cloud system as presented herein, the user may be accessing the video game with a different controller device. For example, a game might have been developed for a game console and its associated controller, whereas the user might be accessing a cloud-based version of the game from a personal computer utilizing a keyboard and mouse. In such a scenario, the input parameter configuration can define a mapping from inputs which can be generated by the user's available controller device (in this case, a keyboard and mouse) to inputs which are acceptable for the execution of the video game.

In another example, a user may access the cloud gaming system via a tablet computing device, a touchscreen smartphone, or other touchscreen driven device. In this case, the client device and the controller device are integrated together in the same device, with inputs being provided by way of detected touchscreen inputs/gestures. For such a device, the input parameter configuration may define particular touchscreen inputs corresponding to game inputs for the video game. For example, buttons, a directional pad, or other types of input elements might be displayed or overlaid during running of the video game to indicate locations on the touchscreen that the user can touch to generate a game input. Gestures such as swipes in particular directions or specific touch motions may also be detected as game inputs. In one embodiment, a tutorial can be provided to the user indicating how to provide input via the touchscreen for gameplay, e.g. prior to beginning gameplay of the video game, so as to acclimate the user to the operation of the controls on the touchscreen.

In some embodiments, the client device serves as the connection point for a controller device. That is, the controller device communicates via a wireless or wired connection with the client device to transmit inputs from the controller device to the client device. The client device may in turn process these inputs and then transmit input data to the cloud game server via a network (e.g., accessed via a local networking device such as a router). However, in other embodiments, the controller can itself be a networked device, with the ability to communicate inputs directly via the network to the cloud game server, without being required to communicate such inputs through the client device first. For example, the controller might connect to a local networking device (such as the aforementioned router) to send to and receive data from the cloud game server. Thus, while the client device may still be required to receive video output from the cloud-based video game and render it on a local display, input latency can be reduced by allowing the controller to send inputs directly over the network to the cloud game server, bypassing the client device.

In one embodiment, a networked controller and client device can be configured to send certain types of inputs directly from the controller to the cloud game server, and other types of inputs via the client device. For example, inputs whose detection does not depend on any additional hardware or processing apart from the controller itself can be sent directly from the controller to the cloud game server via the network, bypassing the client device. Such inputs may include button inputs, joystick inputs, embedded motion detection inputs (e.g., accelerometer, magnetometer, gyroscope), etc. However, inputs that utilize additional hardware or require processing by the client device can be sent by the client device to the cloud game server. These might include captured video or audio from the game environment that may be processed by the client device before sending to the cloud game server. Additionally, inputs from motion detection hardware of the controller might be processed by the client device in conjunction with captured video to detect the position and motion of the controller, which would subsequently be communicated by the client device to the cloud game server. It should be appreciated that the controller device in accordance with various embodiments may also receive data (e.g., feedback data) from the client device or directly from the cloud gaming server.

It should be understood that the embodiments described herein may be executed on any type of client device. In some embodiments, the client device is a head mounted display (HMD).

Figure 10:
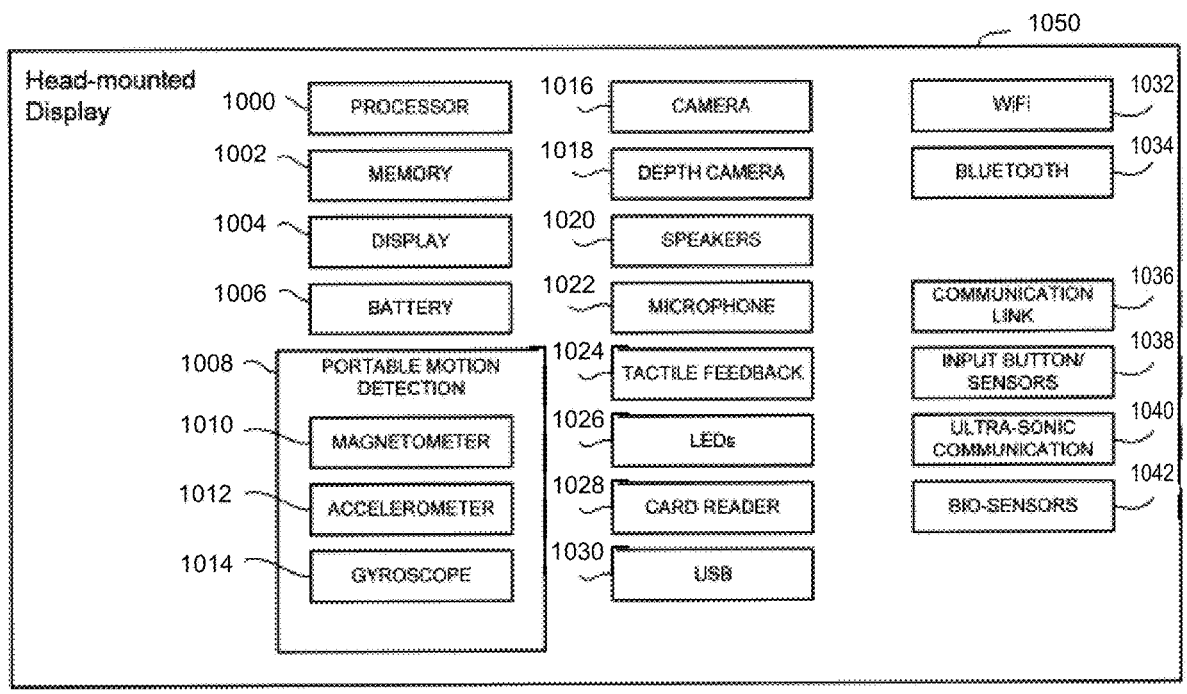
FIG. 10 is a diagram illustrating components of a head-mounted display, in accordance with an embodiment of the disclosure.

FIG. 10, a diagram illustrating components of a head-mounted display 1050 is shown, in accordance with an embodiment of the disclosure. The head-mounted display 1050 includes a processor 1000 for executing program instructions. A memory 1002 is provided for storage purposes, and may include both volatile and non-volatile memory. A display 1004 is included which provides a visual interface that a user may view. A battery 1006 is provided as a power source for the head-mounted display 1050. A motion detection module 1008 may include any of various kinds of motion sensitive hardware, such as a magnetometer 1010A, an accelerometer 1012, and a gyroscope 1014.

An accelerometer is a device for measuring acceleration and gravity induced reaction forces. Single and multiple axis models are available to detect magnitude and direction of the acceleration in different directions. The accelerometer is used to sense inclination, vibration, and shock. In one embodiment, three accelerometers 1012 are used to provide the direction of gravity, which gives an absolute reference for two angles (world-space pitch and world-space roll).

A magnetometer measures the strength and direction of the magnetic field in the vicinity of the head-mounted display. In one embodiment, three magnetometers 1010A are used within the head-mounted display, ensuring an absolute reference for the world-space yaw angle. In one embodiment, the magnetometer is designed to span the earth magnetic field, which is ±80 microtesla. Magnetometers are affected by metal, and provide a yaw measurement that is monotonic with actual yaw. The magnetic field may be warped due to metal in the environment, which causes a warp in the yaw measurement. If necessary, this warp can be calibrated using information from other sensors such as the gyroscope or the camera. In one embodiment, accelerometer 1012 is used together with magnetometer 1010A to obtain the inclination and azimuth of the head-mounted display 1050.

A gyroscope is a device for measuring or maintaining orientation, based on the principles of angular momentum. In one embodiment, three gyroscopes 1014 provide information about movement across the respective axis (x, y and z) based on inertial sensing. The gyroscopes help in detecting fast rotations. However, the gyroscopes can drift overtime without the existence of an absolute reference. This requires resetting the gyroscopes periodically, which can be done using other available information, such as positional/orientation determination based on visual tracking of an object, accelerometer, magnetometer, etc.

A camera 1016 is provided for capturing images and image streams of a real environment. More than one camera may be included in the head-mounted display 1050, including a camera that is rear-facing (directed away from a user when the user is viewing the display of the head-mounted display 1050), and a camera that is front-facing (directed towards the user when the user is viewing the display of the head-mounted display 1050). Additionally, a depth camera 1018 may be included in the head-mounted display 1050 for sensing depth information of objects in a real environment.

In one embodiment, a camera integrated on a front face of the HMD may be used to provide warnings regarding safety. For example, if the user is approaching a wall or object, the user may be warned. In one embodiment, the use may be provided with an outline view of physical objects in the room, to warn the user of their presence. The outline may, for example, be an overlay in the virtual environment. In some embodiments, the HMD user may be provided with a view to a reference marker, that is overlaid in, for example, the floor. For instance, the marker may provide the user a reference of where the center of the room is, which in which the user is playing the game. This may provide, for example, visual information to the user of where the user should move to avoid hitting a wall or other object in the room. Tactile warnings can also be provided to the user, and/or audio warnings, to provide more safety for when the user wears and plays games or navigates content with an HMD.

The head-mounted display 1050 includes speakers 1020 for providing audio output. Also, a microphone 1022 may be included for capturing audio from the real environment, including sounds from the ambient environment, speech made by the user, etc. The head-mounted display 1050 includes tactile feedback module 1024 for providing tactile feedback to the user. In one embodiment, the tactile feedback module 1024 is capable of causing movement and/or vibration of the head-mounted display 1050 so as to provide tactile feedback to the user.

LEDs 1026 are provided as visual indicators of statuses of the head-mounted display 1050. For example, an LED may indicate battery level, power on, etc. A card reader 1028 is provided to enable the head-mounted display 1050 to read and write information to and from a memory card. A USB interface 1030 is included as one example of an interface for enabling connection of peripheral devices, or connection to other devices, such as other portable devices, computers, etc. In various embodiments of the head-mounted display 1050, any of various kinds of interfaces may be included to enable greater connectivity of the head-mounted display 1050.

A Wi-Fi module 1032 is included for enabling connection to the Internet via wireless networking technologies. Also, the head-mounted display 1050 includes a Bluetooth module 1034 for enabling wireless connection to other devices. A communications link 1036 may also be included for connection to other devices. In one embodiment, the communications link 1036 utilizes infrared transmission for wireless communication. In other embodiments, the communications link 1036 may utilize any of various wireless or wired transmission protocols for communication with other devices.

Input buttons/sensors 1038 are included to provide an input interface for the user. Any of various kinds of input interfaces may be included, such as buttons, touchpad, joystick, trackball, etc. An ultra-sonic communication module 1040 may be included in head-mounted display 1050 for facilitating communication with other devices via ultra-sonic technologies.

Bio-sensors 1042 are included to enable detection of physiological data from a user. In one embodiment, the bio-sensors 1042 include one or more dry electrodes for detecting bio-electric signals of the user through the user's skin.

The foregoing components of head-mounted display 1050 have been described as merely exemplary components that may be included in head-mounted display 1050. In various embodiments of the disclosure, the head-mounted display 1050 may or may not include some of the various aforementioned components. Embodiments of the head-mounted display 1050 may additionally include other components not presently described, but known in the art, for purposes of facilitating aspects of the present disclosure as herein described.

It will be appreciated by those skilled in the art that in various embodiments of the disclosure, the aforementioned handheld device may be utilized in conjunction with an interactive application displayed on a display to provide various interactive functions. The exemplary embodiments described herein are provided by way of example only, and not by way of limitation.

Figure 11:
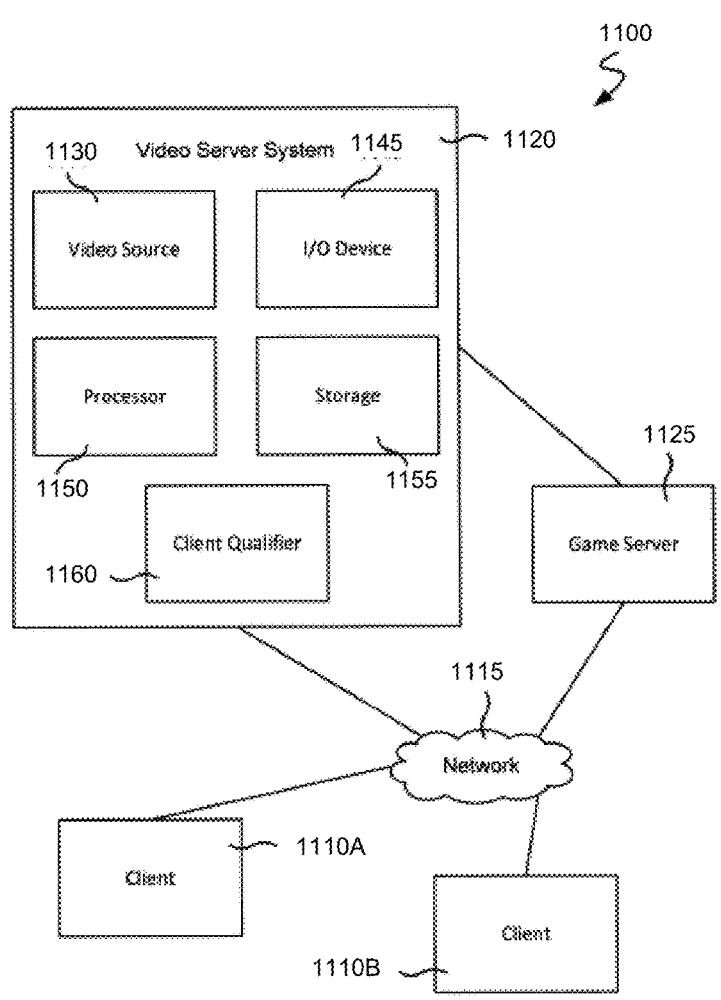
FIG. 11 is a block diagram of a Game System, according to various embodiments of the disclosure.

FIG. 11 is a block diagram of a Game System 1100, according to various embodiments of the disclosure. Game System 1100 is configured to provide a video stream to one or more Clients 1110 via a Network 1115. Game System 1100 typically includes a Video Server System 1120 and an optional game server 1125. Video Server System 1120 is configured to provide the video stream to the one or more Clients 1110 with a minimal quality of service. For example, Video Server System 1120 may receive a game command that changes the state of or a point of view within a video game, and provide Clients 1110 with an updated video stream reflecting this change in state with minimal lag time. The Video Server System 1120 may be configured to provide the video stream in a wide variety of alternative video formats, including formats yet to be defined. Further, the video stream may include video frames configured for presentation to a user at a wide variety of frame rates. Typical frame rates are 30 frames per second, 60 frames per second, and 820 frames per second. Although higher or lower frame rates are included in alternative embodiments of the disclosure.

Clients 1110, referred to herein individually as 1110A, 1110B, etc., may include head mounted displays, terminals, personal computers, game consoles, tablet computers, telephones, set top boxes, kiosks, wireless devices, digital pads, stand-alone devices, handheld game playing devices, and/or the like. Typically, Clients 1110 are configured to receive encoded video streams (i.e., compressed), decode the video streams, and present the resulting video to a user, e.g., a player of a game. The processes of receiving encoded video streams and/or decoding the video streams typically includes storing individual video frames in a receive buffer of the client. The video streams may be presented to the user on a display integral to Client 1110 or on a separate device such as a monitor or television. Clients 1110 are optionally configured to support more than one game player. For example, a game console may be configured to support two, three, four or more simultaneous players. Each of these players may receive a separate video stream, or a single video stream may include regions of a frame generated specifically for each player, e.g., generated based on each player's point of view. Clients 1110 are optionally geographically dispersed. The number of clients included in Game System 1100 may vary widely from one or two to thousands, tens of thousands, or more. As used herein, the term "game player" is used to refer to a person that plays a game and the term "game playing device" is used to refer to a device used to play a game. In some embodiments, the game playing device may refer to a plurality of computing devices that cooperate to deliver a game experience to the user. For example, a game console and an HMD may cooperate with the video server system 1120 to deliver a game viewed through the HMD. In one embodiment, the game console receives the video stream from the video server system 1120, and the game console forwards the video stream, or updates to the video stream, to the HMD for rendering.

Clients 1110 are configured to receive video streams via Network 1115. Network 1115 may be any type of communication network including, a telephone network, the Internet, wireless networks, powerline networks, local area networks, wide area networks, private networks, and/or the like. In typical embodiments, the video streams are communicated via standard protocols, such as TCP/IP or UDP/IP. Alternatively, the video streams are communicated via proprietary standards.

A typical example of Clients 1110 is a personal computer comprising a processor, non-volatile memory, a display, decoding logic, network communication capabilities, and input devices. The decoding logic may include hardware, firmware, and/or software stored on a computer readable medium. Systems for decoding (and encoding) video streams are well known in the art and vary depending on the particular encoding scheme used.

Clients 1110 may, but are not required to, further include systems configured for modifying received video. For example, a client may be configured to perform further rendering, to overlay one video image on another video image, to crop a video image, and/or the like. For example, Clients 1110 may be configured to receive various types of video frames, such as I-frames, P-frames and B-frames, and to process these frames into images for display to a user. In some embodiments, a member of Clients 1110 is configured to perform further rendering, shading, conversion to 3-D, or like operations on the video stream. A member of Clients 1110 is optionally configured to receive more than one audio or video stream. Input devices of Clients 1110 may include, for example, a one-hand game controller, a two-hand game controller, a gesture recognition system, a gaze recognition system, a voice recognition system, a keyboard, a joystick, a pointing device, a force feedback device, a motion and/or location sensing device, a mouse, a touch screen, a neural interface, a camera, input devices yet to be developed, and/or the like.

The video stream (and optionally audio stream) received by Clients 1110 is generated and provided by Video Server System 1120. As is described further elsewhere herein, this video stream includes video frames (and the audio stream includes audio frames). The video frames are configured (e.g., they include pixel information in an appropriate data structure) to contribute meaningfully to the images displayed to the user. As used herein, the term "video frames" is used to refer to frames including predominantly information that is configured to contribute to, e.g. to effect, the images shown to the user. Most of the teachings herein with regard to "video frames" can also be applied to "audio frames."

Clients 1110 are typically configured to receive inputs from a user. These inputs may include game commands configured to change the state of the video game or otherwise affect gameplay. The game commands can be received using input devices and/or may be automatically generated by computing instructions executing on Clients 1110. The received game commands are communicated from Clients 1110 via Network 1115 to Video Server System 1120 and/or Game Server 1125. For example, in some embodiments, the game commands are communicated to Game Server 1125 via Video Server System 1120. In some embodiments, separate copies of the game commands are communicated from Clients 1110 to Game Server 1125 and Video Server System 1120. The communication of game commands is optionally dependent on the identity of the command. Game commands are optionally communicated from Client 1110A through a different route or communication channel that that used to provide audio or video streams to Client 1110A.

Game Server 1125 is optionally operated by a different entity than Video Server System 1120. For example, Game Server 1125 may be operated by the publisher of a multi-player game. In this example, Video Server System 1120 is optionally viewed as a client by Game Server 1125 and optionally configured to appear from the point of view of Game Server 1125 to be a prior art client executing a prior art game engine. Communication between Video Server System 1120 and Game Server 1125 optionally occurs via Network 1115. As such, Game Server 1125 can be a prior art multiplayer game server that sends game state information to multiple clients, one of which is game server system 1120. Video Server System 1120 may be configured to communicate with multiple instances of Game Server 1125 at the same time. For example, Video Server System 1120 can be configured to provide a plurality of different video games to different users. Each of these different video games may be supported by a different Game Server 1125 and/or published by different entities. In some embodiments, several geographically distributed instances of Video Server System 1120 are configured to provide game video to a plurality of different users. Each of these instances of Video Server System 1120 may be in communication with the same instance of Game Server 1125. Communication between Video Server System 1120 and one or more Game Server 1125 optionally occurs via a dedicated communication channel. For example, Video Server System 1120 may be connected to Game Server 1125 via a high bandwidth channel that is dedicated to communication between these two systems.

Video Server System 1120 comprises at least a Video Source 1130, an I/O Device 1145, a Processor 1150, and non-transitory Storage 1155. Video Server System 1120 may include one computing device or be distributed among a plurality of computing devices. These computing devices are optionally connected via a communications system such as a local area network.

Video Source 1130 is configured to provide a video stream, e.g., streaming video or a series of video frames that form a moving picture. In some embodiments, Video Source 1130 includes a video game engine and rendering logic. The video game engine is configured to receive game commands from a player and to maintain a copy of the state of the video game based on the received commands. This game state includes the position of objects in a game environment, as well as typically a point of view. The game state may also include properties, images, colors and/or textures of objects.

The game state is typically maintained based on game rules, as well as game commands such as move, turn, attack, set focus to, interact, use, and/or the like. Part of the game engine is optionally disposed within Game Server 1125. Game Server 1125 may maintain a copy of the state of the game based on game commands received from multiple players using geographically disperse clients. In these cases, the game state is provided by Game Server 1125 to Video Source 1130, wherein a copy of the game state is stored and rendering is performed. Game Server 1125 may receive game commands directly from Clients 1110 via Network 1115, and/or may receive game commands via Video Server System 1120.

Video Source 1130 typically includes rendering logic, e.g., hardware, firmware, and/or software stored on a computer readable medium such as Storage 1155. This rendering logic is configured to create video frames of the video stream based on the game state. All or part of the rendering logic is optionally disposed within a graphics processing unit (GPU). Rendering logic typically includes processing stages configured for determining the three-dimensional spatial relationships between objects and/or for applying appropriate textures, etc., based on the game state and viewpoint. The rendering logic produces raw video that is then usually encoded prior to communication to Clients 1110. For example, the raw video may be encoded according to an Adobe Flash® standard, .wav, H.264, H.263, On2, VP6, VC-1, WMA, Huffyuv, Lagarith, MPG-x. Xvid. FFmpeg, x264, VP6-8, realvideo, mp3, or the like. The encoding process produces a video stream that is optionally packaged for delivery to a decoder on a remote device. The video stream is characterized by a frame size and a frame rate. Typical frame sizes include 800×600, 1280×720 (e.g., 720p), 1024×768, although any other frame sizes may be used. The frame rate is the number of video frames per second. A video stream may include different types of video frames. For example, the H.264 standard includes a "P" frame and a "I" frame. I-frames include information to refresh all macro blocks/pixels on a display device, while P-frames include information to refresh a subset thereof. P-frames are typically smaller in data size than are I-frames. As used herein the term "frame size" is meant to refer to a number of pixels within a frame. The term "frame data size" is used to refer to a number of bytes required to store the frame.

In alternative embodiments Video Source 1130 includes a video recording device such as a camera. This camera may be used to generate delayed or live video that can be included in the video stream of a computer game. The resulting video stream optionally includes both rendered images and images recorded using a still or video camera. Video Source 1130 may also include storage devices configured to store previously recorded video to be included in a video stream. Video Source 1130 may also include motion or positioning sensing devices configured to detect motion or position of an object, e.g., person, and logic configured to determine a game state or produce video-based on the detected motion and/or position.

Video Source 1130 is optionally configured to provide overlays configured to be placed on other video. For example, these overlays may include a command interface, log in instructions, messages to a game player, images of other game players, video feeds of other game players (e.g., webcam video). In embodiments of Client 1110A including a touch screen interface or a gaze detection interface, the overlay may include a virtual keyboard, joystick, touch pad, and/or the like. In one example of an overlay a player's voice is overlaid on an audio stream. Video Source 1130 optionally further includes one or more audio sources.

In embodiments wherein Video Server System 1120 is configured to maintain the game state based on input from more than one player, each player may have a different point of view comprising a position and direction of view. Video Source 1130 is optionally configured to provide a separate video stream for each player based on their point of view. Further, Video Source 1130 may be configured to provide a different frame size, frame data size, and/or encoding to each of Client 1110. Video Source 1130 is optionally configured to provide 3-D video.

I/O Device 1145 is configured for Video Server System 1120 to send and/or receive information such as video, commands, requests for information, a game state, gaze information, device motion, device location, user motion, client identities, player identities, game commands, security information, audio, and/or the like. I/O Device 1145 typically includes communication hardware such as a network card or modem. I/O Device 1145 is configured to communicate with Game Server 1125, Network 1115, and/or Clients 1110.

Processor 1150 is configured to execute logic, e.g. software, included within the various components of Video Server System 1120 discussed herein. For example, Processor 1150 may be programmed with software instructions in order to perform the functions of Video Source 1130, Game Server 1125, and/or a Client Qualifier 1160. Video Server System 1120 optionally includes more than one instance of Processor 1150. Processor 1150 may also be programmed with software instructions in order to execute commands received by Video Server System 1120, or to coordinate the operation of the various elements of Game System 1100 discussed herein. Processor 1150 may include one or more hardware device. Processor 1150 is an electronic processor.

Storage 1155 includes non-transitory analog and/or digital storage devices. For example, Storage 1155 may include an analog storage device configured to store video frames. Storage 1155 may include a computer readable digital storage, e.g., a hard drive, an optical drive, or solid state storage. Storage 1155 is configured (e.g., by way of an appropriate data structure or file system) to store video frames, artificial frames, a video stream including both video frames and artificial frames, audio frame, an audio stream, and/or the like. Storage 1155 is optionally distributed among a plurality of devices. In some embodiments, Storage 1155 is configured to store the software components of Video Source 1130 discussed elsewhere herein. These components may be stored in a format ready to be provisioned when needed.

Video Server System 1120 optionally further comprises Client Qualifier 1160. Client Qualifier 1160 is configured for remotely determining the capabilities of a client, such as Clients 1110A or 1110B. These capabilities can include both the capabilities of Client 1110A itself as well as the capabilities of one or more communication channels between Client 1110A and Video Server System 1120. For example, Client Qualifier 1160 may be configured to test a communication channel through Network 1115.

Client Qualifier 1160 can determine (e.g., discover) the capabilities of Client 1110A manually or automatically. Manual determination includes communicating with a user of Client 1110A and asking the user to provide capabilities. For example, in some embodiments, Client Qualifier 1160 is configured to display images, text, and/or the like within a browser of Client 1110A. In one embodiment, Client 1110A is an HMD that includes a browser. In another embodiment, client 1110A is a game console having a browser, which may be displayed on the HMD. The displayed objects request that the user enter information such as operating system, processor, video decoder type, type of network connection, display resolution, etc., of Client 1110A. The information entered by the user is communicated back to Client Qualifier 1160.

Automatic determination may occur, for example, by execution of an agent on Client 1110A and/or by sending test video to Client 1110A. The agent may comprise computing instructions, such as java script, embedded in a web page or installed as an add-on. The agent is optionally provided by Client Qualifier 1160. In various embodiments, the agent can find out processing power of Client 1110A, decoding and display capabilities of Client 1110A, lag time reliability and bandwidth of communication channels between Client 1110A and Video Server System 1120, a display type of Client 1110A, firewalls present on Client 1110A, hardware of Client 1110A, software executing on Client 1110A, registry entries within Client 1110A, and/or the like.

Client Qualifier 1160 includes hardware, firmware, and/or software stored on a computer readable medium. Client Qualifier 1160 is optionally disposed on a computing device separate from one or more other elements of Video Server System 1120. For example, in some embodiments, Client Qualifier 1160 is configured to determine the characteristics of communication channels between Clients 1110 and more than one instance of Video Server System 1120. In these embodiments the information discovered by Client Qualifier can be used to determine which instance of Video Server System 1120 is best suited for delivery of streaming video to one of Clients 1110.

It should be understood that the various embodiments defined herein may be combined or assembled into specific implementations using the various features disclosed herein. Thus, the examples provided are just some possible examples, without limitation to the various implementations that are possible by combining the various elements to define many more implementations. In some examples, some implementations may include fewer elements, without departing from the spirit of the disclosed or equivalent implementations.

Embodiments of the present disclosure may be practiced with various computer system configurations including hand-held devices, microprocessor systems, microprocessor-based or programmable consumer electronics, minicomputers, mainframe computers and the like. Embodiments of the present disclosure can also be practiced in distributed computing environments where tasks are performed by remote processing devices that are linked through a wire-based or wireless network.

With the above embodiments in mind, it should be understood that embodiments of the present disclosure can employ various computer-implemented operations involving data stored in computer systems. These operations are those requiring physical manipulation of physical quantities. Any of the operations described herein that form part of embodiments of the present disclosure are useful machine operations. Embodiments of the invention also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The disclosure can also be embodied as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing disclosure has been described in some detail for purposes of clarity of understanding, it will be apparent that certain changes and modifications can be practiced within the scope of the appended claims. Accordingly, the present embodiments are to be considered as illustrative and not restrictive, and embodiments of the present disclosure is not to be limited to the details given herein, but may be modified within the scope and equivalents of the appended claims.

What is claimed is:

1. A method, comprising:
    determining a first orientation of a head mounted display (HMD) worn by a user;
    displaying a three dimensional (3D) virtual reality (VR) viewing environment as presented in a current field of view (FOV) through a display based on the first orientation;
    displaying an attractor with the 3D VR viewing environment presented through the display, wherein the attractor brings attention of the user to secondary content that is available to the user, wherein the secondary content supplements and is external to the 3D VR viewing environment, wherein the secondary content is not displayed with the current FOV of the 3D VR viewing environment such that the secondary content is hidden from view in the display and is located in a periphery of the current FOV;
    detecting rotation of the HMD from the first orientation towards a second orientation;
    generating the secondary content by a companion application generator located on the HMD and independent of generation of the 3D VR viewing environment; and
    displaying the secondary content as presented through the display in a new FOV of the 3D VR viewing environment based on the rotation of the HMD to the second orientation,
    wherein the attractor is distinct from the secondary content.

2. The method of claim 1, further comprising:
    pausing execution of a video game played by the user while displaying the secondary content, wherein the 3D VR viewing environment is a gaming world generated through the execution of the video game, wherein the secondary content is external to the gaming world;
    detecting rotation of the HMD back towards the first orientation;
    resuming the execution of the video game played by the user; and
    displaying the 3D VR viewing environment as presented through the display based on the rotation of the HMD back towards the first orientation.

3. The method of claim 1, wherein the displaying the secondary content includes:
    overlaying the 3D VR viewing environment as presented in the new FOV through the display with the secondary content.

4. The method of claim 1, wherein the displaying the secondary content includes:
    replacing the 3D VR viewing environment with the secondary content as presented through the display of the HMD.

5. The method of claim 1, wherein the displaying the secondary content includes:
    displaying the secondary content when the rotation from the first orientation towards the second orientation exceeds a threshold.

6. The method of claim 1, wherein the displaying the attractor includes:
    detecting new data in the secondary content; and
    displaying the attractor in conjunction with the detecting of the new data in the secondary content.

7. The method of claim 1, wherein the attractor is an image including:
    a lightbulb indicating that new content is available in the secondary content, or
    a skull and crossbones indicating information about a boss is available in the secondary content, or
    a piece of paper having an edge folded over indicating a note from a friend of the user.

8. The method of claim 1, wherein the displaying the attractor includes:
    presenting the attractor in bold outline.

9. The method of claim 1, wherein the displaying the attractor includes:
    repeatedly flashing appearance of the attractor.

10. The method of claim 1, wherein the displaying the attractor includes:
displaying the attractor using a color that is distinct from main content of the VR viewing environment displayed through the display.

11. The method of claim 1, wherein the displaying the attractor includes:
moving the attractor within a two dimensional (2D) focal plane in the VR viewing environment in a direction towards which the secondary content can be accessed.

12. A computer system comprising:
a processor; and
memory coupled to the processor and having stored therein instructions that, if executed by the computer system, cause the computer system to execute a method comprising:
determining a first orientation of a head mounted display (HMD) worn by a user;
displaying a three dimensional (3D) virtual reality (VR) viewing environment as presented in a current field of view (FOV) through a display based on the first orientation;
displaying an attractor with the 3D VR viewing environment presented through the display, wherein the attractor brings attention of the user to secondary content that is available to the user, wherein the secondary content supplements and is external to the 3D VR viewing environment, wherein the secondary content is not displayed with the current FOV of the 3D VR viewing environment such that the secondary content is hidden from view in the display and is located in a periphery of the current FOV;
detecting rotation of the HMD from the first orientation towards a second orientation;
generating the secondary content by a companion application generator located on the HMD and independent of generation of the 3D VR viewing environment; and
displaying the secondary content as presented through the display with a new FOV of the 3D VR viewing environment based on the rotation of the HMD to the second orientation,
wherein the attractor is distinct from the secondary content.

13. The computer system of claim 12, the method further comprising:
pausing execution of a video game played by the user while displaying the secondary content, wherein the 3D VR viewing environment is a gaming world generated through the execution of the video game, wherein the secondary content is external to the gaming world;
detecting rotation of the HMD back towards the first orientation;
resuming the execution of the video game played by the user; and
displaying the 3D VR viewing environment as presented through the display based on the rotation of the HMD back towards the first orientation.

14. The computer system of claim 12, wherein in the method the displaying the secondary content includes:
overlaying the 3D VR viewing environment as presented in the new FOV through the display with the secondary content.

15. The computer system of claim 12, wherein in the method the displaying the attractor includes:
detecting new data in the secondary content; and
displaying the attractor in conjunction with the detecting of the new data in the secondary content.

16. A method, comprising:
determining a first orientation of a head mounted display (HMD) worn by a user;
displaying a three dimensional (3D) virtual reality (VR) viewing environment as presented through a display of the HMD based on the first orientation;
displaying an attractor with the 3D VR viewing environment presented through the display, wherein the attractor brings attention of the user to secondary content that is available to the user, wherein the secondary content supplements and is external to the 3D VR viewing environment;
detecting rotation of the HMD from the first orientation towards a second orientation; and
generating the secondary content by a companion application generator located on the HMD and independent of generation of the 3D VR viewing environment; and
displaying the secondary content as presented through the display,
wherein the attractor is distinct from the secondary content,
wherein the attractor is an image presented as a graphical icon for indicating information in the secondary content related to a video game played by the user.

17. The method of claim 16, further comprising:
pausing execution of the video game played by the user while displaying the secondary content, wherein the 3D VR viewing environment is a gaming world generated through the execution of the video game, wherein the secondary content is external to the gaming world;
detecting rotation of the HMD back towards the first orientation;
resuming the execution of the video game played by the user; and
displaying the 3D VR viewing environment as presented through the display based on the rotation of the HMD back towards the first orientation.

18. The method of claim 16, wherein the displaying the secondary content includes:
overlaying the 3D VR viewing environment as presented through the display with the secondary content.

19. The method of claim 16, wherein the displaying the attractor includes:
detecting new data in the secondary content; and
displaying the attractor in conjunction with the detecting of the new data in the secondary content.

20. The method of claim 16, wherein the attractor includes:
a lightbulb indicating that new content is available in the secondary content, or
a skull and crossbones indicating information about a boss is available in the secondary content, or
a piece of paper having an edge folded over indicating a note from a friend of the user.

* * * * *